(12) United States Patent
Devonshire et al.

(10) Patent No.: US 8,196,181 B2
(45) Date of Patent: *Jun. 5, 2012

(54) PRIVATE NETWORK SYSTEM AND METHOD

(75) Inventors: Karyn Devonshire, Manukau (NZ); Jason Lobb, Manukau (NZ)

(73) Assignee: Quipa Holdings Limited, Auckland (NZ)

( * ) Notice: Subject to any disclaimer, the term of this patent is extended or adjusted under 35 U.S.C. 154(b) by 1049 days.

This patent is subject to a terminal disclaimer.

(21) Appl. No.: 11/872,362

(22) Filed: Oct. 15, 2007

(65) Prior Publication Data

US 2008/0134316 A1 Jun. 5, 2008

(30) Foreign Application Priority Data

| Oct. 13, 2006 | (AU) | 2006905700 |
|---|---|---|
| Nov. 29, 2006 | (AU) | 2006906696 |
| Nov. 30, 2006 | (AU) | 2006906705 |

(51) Int. Cl.
*G06F 17/30* (2006.01)

(52) U.S. Cl. ........................ 726/3; 726/2; 726/4; 726/5

(58) Field of Classification Search .................. 726/15
See application file for complete search history.

(56) References Cited

U.S. PATENT DOCUMENTS

| 6,081,900 | A | 6/2000 | Subramaniam et al. | |
|---|---|---|---|---|
| 6,826,414 | B1 * | 11/2004 | Reynolds et al. | 455/555 |
| 7,127,742 | B2 | 10/2006 | Kramer et al. | |
| 7,171,684 | B1 | 1/2007 | Marquet et al. | |
| 7,437,440 | B2 * | 10/2008 | Manion et al. | 709/223 |
| 7,793,338 | B1 * | 9/2010 | Beddoe et al. | 726/3 |
| 7,877,786 | B2 * | 1/2011 | van Bemmel | 726/4 |
| 2002/0099957 | A1 | 7/2002 | Kramer et al. | |
| 2002/0165727 | A1 * | 11/2002 | Greene et al. | 705/1 |
| 2003/0074406 | A1 | 4/2003 | Noble et al. | |
| 2003/0163697 | A1 | 8/2003 | Pabla et al. | |
| 2004/0103205 | A1 | 5/2004 | Larson et al. | |
| 2004/0249911 | A1 | 12/2004 | Alkhatib et al. | |
| 2005/0046995 | A1 | 3/2005 | Lille | |
| 2005/0160277 | A1 | 7/2005 | Sciupac | |

(Continued)

FOREIGN PATENT DOCUMENTS

WO 2004057822 A2 7/2004

(Continued)

OTHER PUBLICATIONS

Tamilmani (Karthik Tamilmani, "The BitTorrent—(ppt ): A high level overview", Jul. 2003, http://alexmohr.com/bittorrent/BToverview.ppt).*

(Continued)

*Primary Examiner* — Peter Poltorak
(74) *Attorney, Agent, or Firm* — Mark R. Malek, Esq.; Zies Widerman & Malek

(57) ABSTRACT

A method for forming a secure virtual private network (VPN) is described comprising: providing a lookup device, causing at least one pre-designated contact entity on the VPN to periodically poll the lookup device for received joining requests, receiving at the lookup device a request from a joining entity to connect to the VPN, in response to a poll for joining requests the lookup device notifying the polling contact entity of at least the address of each joining entity, and the contact entity supplying at least its address to the lookup device which passes this to the joining entity to establish a link with the contact entity.

16 Claims, 61 Drawing Sheets

U.S. PATENT DOCUMENTS

| | | | |
|---|---|---|---|
| 2005/0251577 A1* | 11/2005 | Guo et al. | 709/230 |
| 2006/0020662 A1* | 1/2006 | Robinson | 709/203 |
| 2007/0028133 A1* | 2/2007 | Izutsu et al. | 714/4 |
| 2007/0061863 A1* | 3/2007 | Rajasekaran | 726/2 |
| 2007/0150596 A1* | 6/2007 | Miller et al. | 709/226 |
| 2008/0066182 A1* | 3/2008 | Hickmott et al. | 726/26 |
| 2008/0130516 A1* | 6/2008 | You et al. | 370/254 |
| 2009/0024848 A1* | 1/2009 | Takasugi et al. | 713/169 |

FOREIGN PATENT DOCUMENTS

| | | |
|---|---|---|
| WO | 2004081818 A1 | 9/2004 |
| WO | WO2005/004553 A1 | 1/2005 |
| WO | WO2005/088932 A1 | 9/2005 |
| WO | WO2006/068365 A1 | 6/2006 |
| WO | WO2007/066354 A1 | 6/2007 |

OTHER PUBLICATIONS

Stoica et al (I. Stoica, R. Morris, D. Liben-Nowell, D. R. Karger, M. F. Kaashoek, F. Dabek, and H. Balakrishnan, Chord: A scalable peer-to-peer lookup protocol for internet applications. IEEE/ACM Transactions on Networking, 11, No. 1:17-32, 2003).*

Salman A. Baset and Henning G. Schulzrinne, "An Analysis of the Skype Peer-to Peer Internet Telephony Protocol," Columbia Univ., NY,NY © 2006.

How to map a network drive in Windows XP using Windows Explorer—2006.

Peer-to-Peer computing—Dejan S Milojicic et al, Mar. 8, 2002.

Running VNC Quick Reference, Jun. 1, 2004.

Virtual Network Computing—Richardson et al IEEE Internet computing vol. 2, No. 1 Jan./Feb. 1998.

Plasil F, Stal, M:"An architectural view of distributed objects and components in CORBA, Java RMI and COM/DCOM" Internet Citation 1998, XP002326430.

Object Management Group: "The common object request broker: architecture and specification" Revision 2.0 Jul. 1995 pp. 2-1, XP002178314.

"Java Remote Method Invocation Specification" SUN JAVA 2 SDK, 2004, pp. 1-22, XP002590436.

"Windows File Management" http://it-help.bathspa.ac.uk, Sep. 19, 2005.

* cited by examiner

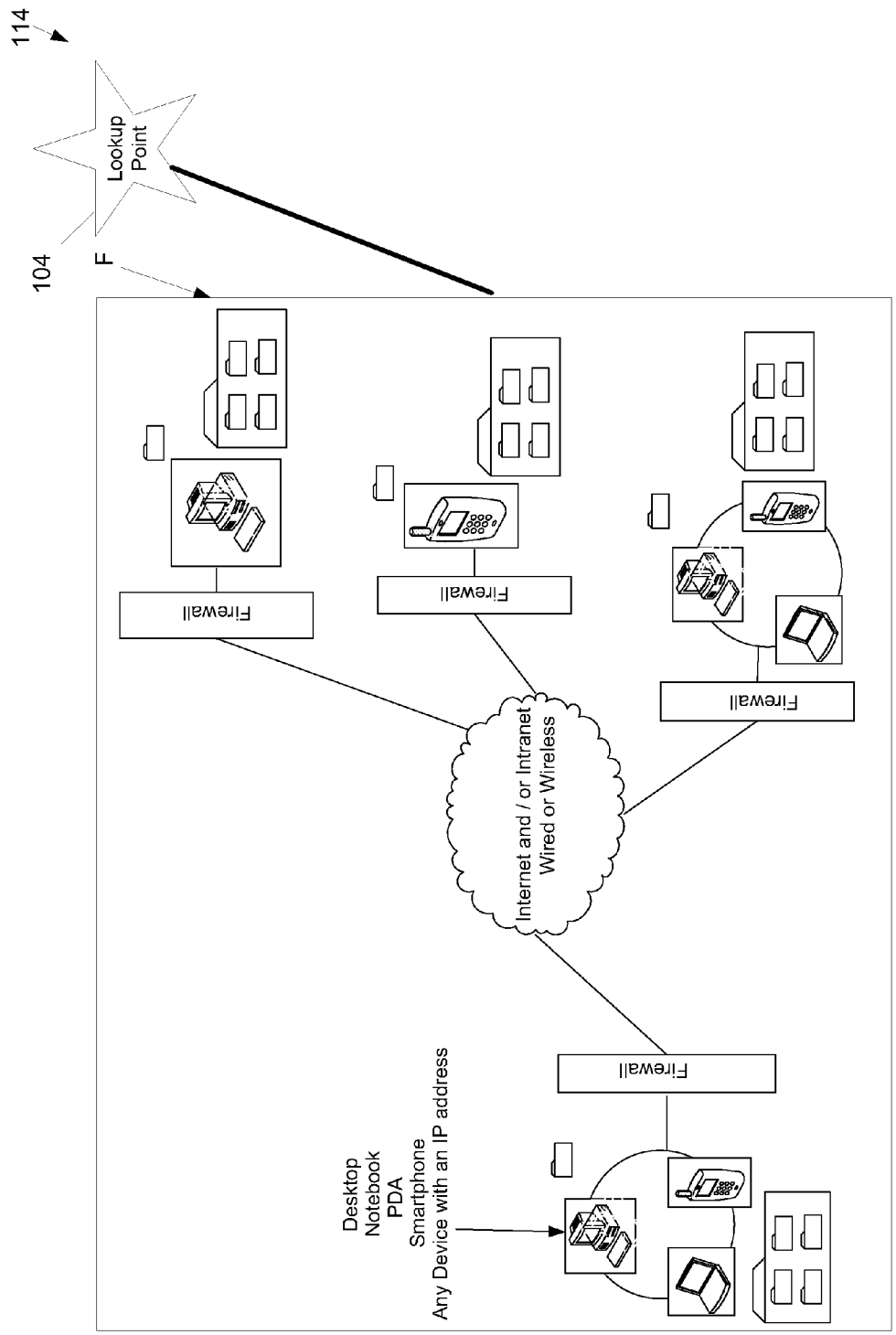

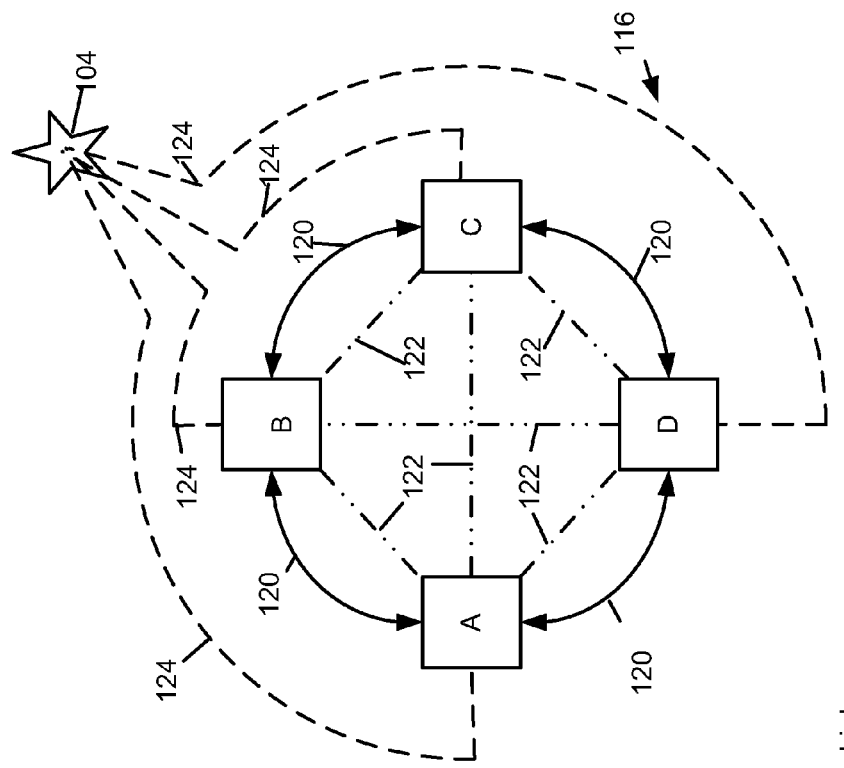
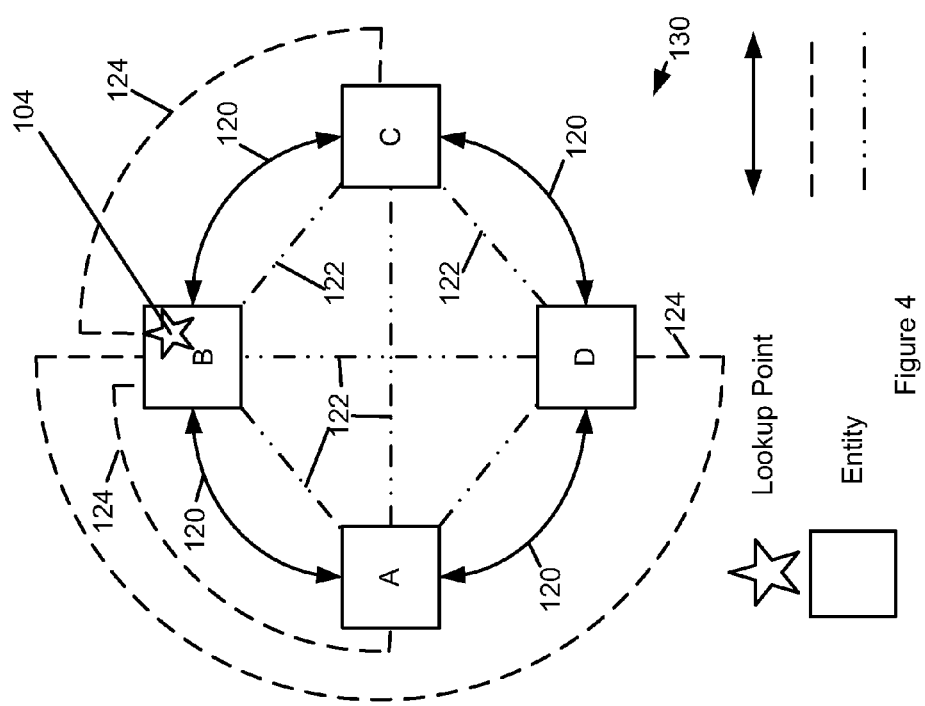

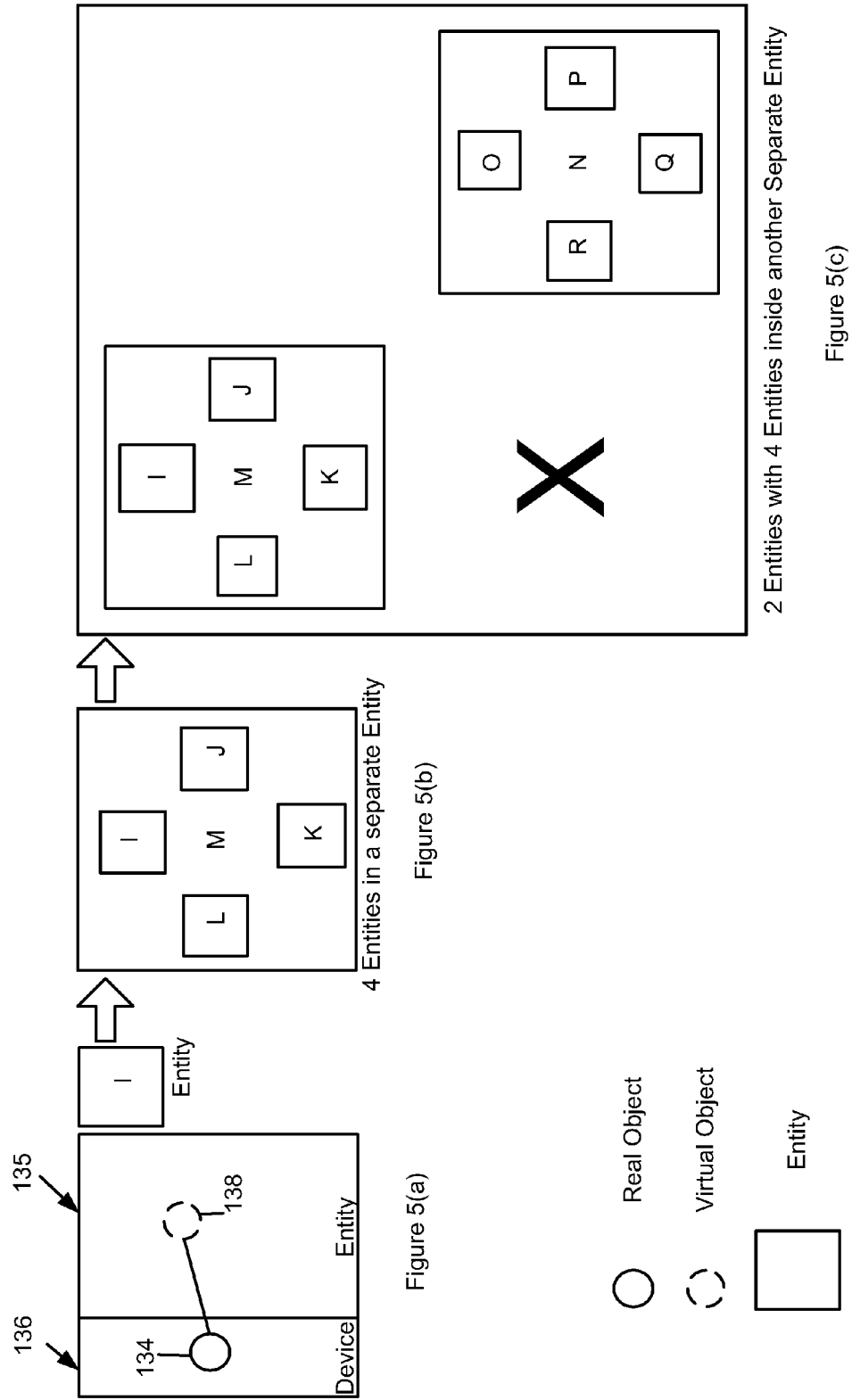

Cloud Entity Integrity Link

Entity goes offline
- Left and Right Entity Establishes new integrity link

Entity comes back online/New Entity
- Communicates with lookup point
- Connection brokered
- Communicates with entity
- Receive data required Joins/Rejoins Cloud Entity

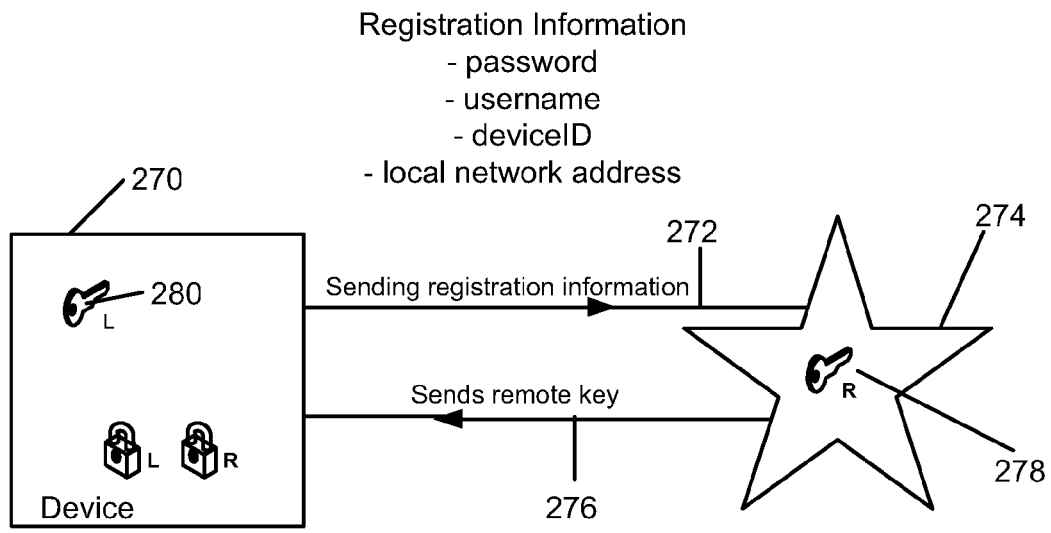
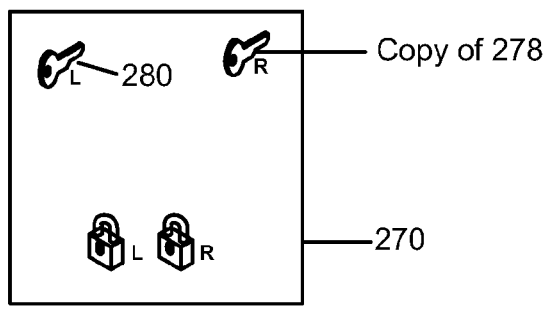
User receives key and unlocks data on device
 Remote Key
 Local Key
Figure 12

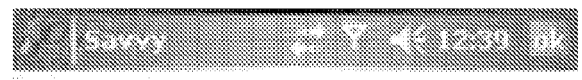
Figure 35
Figure 36

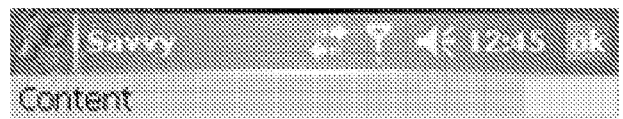
Figure 37
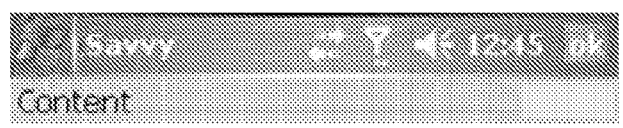
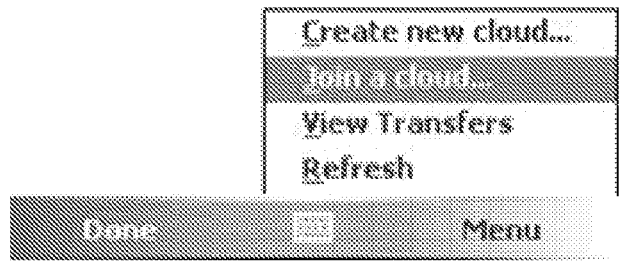
Figure 38

PRIVATE NETWORK SYSTEM AND METHOD

TECHNICAL FIELD

The invention concerns a method of sharing data, between a number of computers, or with other electronic devices, such as mobile telephones, personal digital assistants (PDAs), or the like. The data is shared via an electronic connection between these devices, especially via the internet, or via other means such as a LAN, WAN or wireless network, for instance. In particular, the invention concerns the sharing of data stored on separate devices, in a secure manner, optionally using encryption, over the internet using a special secure partition. The invention relates to the secure partition, a method of creating a secure partition and application software to perform the method of creating a secure partition. The invention also concerns a computer system, method and interface to provide access to data and functionality contained in one or more remote devices.

BACKGROUND ART

Many people use multiple digital devices that store information. For example, a user might use a smart mobile phone, a laptop at home and a personal computer at work. Traditionally, this has been difficult to do, because the data must be manually transferred from one device to another. There are other means available of synchronising the data between two or more devices, but these generally require a specific software application to do this.

There is an increasing need to be able to access the information stored on these devices securely from anywhere. This should be simple to operate and manage, and allow any type of data, and the software application that accesses and modifies each type of data to be available on any of a user's electronic devices. The data is accessed via a network, such as the internet, or WAN, for instance, and the data sharing system should also have effective security to allow only the owner of the data to access it, from whatever device they are currently using.

Various systems and method have been devised in an attempt to link multiple devices. For example GB2411092 to Changwen et al describes the creation of a secure network path for a mobile node e.g. laptop The method involves sending a registration request to a home agent specifying permanent network address for mobile node and proxy care-of address. The proxy care-of address is used for communicating with the mobile node.

Another example is WO04081818 to Fontijn et al that describes a method of transferring ownership change among devices in a peer-to-peer network. The method involves propagating change to one or more devices for which change is relevant. The responsibility of committing the change is passed among the devices.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

DISCLOSURE OF THE INVENTION

The present invention is now described in general terms. It is an object of the present invention to provide an improved private network or at least to provide the public or industry with a useful choice.

In a first aspect the present invention consists in a method for forming a secure virtual private network (VPN) consisting of two or more linked entities having internet connectability where each entity has links with at least one other device on the VPN, said method comprising the steps of:

(a) providing a lookup device having a known address with an updatable index of entities known to be connectable to the VPN, which look up device accepts requests from known entities ("joining entity") wishing to link to the VPN, (b) causing at least one pre-designated contact entity on the VPN to periodically poll the lookup device for received joining requests, (c) said lookup device receiving a request from a joining entity to connect to the VPN (d) in response a poll for joining requests said lookup device notifying the polling contact entity of at least the address of each joining entity, (e) if the contact entity permits a connection to the VPN, the contact entity supplies at least its address to the lookup device which passes this to the joining entity, (f) the joining entity and contact entity establish a first link between them, (g) the joining entity and the contact entity conduct an authentication process over said first link, (h) and if the authentication process is successful the contact entity notifies the joining entity of at least the status of other entities belonging to the VPN and notifies all entities on the VPN that the joining device is joining the VPN, (i) said joining device using the status of other entities belonging to the VPN to calculate its node position in the VPN including the one or two neighbour entities it will connect to, (j) said one or two neighbour entities initiating a process of the type specified in steps (c) to (f) with said lookup entity to establish one or more second links with said joining entity and terminating said first link, (k) and said joining entity and at least one neighbour entity conducting a mutual authentication process which if successful sustains said one or more second links.

Preferably said method including an initial registration step whereby entities register with the lookup device for access to one or more desired VPNs and only entities which are so registered are subsequently recognised or known to the lookup device, said registration step comprising: the entity sending to the lookup device registration information including at least a username, a password, and the lookup device storing said registration information for identification purposes when a registered entity sends a VPN joining request to the lookup device.

Preferably said registration step includes the lookup device sending to registering entities a security key to allow such entities to access security keys unique to VPN for which registration has been made and the other entities registered for that VPN.

Preferably in step (h) the contact entity further notifies the joining entity of the entity identifiers of other entities belonging to the VPN.

Preferably in step (i) said joining entity additionally uses the entity identifiers of other entities belonging to the VPN to calculate its node position.

Preferably said entity identifier is an address.

Preferably said authentication process consists of each of the two entities challenging the other using a key unique to the purported identity of the other entity, each challenge comprising a transmission to the other entity, a response from the other entity and verification by the challenging entity that the response is correct.

Preferably each challenge between a first entity and a second entity comprises the steps of:

(a) the first entity generates a random sequence of data, stores it and encrypts it with the public key of the second entity and sends the resultant cyphertext to the second entity, (b) the second entity receives the cyphertext from the first entity, decrypts it using the private key of the second entity, encrypts the resultant plaintext with the public key of the first entity and sends it to the first entity, and (c) the first entity receives the cyphertext from the second entity, decrypts it using the private key of the first entity compares the resultant plaintext with said stored random sequence of data and if there is a match accepts that the second entity is authenticated.

Preferably data traffic between entities connected to a VPN is encrypted using a symmetric key and said symmetric key is said random sequence of data.

Preferably said authentication process is periodically repeated and the periodically generated random data sequences are used as a dynamic symmetric session key.

Preferably said entities are devices having a processor that can be connected to the internet.

Preferably said devices include computers, PDAs, PPC, mobile telephones or smartphones, and embedded devices.

In a further aspect the invention consists in computer software for forming a secure virtual private network (VPN) consisting of two or more linked entities having internet connectability where each entity has links with at least one other entity on the VPN and a lookup device connected to the internet having a known address with an updatable index of entities known to be connectable to the VPN, said software residing on each said entity and comprising:

(a) a routine for connecting to said lookup device and making a request to said lookup device to join to the VPN, (b) a routine for polling the lookup device for received joining requests, (c) a routine for receiving from the lookup device at least the address of each joining entity, (d) a routine for matching the address of each joining entity with stored criteria, (e) a routine which allows matched entities to establish a first link between them, (f) an authentication routine which enables entities which have established a first link to mutually authenticate the identity of the other, (g) a routine which if the authentication process is successful notifies the joining entity of at least the status of other entities belonging to the VPN and notifies all entities on the VPN that the joining device is joining the VPN, (h) a routine which uses the status of other entities belonging to the VPN to calculate the node position in the VPN and the one or two neighbour entities that the entity on which the routine resides will connect to, (i) a routine which through said lookup device establishes one or more second links with said one or more neighbouring entities in said VPN and ends said first link, (j) a routine which invokes said authentication routine to conduct mutual authentication between said linked neighbouring entities and which if successful sustains said one or more second links.

In a further aspect the invention consists in a method for sharing functionality and/or data between two or more linked entities using a network comprising the steps of:

(a) creating on at least one entity at least one real object, each said real object providing access to the functionality and/or data of said entity;

(b) creating on each entity at least one virtual object, each said virtual object providing access to the functionality and/or data of a real object on said entity, each said virtual object containing at least one object actions; and (c) creating on at least one entity at least one remote object for connection to a virtual object on a remote entity via the network; said remote object allowing a entity to access functionality and/or data of a remote entity.

Preferably including the step of:

(d) creating on at least one entity a metaobject, said metaobject providing access to the functionality and/or data of a plurality of virtual, remote and meta objects.

Preferably said metaobject can contain data and/or functionality independent of any virtual or remote objects.

Preferably a list of the objects of each entity is synchronized between entities.

Preferably each of said virtual and meta objects may include security functionality for controlling access to the object.

Preferably said network is a virtual private network (VPN).

Preferably each of said real objects are selected from the group consisting of File Browser, Mail Browser; Calendar Browser; Music Streamer; Voice module; Video Streamer; Chat module; MediaPlayer Remote; Remote Application Module; Advertisement Module; Banking Module; Printer Module; Panic Module; Web RSS feed module; FTP Server module; BLOG update module; Legacy module; Database module; Web camera module.

Preferably at least one of said entities is a device having a processor and that can be connected to the internet.

Preferably at least one said device includes computers, PDAs, PPC, mobile telephones or smartphones, and embedded devices.

In a further aspect the invention consists in computer software for sharing functionality and/or data between two or more linked entities using a network, said software residing on each said entity and comprising:

(a) a routine for creating at least one real object, each said real object providing access to the functionality and/or data of said entity;

(b) a routine for creating at least one virtual object, each of said of virtual objects providing access to the functionality and/or data of a real object on said entity, each said virtual object containing at least one object action; and (c) a routine for creating at least one remote object for connection to a virtual object on a remote entity via the network; said remote object allowing an entity to access functionality and/or data of a remote entity.

In a further aspect the invention provides a secure internet partition comprising: two or more devices each containing data and a private key used for verification checks; wherein, in use of the partition, each device is associated with one or more neighbour device(s); wherein, in use of the partition, each device also contains a cryptographic key used for encryption and/or decryption of data traffic between neighbour device(s), and public keys of its neighbour device(s); and wherein in use of the partition, each device operates to perform a verification check of its neighbour device(s) using its private key and public keys of its neighbours and if a neighbour device is verified, transmitting data to the neighbour device using the cryptographic key.

The neighbourhood of devices may form a loop. Where the secure internet partition is comprised of three or more devices, each device may have two neighbour devices.

Verification checks may be based on a challenge and response authentication. The verification checks may be performed at intervals. The verification checks may be based on a verification sequence that is updated at intervals.

The cryptographic key may be a symmetrical key and each device may have substantially the same cryptographic key.

The partition may further have a lookup point that maintains a list of devices that comprise the partition. A further device may join the partition by obtaining from the look up point address details of a device in the partition that will be the further device's neighbour.

A device of the partition may be comprised of a set of devices, wherein the set of devices form a further partition.

The invention also concerns a method of creating a secure internet partition. In a further aspect the invention is application software installed on a device, to perform the method of creating a secure internet partition. In yet a further aspect, the invention concerns a lookup point to facilitate a further device to join a secure internet partition.

In a further aspect the invention provides a secure internet partition to transmit data securely on the internet, the partition comprising: a first device containing data to be transmitted to a second device, a cryptographic key and a verification sequence; a second device containing the verification sequence received from the first device in order to verify the second device and the cryptographic key; and wherein, in use of the partition, the first device operates to encrypt the data using its verification sequence and cryptographic key and the second device decrypts the data using its cryptographic key and verification sequence.

The first device may operate to encrypt the data using the cryptographic key by combining the cryptographic key with a partition sequence, and encrypting the data using the combined cryptographic key and partition sequence. The data may be packetized into packets and the combined cryptographic key and partition sequence is used to encrypt part of the packet. The packet may comprise a header and body and the part encrypted may be the body.

The first device may operate to encrypt the data using the verification sequence by encrypting the partition sequence with the verification sequence and adding it to the data transmitted to the second device. The data may be packetized into packets having a header and a body, and the encrypted partition sequence may be added to the header.

The second device may decrypt the data using its verification sequence by using the verification sequence to determine the partition sequence. Further, the second device decrypts the data using its cryptographic key by combining the determined partition with the cryptographic key and using it to decrypt the data.

The partition sequence may be dynamic in that it is changed at intervals. The partition sequence may be randomly generated. The verification sequence may be dynamic in that it is changed at intervals. The partition sequence may be randomly generated.

The verification sequence may be unique to the first and second device. The verification sequence may be unique to data transmissions from the first device to the second device. The verification sequence may be received from the first device as part of a challenge/response authentication. The second device may contain a further verification sequence, and the first device may contain the further verification sequence that is received from the second device in order to verify the first device.

The partition may comprise further devices that all contain the cryptographic key. The partition may comprise further devices and the partition sequence is used by the first device when transmitting data to any device of the partition.

In a further aspect the invention concerns a method of transmitting data securely on the internet. In yet a further aspect the invention concerns a method of receiving data securely on the internet. In another aspect, the invention concerns a software application to perform the methods of transmitting and receiving data securely on the internet.

In a further aspect the invention provides a computer network to provide access to data and functionality contained in one or more remote devices, the computer system comprising: two or more devices each containing a real object that allows access to data and provides functionality; and wherein, in use, each device is able to access data and functionality in a remote device by use of a pair of virtual objects, a first virtual object is positioned in the device for communication with the real object, and a second virtual object is positioned in the remote device for communication with the first virtual object.

The virtual object may extract data and functionality from the real object so as to make the data and functionality independent of operating system of the real object. An object may be a software application that can store data and provide functionality in the manipulation of the data.

In use, each device is able to access further functionality in a remote device by use of a pair of meta objects, a first meta object may be positioned in the device for communication with the virtual object wherein the meta object provides further functionality, and a second meta object is positioned in the remote device for communication with the first virtual object to provide the further functionality with the first virtual object. An object may contain multiple actions.

In yet a further aspect the invention provides access to data and functionality contained in one or more remote devices. In another aspect the invention provides an interface for an electronic device, so as to provide access to data and functionality contained on one or more remote devices.

Embodiments of the invention provide a secure, flexible and simple way for people to access data content stored on a network of multiple devices on a single interface. The user of each device may be different allow a user of a device to control what content on their device others can access using the single interface.

The data can be any digital file such as documents, music, pictures, e-mails, alerts, and updates. Further the data accessed could be from dynamic sources such a digital input card reading temperatures, or a screen shot from the device.

Any device that is able to be connected to the network, such as the internet, may be used in conjunction with the invention.

As used herein, the term "internet" should be interpreted broadly, to include other types of networks that connect together electronic devices such as computers, mobile telephones, PDAs, and the like, and the term "internet" will include other electronic communication networks, such as intranets, or WAN, LANs, wireless networks etc.

BRIEF DESCRIPTION OF DRAWINGS

Examples of the invention will now be described with reference to the accompanying drawings, in which:

FIG. 3 shows a schematic view of multiple entities that are centrally managed;

FIG. 4 shows a schematic view of multiple entities that are privately managed;

FIG. 5 schematically shows the relationship between devices and entities;

FIG. 12 shows the arrangement of keys on a device and lookup point during registration of a device;

FIGS. 21 to 47 show sample graphical user interfaces (GUIs) that can be presented to users of the invention;

BEST MODES FOR CARRYING OUT INVENTION

Examples of a secure partition of the internet will now be described. In this description a secure internet partition will be referred to as a "cloud".

Device—Any device having a processor and can be connected to the internet (such as using TCP/IP) can be connected to a cloud to form part of the secure internet partition. Such a device must also meet certain minimum system requirements. Examples of a device include: PC, (with any operating system, such as "Windows", "Linux", "Macintosh", or open source operating systems); PDAs, PPC, with whichever operating system, such as "Palm OS", "Windows CE/Mobile" etc; Mobile telephones or smartphones, such as, "BlackBerry", Java phone, Nokia "Symbian" operating system mobile phones; and Embedded devices.

Entity—An entity is the basic unit (or node) in a virtual private network (VPN) or "cloud". An entity is a collection of objects and can be created by a device or a cloud or VPN itself.

Objects—An object is associated with an entity (i.e., device or cloud). The objects contain functionality which allows access to data and functionality on the devices in a cloud. That is, an object is a collection of actions. An object can create an instance of an action. Objects can be added to the cloud from each device in the cloud so that the objects in a cloud are available from all of the trusted devices.

Cloud—A VPN created between known trusted entities. The cloud is aware of which devices are trusted and the status of these entities. Also a cloud can be a VPN of devices and/or other clouds. Objects can be added from each entity in the cloud.

Lookup point—A lookup point is used in the system to allow the entities to find each other. The shared lookup point allows centralized registration and control of clouds. The lookup point can be located on one of the devices in a cloud. Alternatively, the lookup point can also be on a separate device.

These concepts will be explained further in reference to the FIGS. 1 to 20

Figure 1:
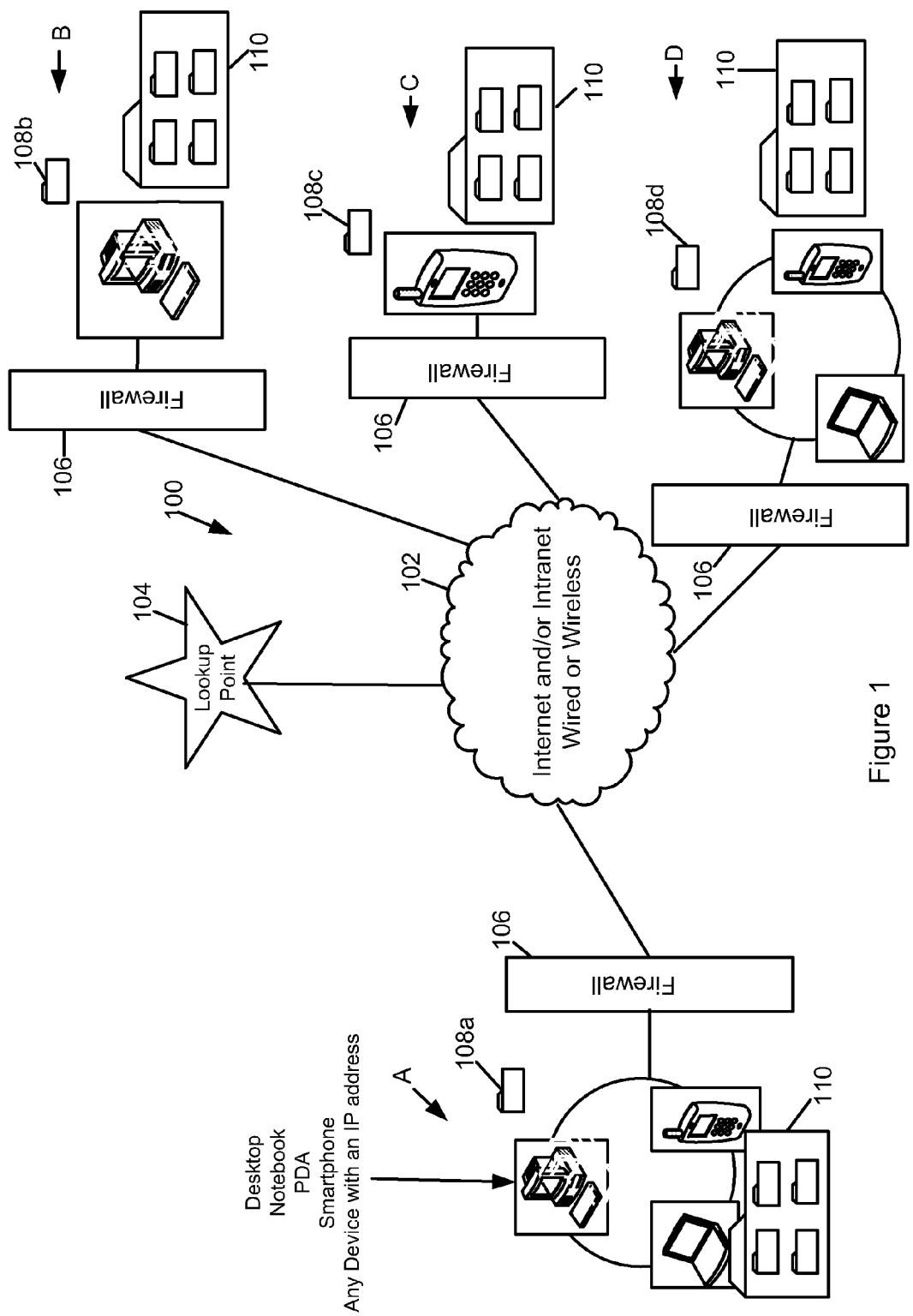
FIG. 1 shows a schematic view of the architecture of a single cloud.

FIG. 1 schematically shows the architecture of a single cloud 100. The cloud 100 is created from four entities A to D. Entity A is a cloud that is itself comprised of a set of devices including a desktop computer, notebook, PDA and smartphone. Entity B is another desktop computer. Entity C is another smart phone. Entity D is a further cloud. Each entity A to D is configured behind a firewall 106 and connected to the internet 102. There is a shared lookup point 104 for all four entities A to D, that is maintained on another device.

Each entity A to D is associated with it different content labelled 108a to 108d respectively. Content 108a to 108d is shared on the cloud in the form of objects. On each entity A to D there is full access to and manipulation of all the content 108a to 108d. This is shown schematically with the reference numeral 110.

Figure 2:
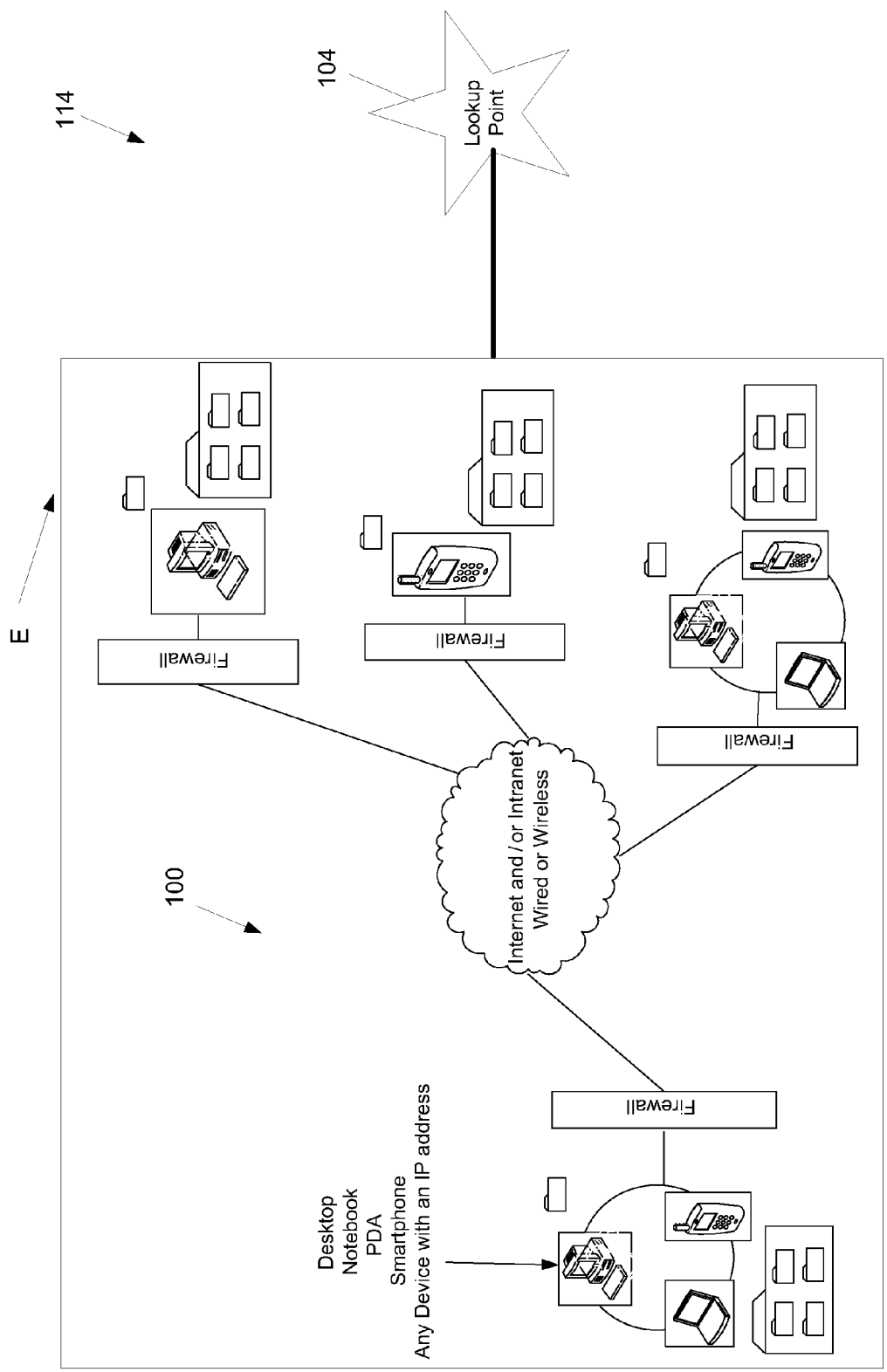
FIG. 2(a) shows a first part schematic view of the architecture of multiple clouds.
FIG. 2(b) shows a second part schematic view of the architecture of multiple clouds.
FIG. 2(c) shows a third part schematic view of the architecture of multiple clouds.
FIG. 2(d) shows a fourth part schematic view of the architecture of multiple clouds.
Figure 2:
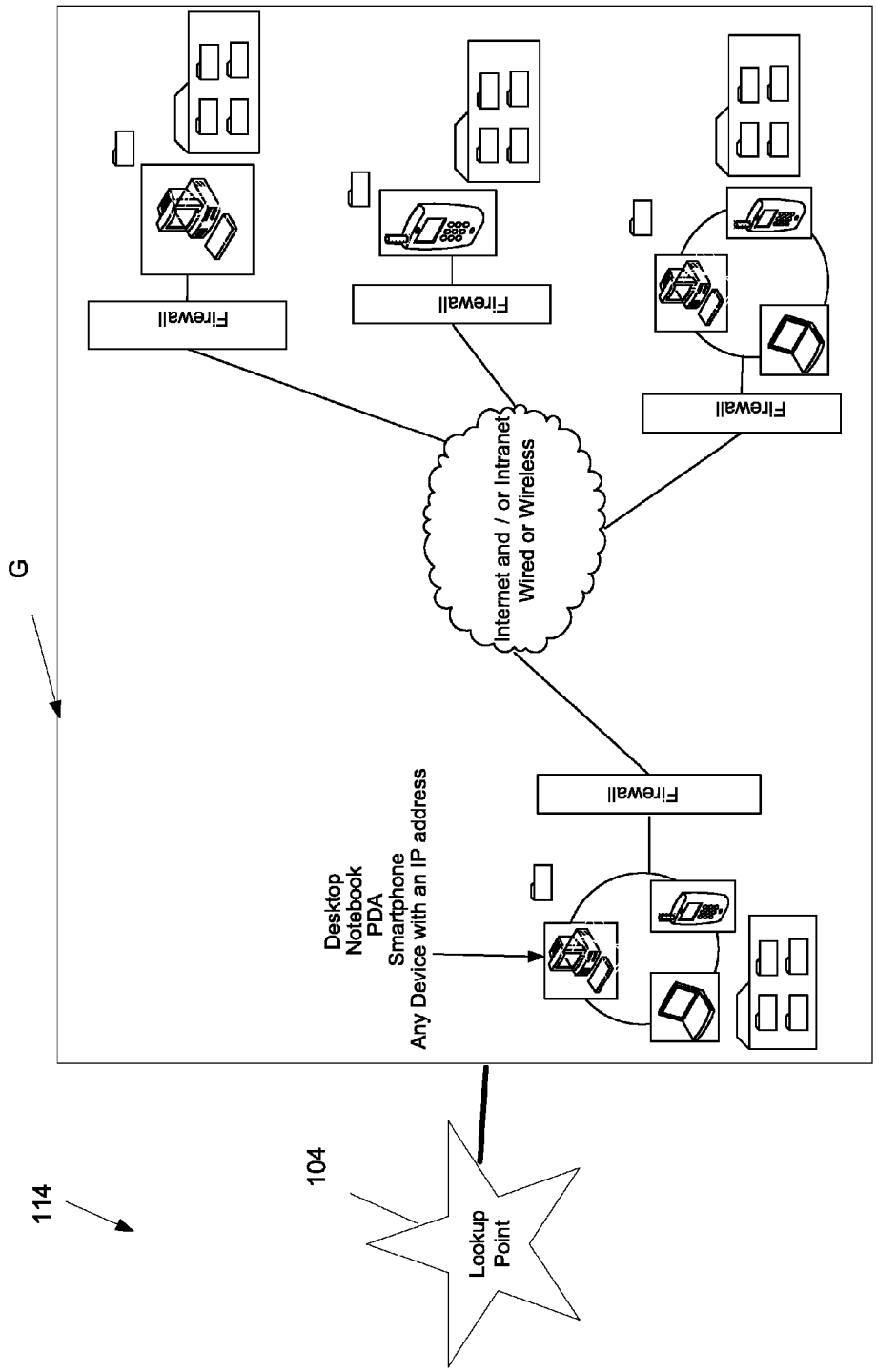
Figure 2:
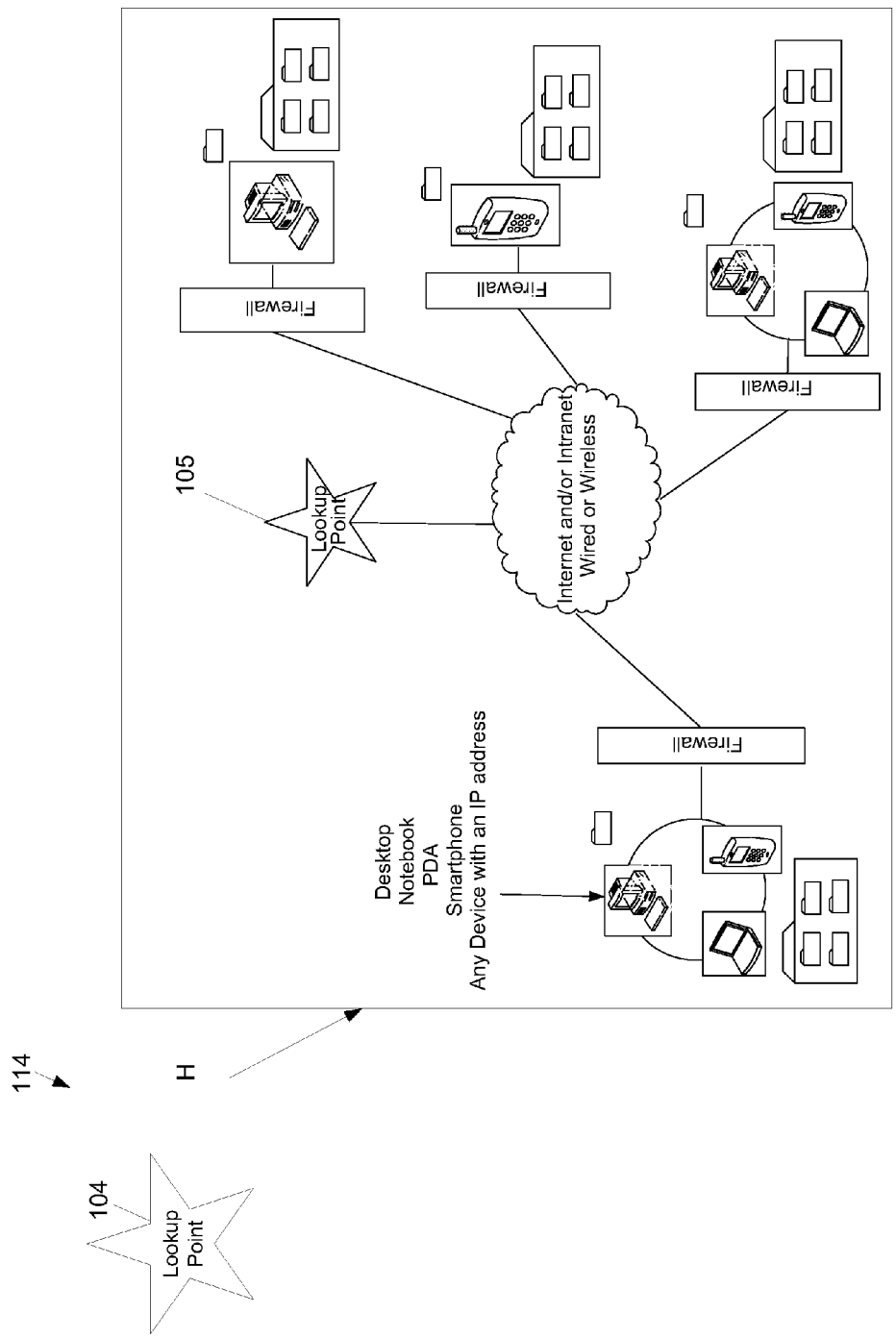

FIG. 2(a-d) shows three separate clouds E, F and G that use a shared lookup point 104. Cloud H exists separately and has a private lookup point 105. The entities of clouds E, F, and G use the shared lookup point 104. The entities of cloud H use a private lookup point. Cloud H is isolated and any device that is to be joined to Cloud H needs to be aware of and registered with the Cloud H private lookup point105.

If all entities in a cloud 114 share a lookup point 104, the cloud is considered centrally managed. There are four entities A, B, C and D that may each be a device or a cloud, which together form a centrally managed cloud 114.

All traffic between entities is optionally encrypted. At the very least all entities must be authenticated. If encryption is used the encryption is entity A, B, C or D specific as well as cloud 114 specific.

Further details are shown in FIGS. 3 and 4.

The Integrity link is indicated as 120 in the Figures. Only a single link is ever established between two entities but this link may be used for multiple types of information links such as data and integrity. In this example, links 120 represents integrity links. These integrity links 120 maintain a complete circle around all entities in a cloud. These integrity links 120 are used to verify the credentials of each entity A to D in the cloud 116. Each entity in a cloud is preferably verified twice by each of two other entities in a cloud. For example, entity B is verified by A and C that are on the each side of B's integrity links 120.

The verification is done via a challenge-response mechanism that confirms that the entity is who it says it is, and also that the entity knows who the user accessing the system is. If A is challenging B, the challenger A creates a random data sequence that is then encrypted using the public key of the entity being challenged B. Entity A sends this data to entity B. The challenged entity B then decrypts the random data using its private key and re-encrypts it using the public key of the device that challenged A. The re-encrypted data is sent from B to the challenger A for a match to be made. If matched, positive verification has taken place.

Verification is repeated at intervals, in this way if security of a device is compromised or a device goes off-line the integrity circle is automatically readjusted to remove that entity (discussed in further detail below).

The Data links are indicated as 122 in the Figures. In FIG. 3, the dotted lines represent data links 122 that are used for communicating between entities A to D in the cloud 116. A data link 122 is first established as an integrity link 120 to verify the other entity. The data link 122 is not valid until integrity is established. Data can be transported by relaying if no direct link exists between the entities wishing to exchange data.

These data links 122 are created as needed and closed when idle. A direct data link 122 between entities is desirable when and occurs automatically when multiple messages are sent between the two entities. The direct data link 122 is then closed when it is idle for a predetermined period of time. To open the link between two entities that do not already have integrity link between them, such as A and C, then the entities will verify each other first.

This data links 122 may be used for synchronizing cloud state information such as the current list of trusted entities. The data links 122 may also be used for keeping the cloud 116 records synchronized across the cloud. The data links are used for transferring all data between entities. Data sent over a data link contains header information identifying the data type. Synchronization means that each entity is able to view an up to date list of content available on all entities A to D of the cloud 116. These records contain cloud settings but can also be application specific. The data links 122 may also be used for communicating with cloud objects. Header information in a packet sent over a data link is able to address a particular cloud object.

The Lookup links are indicated as 124 in the Figures. The cloud 116 also comprises lookup links 124 to the lookup point 104. In the example shown in FIG. 3, the lookup point is a computer that has a DBMS on it. The lookup point should have a URL or a fixed IP address so it can always be found. The lookup links 124 are used when an entity, say A, attempts to register the current location of the entity A with the cloud 116. The entity A can find other entities B, C and D via the lookup point 104. This registration communication is encrypted using a public/private key mechanism that exchanges symmetric keys to use for the entity A's session.

The lookup point 104 holds the locations of entities A, B, C and D. Lookup point 104 controls the creation of new entities for a user. It can also control the joining of those entities into a cloud.

An device master key is held on the lookup point for each registered device. This key is used to lock all the private data for the cloudy application. If a device should be stolen, for example, then by blocking receipt of this key from the lookup point 104, any access to a user's clouds using the stolen device is prevented.

The lookup point 104 is used to register the name of each user's clouds. Also it can register the invitation password that is a secondary password needed to join the cloud if the user so chooses.

A Join Query can be performed on the DBMS stored on the lookup point 104 to obtain the list of clouds a user can join. A Join Lookup can be performed on the lookup point 104 to connect to a cloud to perform a join. The lookup is performed by matching the cloud name and optionally the invitation password.

A cloud 130 can also be privately managed and an example of this is shown in FIG. 4. For simplicity, the same reference numerals have been used to represent the same items as shown in FIG. 3.

This cloud 130 is similar to cloud 116 except that the lookup point is located on one of the cloud devices, in this case a device of entity B. In this arrangement the lookup point may manage both the one cloud, or else multiple clouds. Unlike the cloud 116, entity B should have a registered URL or a fixed IP address so that the other entities A, C or D can find it to access the lookup point. The lookup point can be integrated into the same software as is running the cloud.

The relationship between devices and entities will now be described in with reference to FIGS. 5(a) to 5(c).

In FIG. 5(a) a device is able to create an entity. Once an entity is created (i.e., by connecting a device to a cloud) then functionality can be added by linking to the entity software objects on the device. In this example a real object 134 on the device 136 is added to an entity 135 by creating a virtual object 138 that links back to the real object 134. The end result is the entity I.

Multiple entities can be joined to create further entities. In FIG. 5(b) entities I, J, K and L have been joined to create a new entity M. There is no limitation that the entities I to L must have been created from a single device. For example, entity M may represent four devices joined together to create a cloud, or four clouds joined together to create the cloud M. Alternatively, the cloud or two devices and two clouds joined together to create a cloud, etc. An example is shown in FIG. 5(c) where Entity X is created by joining entities M and N. Entity M is comprised on entities I, J, K and L and entity N is created by joining entities O to R.

Figure 6:
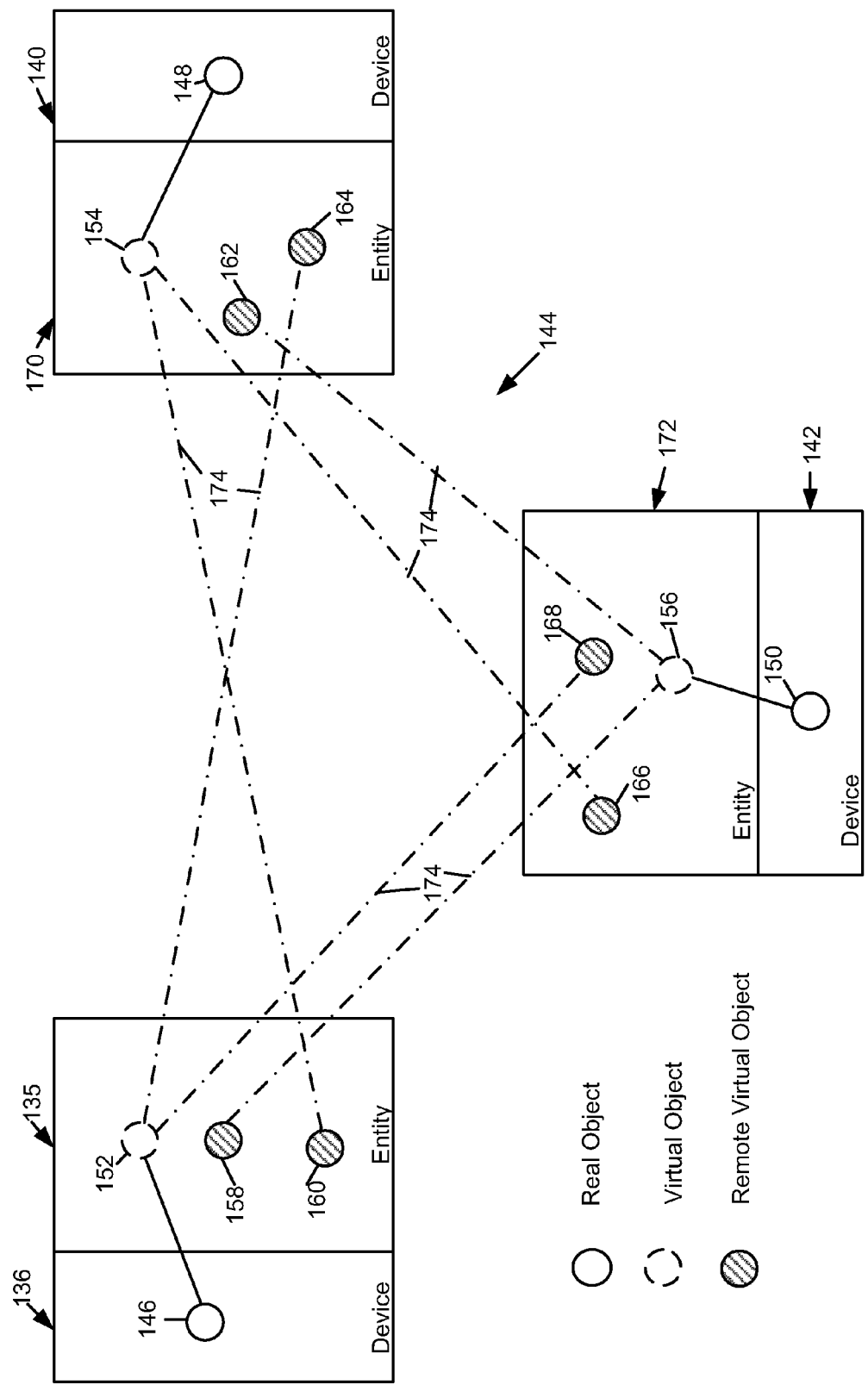
FIG. 6 shows how objects work to create a single view of data and functionality that can be created across multiple devices.

FIG. 6 shows how objects work to create a single view across multiple devices. In this example there are three devices 136, 140 and 142 that have been joined together to create a cloud 144. There are three types of objects in FIG. 6: Real objects 146, 148 and 150; Virtual Objects 152, 154 and 156; Remote Objects 158, 160, 162, 164, 166 and 168.

Real objects 146, 148 and 150 are actual objects on the device 136, 140 and 142 respectively. These objects allow access to data and functionality from the device. There may be multiple real objects on a device, each providing a certain type of functionality.

Examples of real objects are: File Browser—allows access to files and folders; Mail Browser—allows access to email content and functionality; Calendar Browser—allows access to calendar; Music Streamer—allows access to music content; Voice module—allows access to device microphone and speakers for VoIP; Video Streamer—allows access to video content; Chat module—allows text messaging; MediaPlayer Remote—allows remote control of a devices media player; Remote Application Module—allows remote application viewing and interaction; Advertisement Module—has cloud user specific information and can reach out to the web and pull in advertisements; Banking Module—stores bank credentials on a safe device and performs transactions remotely; Printer Module—allows access to a printer from the cloud; Panic Module—displays panic alerts from another device.; Web RSS feed module; FTP Server module—allows access to existing FTP servers from the cloud; BLOG update module—allow updating of a BLOG from the cloud; Legacy module—allow access to a legacy application over the cloud; Database module—allow database access over the cloud; Web camera module—access streaming video in the cloud.

Virtual objects 152, 154 and 156 are the objects added to an entity 135, 170 and 172 that link to the real objects 146, 148 and 150 respectively. Each virtual object linked to a real object can have individual preferences set. This allows one virtual object in one entity to allow access to different data then another virtual object from the same real object in another entity. In this way, different folders may be shared in each of the entities from the same file sharing object.

Remote objects 158 to 168 are objects that are linked to virtual objects via data links 174. The remote objects 158 to 168 are used to access a virtual object from another entity on the cloud.

The surface of a remote object and a virtual object is identical; only the underlying communication mechanism is different. Entity 135 has access to objects 152, 158, 160 which via the underlying communication mechanisms allows access to the real objects 146, 148 and 150. Similarly, entity 170 has access to objects 154, 162 and 164 which via the underlying communication mechanisms allows access to the real objects 146, 148, and 150. And again, entity 172 has access to objects 156, 166 and 168 which via the underlying communication mechanisms allows access to the real objects 146, 148, and 150. This functionality and access method allow each of the entities 135, 170 and 172 to have access to the same functionality and data using a single view shared across all three devices 136, 140 and 142.

Figure 7:
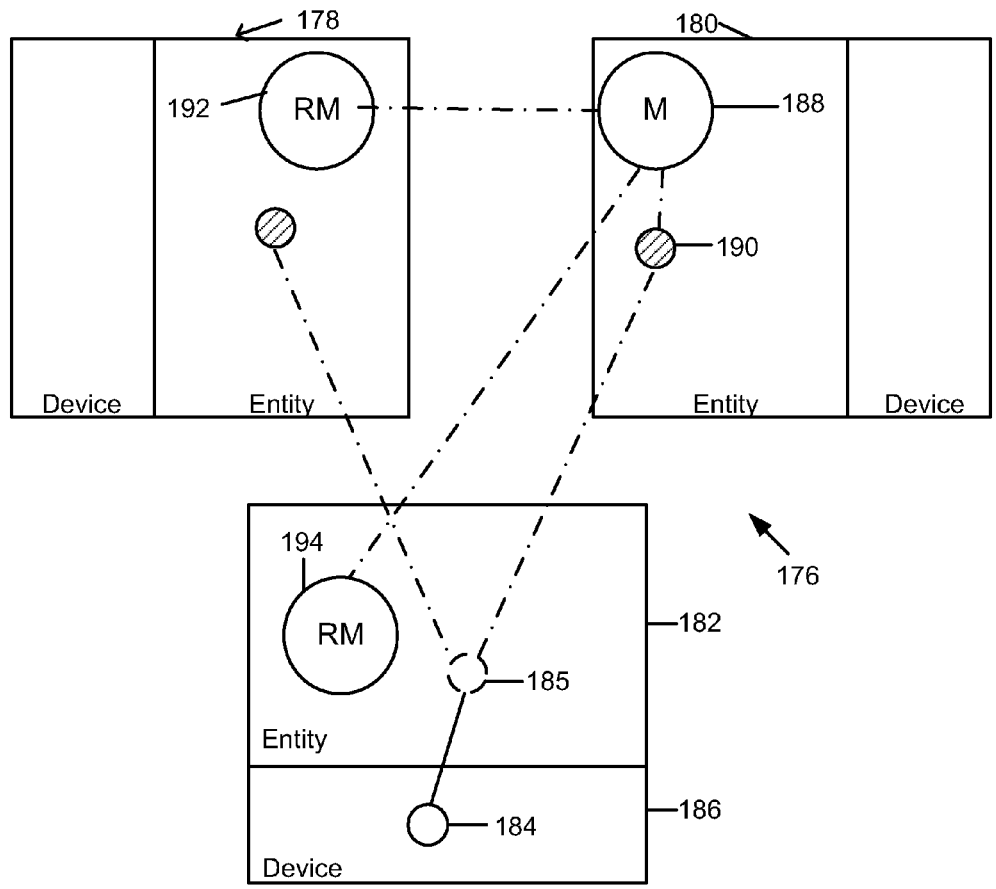
FIG. 7 schematically shows that relationship between real, virtual, remote and meta objects.

FIG. 7 schematically shows another type of object which is the metaobject. This is similar to a virtual object except that instead of linking to a real object, a metaobject links to other objects in the same entity; the linked object can itself be a remote object, virtual objects or other metaobjects. For example a standalone meta-object could be implemented using a real object-virtual object pair, where the real object is only active on one cloud.

In this example a cloud 176 has been created between the three entities 178, 180 and 182. The real object 184 on device 186 has been shared with the cloud 176 via the virtual object 185. The metaobject 188 links to the remote object 190.

There are two remote metaobjects 192 and 194 which are identical in functionality to normal remote objects 190 and 196. Here, metaobject 188 obtains its functionality and data from remote object 190. The real object 185 obtains its functionality and data from real object 184.

The metaobject 188 contains additional logic that is able to create additional functionality not contained in the object(s) it links to. A single metaobject is able to link to multiple (potentially all) other objects in the cloud.

Examples of meta-objects include: Alert object—watches one object for a change and acts on another; Virtual Folder object—uses a File Fetcher object to add a virtual folder so that any data saved to the virtual folder is automatically moved to a backup location., and for example, on a mobile device with limited storage space this can be used to allow for unlimited photo storage; Mail Attach object—link all the file fetcher objects and a mail object to implement a Send Mail action that can attach files from anywhere in the cloud; Backdoor Object—allow access to all cloud objects to implement a backdoor for any legal requirements on the software; Panic Alert Object—links to Panic Module Objects to systematically or simultaneously alert other devices.

Figure 8:
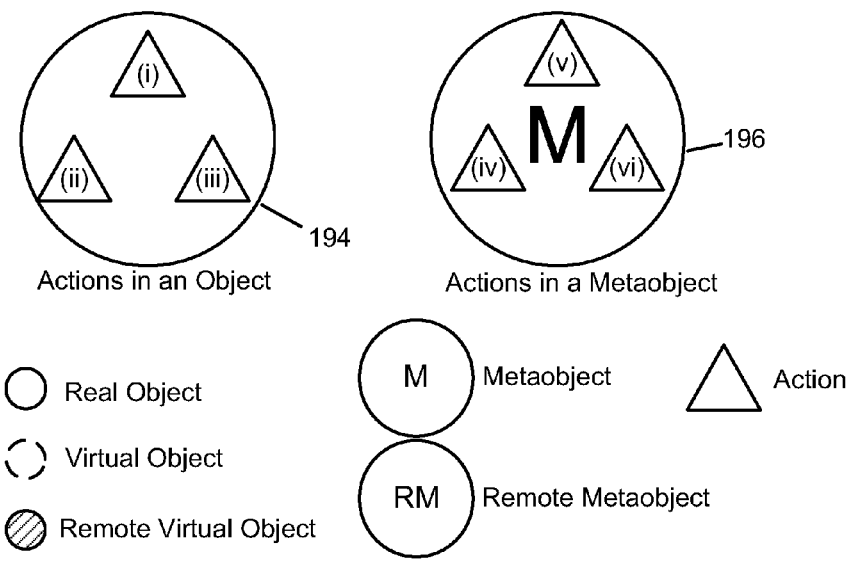
FIG. 8 schematically shows the relationship between actions and objects.

FIG. 8 schematically shows the relationship between actions and objects. Any object contains actions. In this example, object 194 contains actions (i), (ii) and (iii). The meta-object 196 also contains actions (iv), (v) and (vi).

Figure 9:
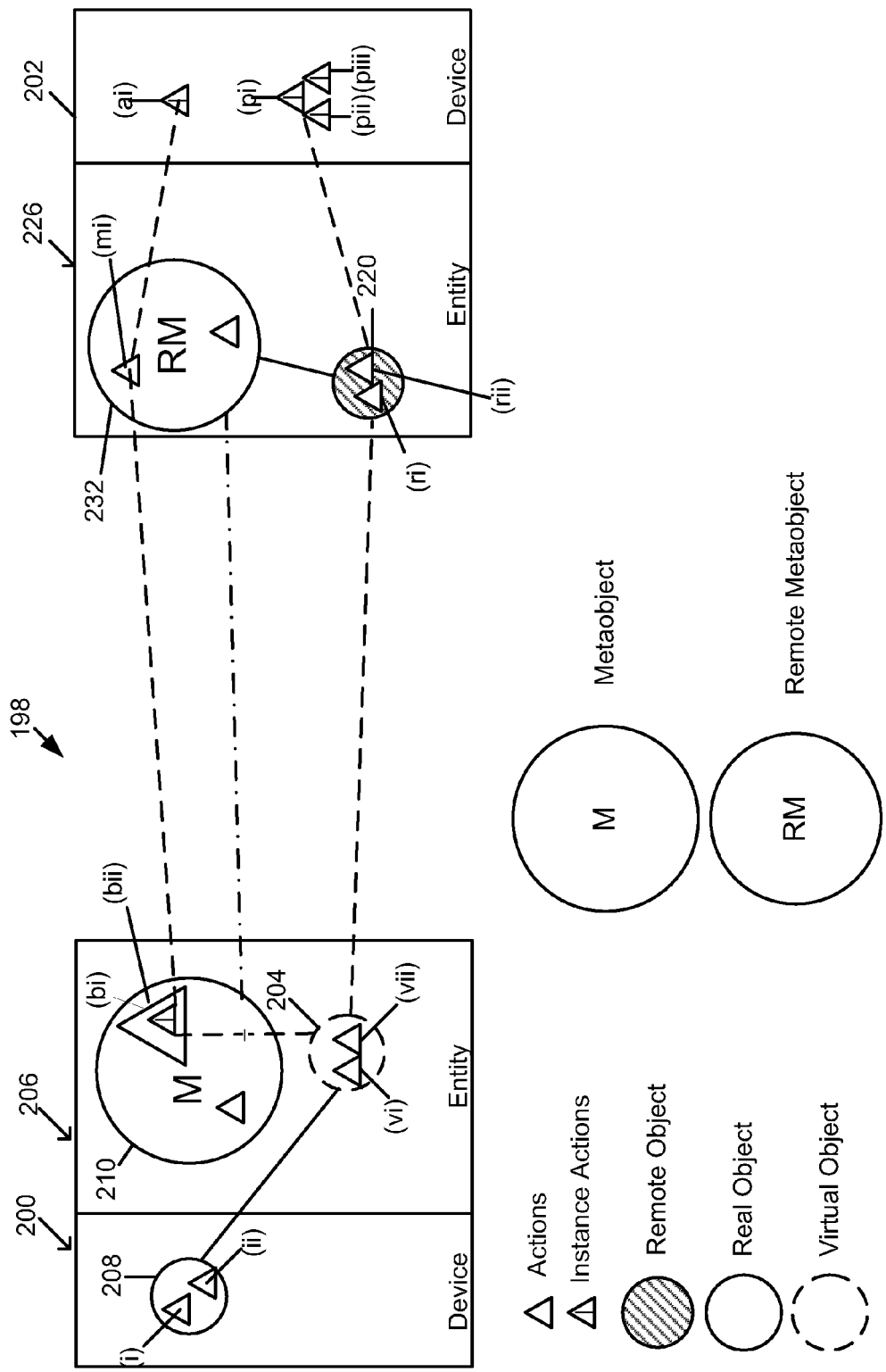
FIG. 9 schematically shows how instances of actions are created in objects.

The use of actions with objects is now described with reference to FIG. 9. A cloud 198 has been created between two devices 200 and 202. A virtual object 204 has been added to entity 206 from a real object 208 on device 200. A metaobject 210 has been added to entity 206 on device 200. The real object 208 contains two actions (i) and (ii). These actions are available on the virtual object 204 as (vi) and (vii) and on the remote object 220 as (vi) and (vii).

An instance of action is created to use an action. On device 202 three instances of action (vi) on the remote object 220 have been created as (pi), (pii) and (piii). As an example if the object is a "FileFetcher" and the action is "GetFile" then we may be doing three simultaneous file requests (pi), (pii) and (piii). Action (vi) on object 220 on entity 226 maps to action (vi) on object 204 on entity 206. This maps to action (i) on object 208 on device 200.

The action instance (ai) on device 202 maps to the action (mi) from the remote meta object 232 on entity 226. Action (mi) maps to the action (bi) on the meta object 210 on entity 206. Action (bi) creates an action instance (bii) of the action (vi) on the virtual object 204. Action (bi) in this example only interacts with a single object, though it is possible to interact with several action instances from different objects or the same object.

Figure 10A:
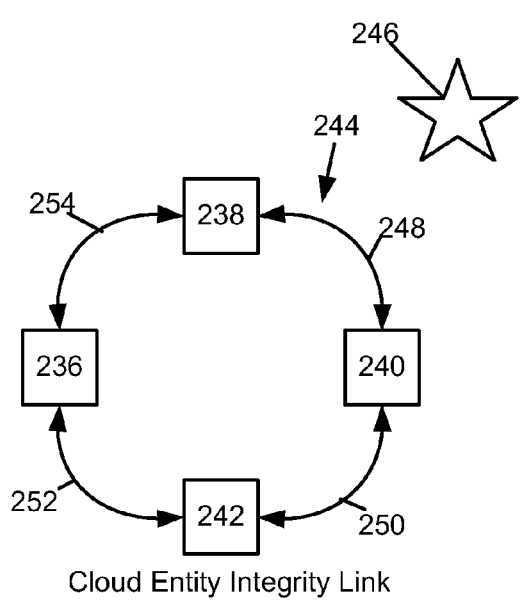
FIG. 10 schematically shows integrity links in a cloud once an entity is lost.
Figure 10B:
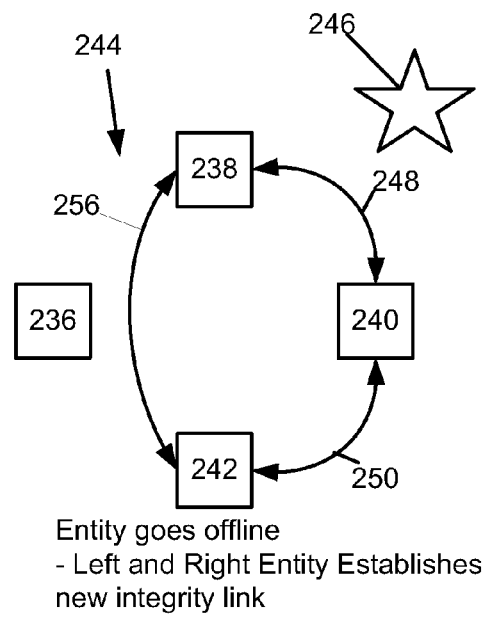

The use of the integrity links described above to detect a missing entity will now be described with reference to FIG. 10(a). In this example, there are four entities 236, 238, 240 and 242 that have formed a cloud 244 that includes a look up point 246. An integrity link is established by links 248, 250, 252 and 254 that completes a circle linking all entities 236, 238, 240 and 242 together. As shown in FIG. 10(b), if entity 236 goes off line, then a new integrity link 256 is established between entities 238 and 242. All other links remain unaffected.

Figure 11:
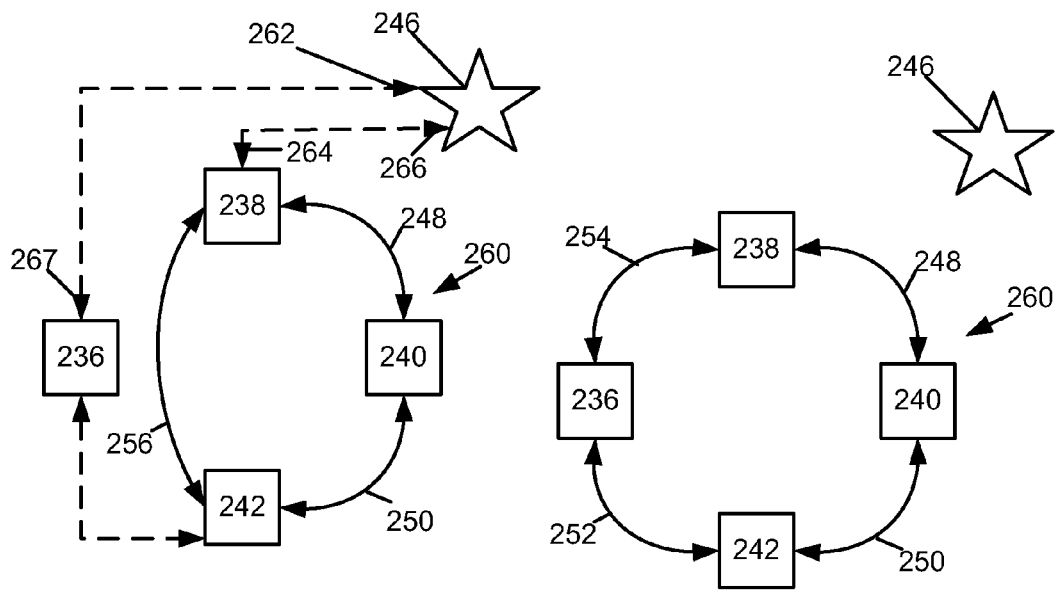
FIG. 11 schematically shows integrity links in a cloud once an entity joins.

In the same way the links can be used to locate a new device that wishes to connect to a cloud. With reference to FIG. 11, cloud 260 is established between entities 238, 240 and 242. Integrity links 248, 250 and 256 exists between these entities.

If entity 236 comes online, a connection 262 is established with the lookup point 246. Entity 236 requests the lookup point 246 for the location of cloud 260. The lookup point 246 determines that entity 238 is the registered cloud 260 contact point so the lookup point 246 asks 264 entity 238 if a connection from entity 236 is permissible. It has also transferred location information about entity 236 to entity 238. If entity 238 replies 266 that the connection is permissible, the lookup point 246 communicates 267 with entity 236 the location of entity 238.

A connection 254 is then established between entity 236 and entity 238. Entity 236 and entity 238 challenge and verify each other (described in further detail below). Entity 236 has its cloud status information updated by copying the information from entity 238. The update information is a synchronization of the status of the other cloud members and the list of cloud members. This status update (including the online and verified status of the other entities in the cloud) allows entity 236 to know where it slots into the integrity link circle and what is available to it on the cloud. Then entity 236 and 242 establish a new integrity link 252 to complete the integrity link circle.

For increased security, before a device can connect to any cloud it must first register. This will be described with reference to FIG. 12. Using their device a user must enter registration information. The registration information can normally include: a username and a password.

In this example, device 270 establishes a connection 272 with the lookup point 274. A registration message is sent over the connection 272 containing: registration username; salted hash of the registration password; unique identifier for the device; and local network address information.

If the registration is accepted by the lookup point 274 then the following information is returned 276 to the device 270: master key 278 used to unlock the cloudy application information, (this includes: device information; device security keys; encrypted file system key; cloud information; cloud security keys).

The cloudy application is unlocked on the device 270 by using both a locally stored key 280 which never leaves the device and the lookup point stored information that is the master key 278 which is never stored on the device.

Figure 13:
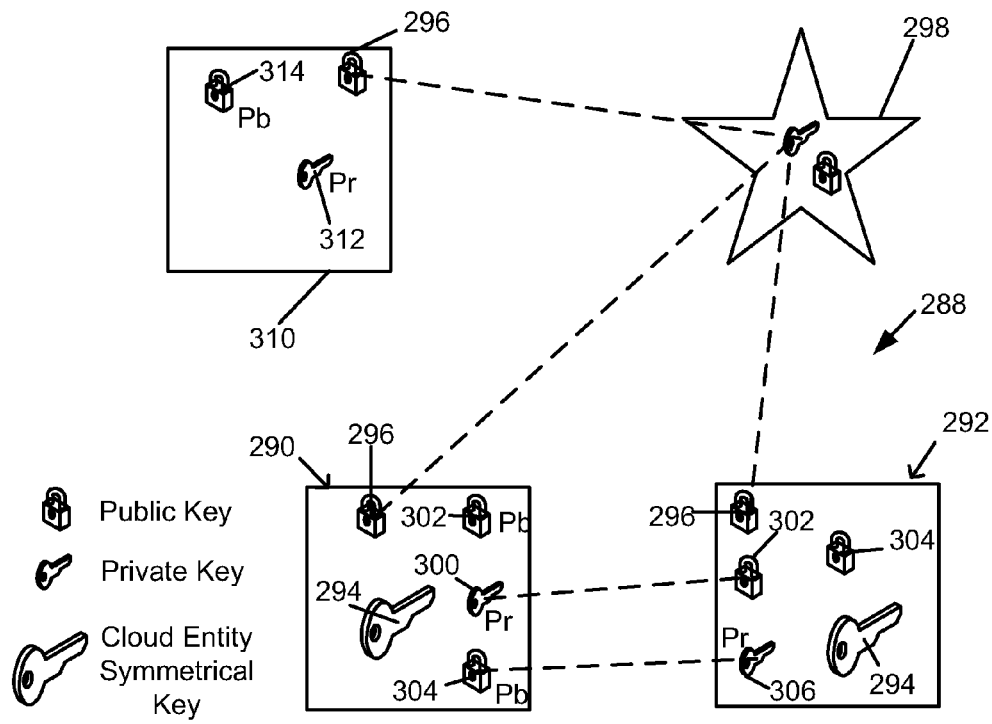
FIGS. 13, 14 and 15(a) show the arrangement of keys when a device joins a cloud.

The use of security keys when an entity joins a cloud as described in FIG. 11 will now be described with reference to FIG. 13. A cloud 288 is established between devices 290 and 292. Device 290 contains the following security information: Cloud symmetrical key 294; Lookup point public key 296; Private key 300; Public key 302; and Public key 304.

Cloud symmetrical key 294 is a randomly created sequence unique to each cloud. All of the cloud specific portion of a data message is encrypted with this key 294 combined with a randomly created seed that changes at timed intervals and is different for each entity (described in further detail below with reference to FIGS. 15(b), (c) and (d)).

Lookup point public key 296 is used to communicate with the lookup point 298. Private key 300 for device 290 is used to unlock messages sent from other devices. It is only used for initial integrity link establishment as symmetrical keys are exchanged during integrity link establishment. Public key 302 for device 290 is handed to trusted entities so they can communicate with device 290 during integrity link establishment. Public key 304 for device 292 is received from device 292 so device 290 can establish an integrity link with device 290.

Device 292 contains the following security information: Cloud symmetrical key 294; Lookup point public key 296; Private key 306 for device 292; Public key 304 for device 292; and Public key 302 for device 290.

Each entity 290 and 292 each contain further keys which are omitted in this example for simplicity but are described in further detail below with reference to FIGS. 15(b), (c) and (d).

Device 310 is not a member of the cloud 288 and only contains: Lookup point public key 296; Private key 312 for device 310; and Public key 314 for device 310.

The lookup point 298 contains: Lookup point public key 296; and Lookup point private key 316.

Figure 14:
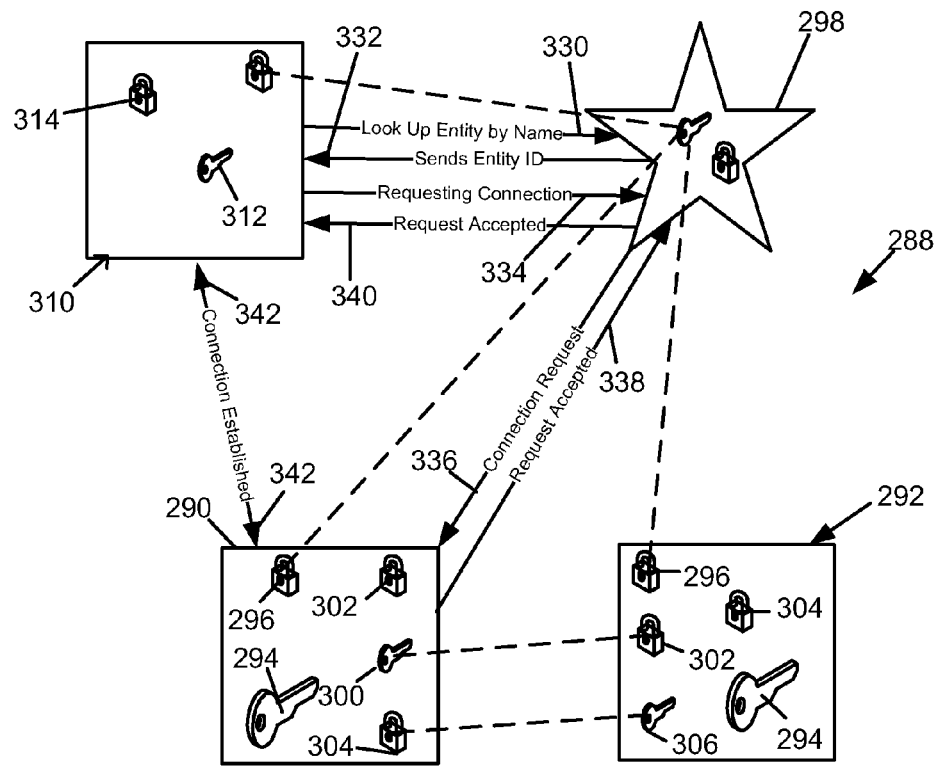

Based on the cloud 288 described in FIG. 13 the method of device 310 joining the cloud will now be described with reference to FIG. 14.

Firstly, the user on device 310 enters the following information into the cloudy application: cloud name (C); cloud invite number (I); cloud user name (U); and cloud user password (P).

The device 310 sends 330 to lookup point 298 a join lookup message containing cloud name (C) and invite number (I). The lookup point 298 searches for this cloud and returns 332 the unique entity identifier for the cloud.

The device 310 then sends 334 a connection request for this entity ID to the lookup point 298. Lookup point 298 sends 336 a connection request to entity 290. Device 290 replies 338 to lookup 298 with a connection accepted message. Lookup point 298 sends 340 to device 310 a request accepted message.

Next device 290 and device 310 establish a connection 342. Firstly, device 310 constructs a join message to send to device 290. The message is self encrypted using hashed versions of C, U, P and I and a random sequence (S). Device 290 checks the join message, and if OK, the device 290 requests information about device 310.

In response, device 310 sends the following information to 290: Public key 314 for device 310; and EntityID for device 310.

Device 290 receives this information and replies with an invitation containing: Cloud symmetrical key 294; Public key 302 for device 290; and EntityID for device 290.

Device 290 and device 310 establish an integrity link and the cloud status are synchronized over this link. Status information includes a list of the EntityIDs for each member of the cloud. It receives the online status of each cloud entity. Cloud records are synchronized, these records contain cloud, entity and object information. The cloud record contains a list of the entities in a cloud as well as cloud users/pwds. The cloud member records (one for each entity) contain a list of the objects for that member as well as the display name for the member. The object records (one for each object) contain a list of the classes the object supports as well as the available functionality types.

Figure 15A:
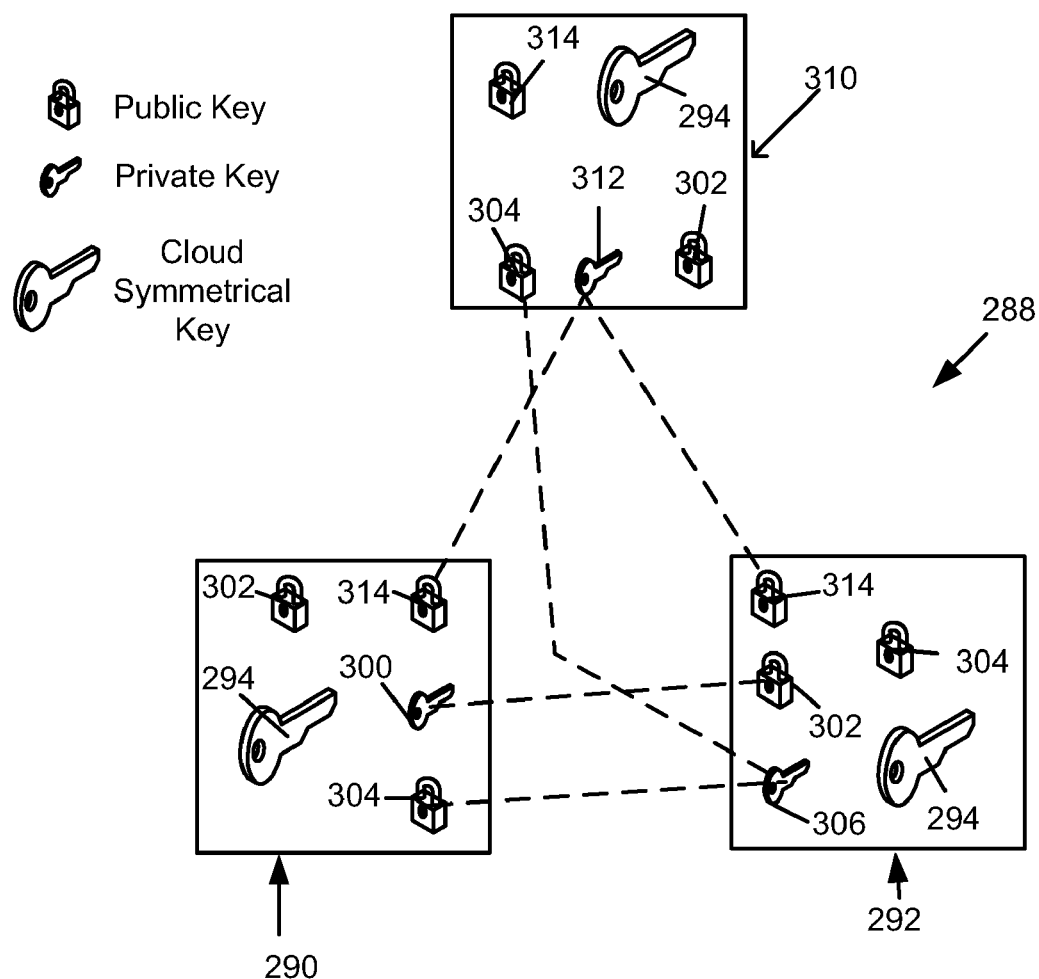

The synchronisation also includes the public keys for the other cloud entities. In this way entity 310 receives the public key for entity 292 so that entities 310 and 292 can create an integrity link and complete the integrity circle. FIG. 15(a) shows the final state.

Device 290 contains the following security information: Cloud symmetrical key 294; Private key 300 for device 290; Public key 302 for device 290; Public key 314 for device 310; and Public key 304 for device 292.

Device 292 contains the following security information: Cloud symmetrical key 294; Private key 306 for device 292; Public key 304 for device 292; Public key 314 for device 310; and Public key 302 for device 290.

Device 310 contains the following security information: Cloud symmetrical key 294; Private key 312 for device 310; Public key 314 for device 310; Public key 302 for device 290; and Public key 304 for device 292.

If there had been a further entity positioned in the integrity circle between 290 and 292, during the synchronization between entity 310 and 290, entity 310 would have also received the public key of the further entity. In this way, if entity 210 and the further entity wanted to share data, rather than relay it through entity 290 or 290, entity 310 and the further entity could establish a direct integrity link by conducting a verification challenge and request and transmitting data traffic over that new connection.

Further to the cloud symmetrical key 294 that is a static key and common to all entities in a cloud, further dynamic keys are used to establish integrity links and to exchange data. This will now be described with reference to FIGS. 15(b), (c) and (d).

Figure 15B:
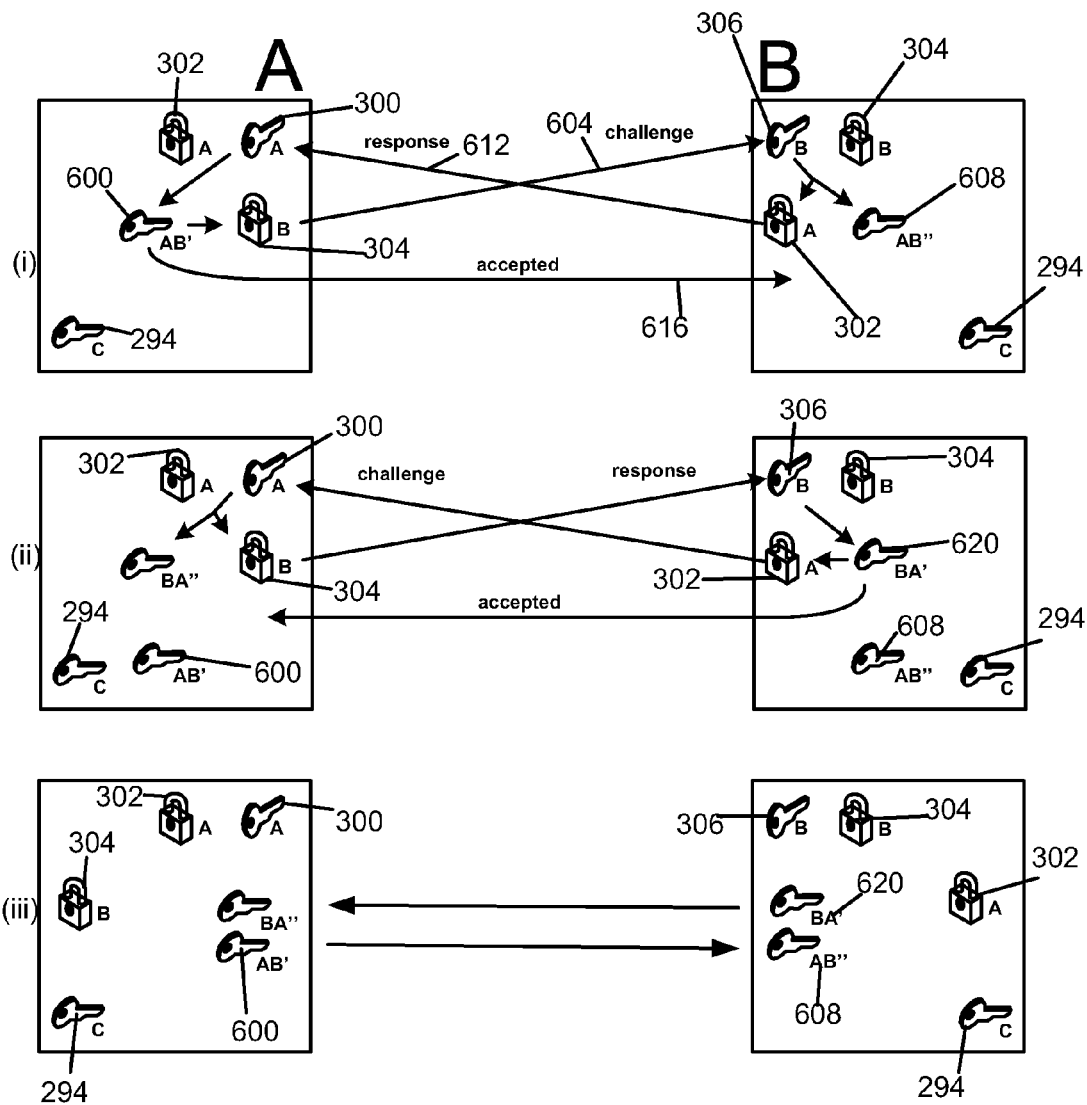
FIG. 15(b) schematically shows the establishment of an integrity link between two entities.

Referring first to FIG. 15(b)(i) the integrity link challenge and response method, including key exchange will now be described. In this example, an integrity link is established between entity A & B.

On entity A: a randomly created sequence is generated (and at intervals regenerated) for each challenge, called here the integrity dynamic key. This integrity dynamic key is used as a symmetrical key AB' 600. AB' 600 is encrypted using the public key of B 304 and this encrypted version is sent 604 to B as a challenge.

On entity B: the challenge is received and decrypted using the private key 306 of B; the decrypted version of AB' 600, shown as AB" 608 is stored on B; AB" 608 is encrypted using the public key 302 of A and the response is sent back 612 to A.

On entity A: the response is received and decrypted using the private key 300 of A; a comparison of the decrypted data and the original AB' 600 is made and if a match is made the link is marked as validated; an accepted message 616 is sent back to B.

On entity B: the accepted response is received and the link is marked as accepted.

This method is for entity A to challenge entity B. There is also a challenge from entity B to entity A in the same way, but in this case the integrity dynamic key used is BA' 620. This method is shown in FIG. 15(b)(ii). The original challenge received on B will trigger a counter challenge from B if B needs to verify A. The two challenges can occur simultaneously.

Once an integrity link from A to B and from B to A is marked as accepted then the data channel over that link is opened. The final state is shown in FIG. 15(b)(iii) where the above process is repeated at the next challenge cycle (for example, every 10 seconds). There can be a temporary overlap period during which the old keys (AB', AB", BA', BA") are still valid for the data link. During this overlap period both the old and new versions of the integrity dynamic keys are valid. This allows the data-link to remain open during subsequent challenges.

Figure 15C:
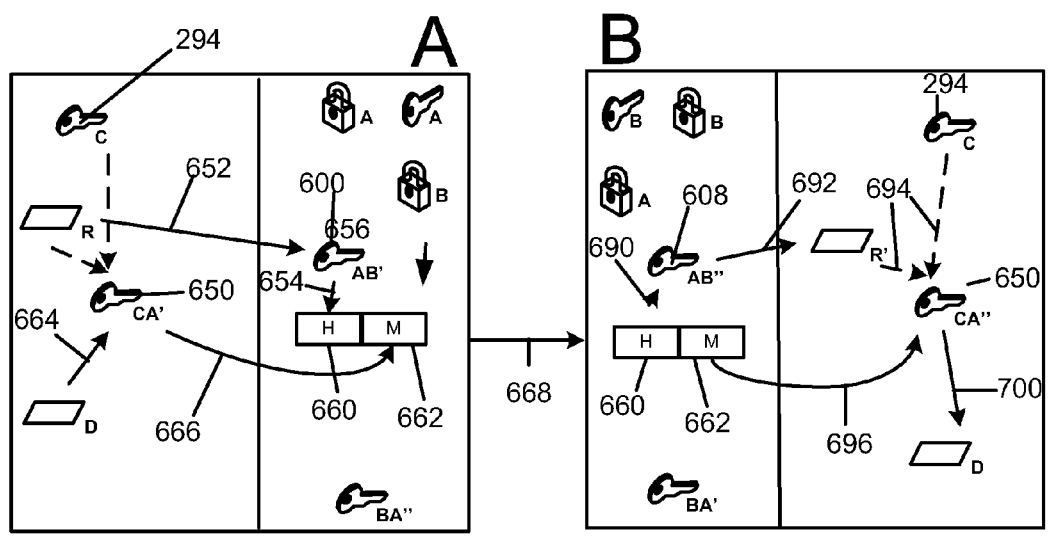
FIG. 15(c) schematically shows the process of sending data traffic between two entities in a cloud.

The method of encrypting data traffic between the two entities A and B will now be described with reference to FIG. 15(c).

The cloud desires to send data D from entity A to entity B. An integrity link has been established as described with reference to FIG. 15(b) so that entities A and B have exchanged integrity dynamic keys.

For each cloud that entity A is a part of entity A randomly generates a sequence R that is used for sending data messages. This sequence is combined with the cloud static symmetrical key C to produce CA' 650, a new data dynamic symmetrical key. R and thus CA' are regenerated at timed intervals independent of any challenge-responses occurring.

On entity A: a new message is started 656; R is encrypted 652 using AB'600 and added 654 to the header 660 of the message 656 which contains addressing information; D is encrypted 664 using CA'650 and added to the body 662 of message 656; the message is sent 668 from entity A to entity B.

On entity B: the message is received; the header 660 is decrypted 690 using AB" 608 and R' is extracted 692; cloud static symmetrical key C 294 and R' are combined 694 to produce CA" 650; CA" 650 is used 696 to decrypt the message body 662 and extract 700 the data D.

Network optimization allows a flag to be set in the header to tell B to remember the header. If the message header is the same for sequential messages between two distinct peers a flag is set in the header to signal that the recipient (in this case entity B) should cache the header. The next message can then have a flag set that tells entity B to use the cached header.

If entity A wished to send messages to an entity C that also was a member of the same cloud, entity A uses the same value R that was used in sending messages to entity B.

For simplicity this example has been described with entities A and B sharing only the one cloud. If entities A and B were both members to a second cloud and entity A wished to communicate with B, a further separate random sequence R would be generated and used when communicating on that cloud.

Figure 15D:
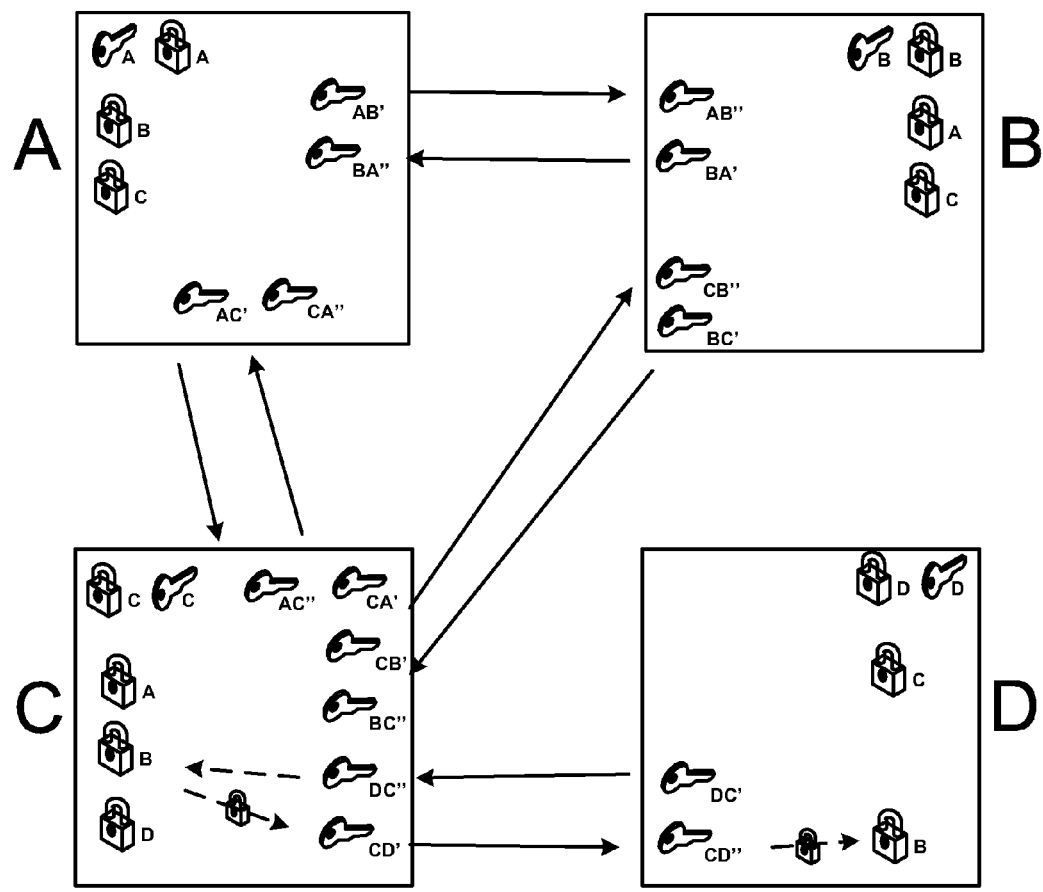
FIG. 15(d) schematically shows the process of an entity joining a cloud.

The process of joining a cloud will now be described with reference to FIG. 15(d) wherein entities A, B and C are members of the same cloud and have challenged each other and exchanged symmetrical keys.

Entity D is in the process of joining the cloud. Entity D has received the invitation containing the public key of entity C and the static cloud key and has sent its' public key to C in the join request.

A challenge has been performed successfully and C and D have exchanged integrity dynamic symmetrical keys.

Entity D is in the process of requesting the public key of B from C so that it can challenge B and complete the integrity link.

The methods of registration, joining, departing, creating a cloud and sharing content on a cloud are controlled by application software that is installed on each device and lookup point to cause the devices to operate according to the methods described above. Examples of suitable programming language for this application software is C++ and Java, but any other programming environment may be used instead, or in addition.

Figure 16:
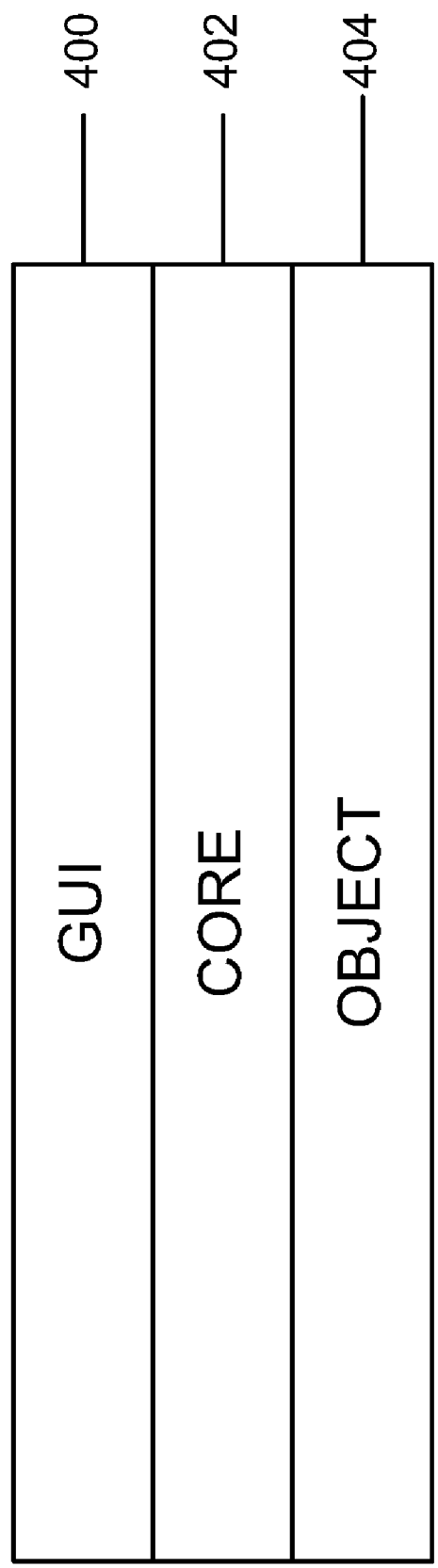
FIG. 16 schematically shows the arrangement of modules for the software of the invention.

FIG. 16 shows the main software modules of the software. The software is divided into three parts: Graphical User Interface (GUI) 400, which is the user interface; Core 402, which maintains security, device connections and clouds, and is the basic engine that creates and links entities; and Objects 404, which add functionality and data to entities.

New applications can be created by changing the GUI and the Objects. For example: File sharing by adding a file fetching object that can show and access folders and files; Messaging by adding a chat object that allows one device to send messages to another; Voice over internet Protocol (VoIP) by adding a voice object that can send voice data from an attached device; and other applications.

Figure 17:
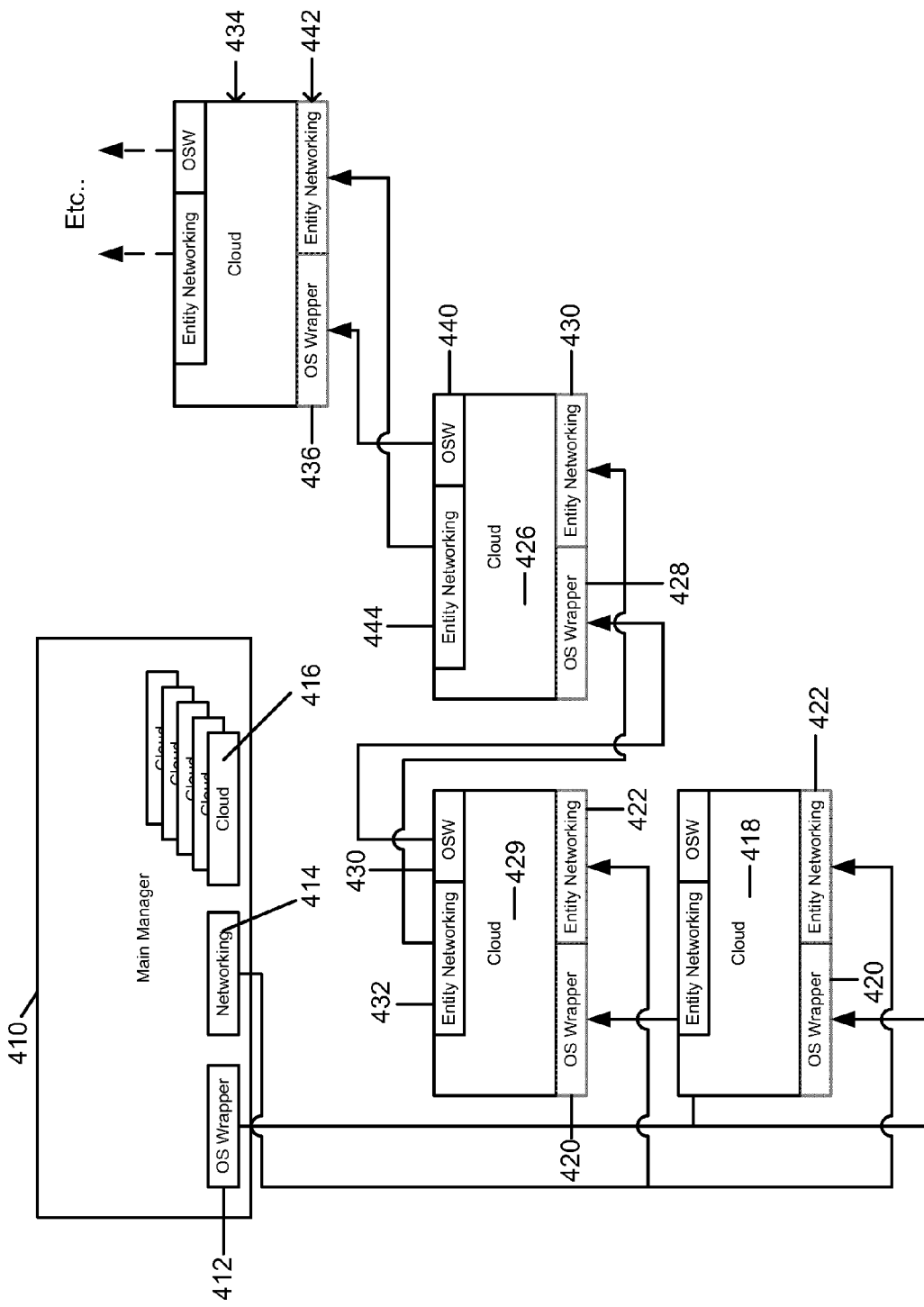
FIG. 17 shows the relationship between software modules in multiple clouds.

The design of the software is shown schematically in FIG. 17. The core contains a Main Manager 410 that creates and initializes all of the subsystems and clouds.

The OSWrapper 412 is a software module that communicates with the underlying device. It provides encrypted file storage and a library of possible objects that new/existing entities can use. The OSWrapper 412 is used to create virtual objects and remote objects. The Networking 414 is a software module that manages all of the communications between devices, it performs: entity lookups; integrity link establishment; message relaying; and device specific encryption.

The cloud 416 is a software module that manages a particular entity and its associated cloud on a device. There is an instance of this module for each cloud. The cloud 416 performs: Cloud specific encryption; Cloud status synchronization; Cloud record synchronization; Object and action messaging; and Cloud integrity link maintenance.

The instance of the cloud 418 shows the layout for a simple cloud on the device. The OSWrapper 420 is obtained directly from the main manager OSWrapper 412. The Entity Networking 422 is obtained from 414.

Cloud 424 is another instance of a cloud managed by the main manager 410. It contains the same software as cloud.

Cloud 426 is a cloud that is built on cloud 424 that is an entity on cloud 426 is in fact cloud 424. Cloud 426 refers to cloud 424 rather than back to the main manager 410. The OSWrapper 428 is obtained from the OSWrapper 430 from cloud 424. Any saved non-user data from cloud 426 is automatically propagated across cloud 424; this includes cloud status but not data from an object data request. The libraries of possible objects that can be added to cloud 426 are those from cloud 424. The Entity Networking 430 is obtained from the entity networking 432 from cloud 424.

Further, cloud 434 is a cloud that is built on cloud 426. The OSWrapper 436 is obtained from the OSWrapper 440 from cloud 426. Any cloud status information from cloud 434 is automatically propagated across to cloud 426. Again, the libraries of possible objects that can be added to cloud 434 are those from cloud 426. The Entity Networking 442 is obtained from the entity networking 444 from cloud 426.

Figure 18:
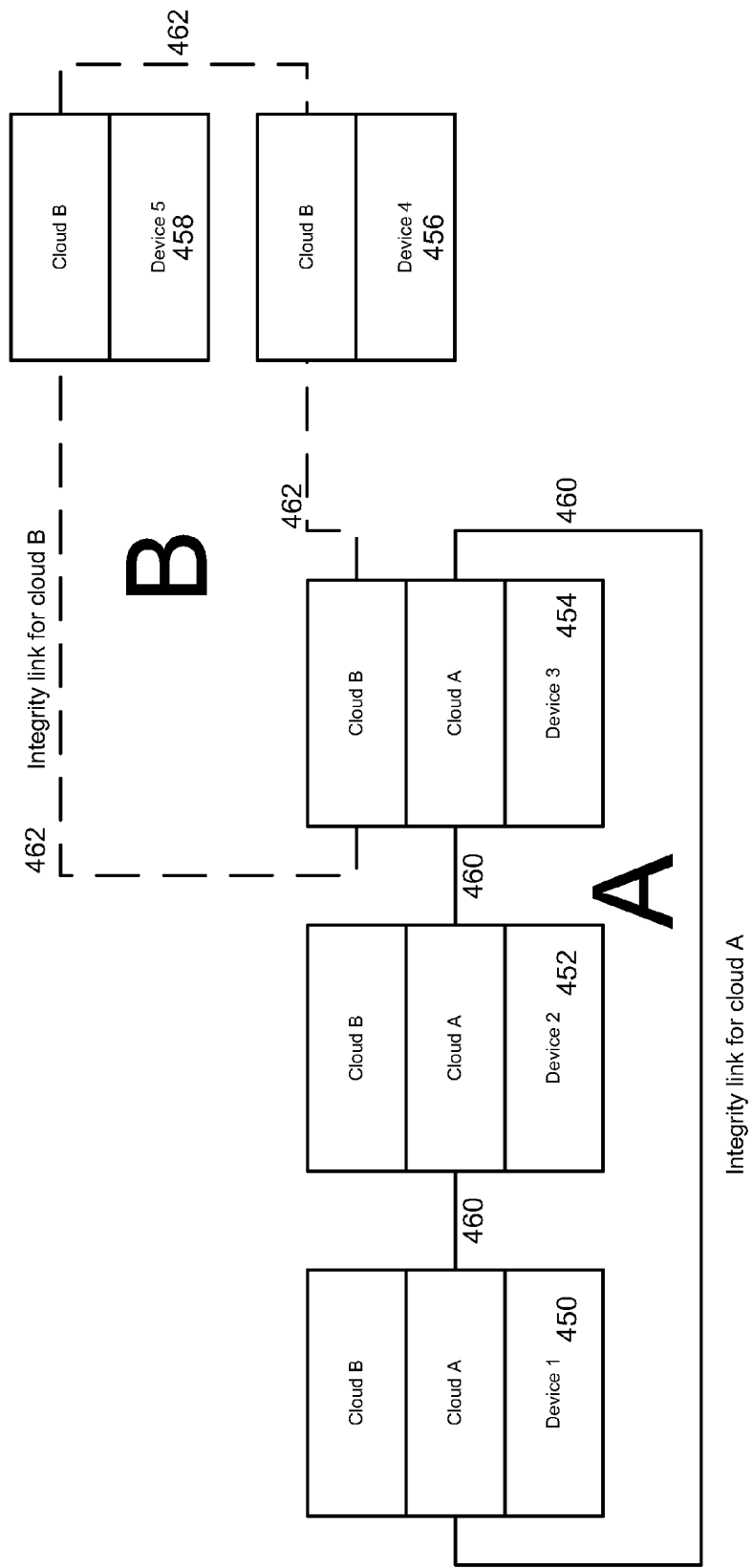
FIGS. 18, 19 and 20 shows examples of the relationship between devices that share multiple clouds.

With reference to FIG. 18, the software in relation to two interconnected clouds will now be described. There are in total five devices and two clouds. Cloud A contains devices (in this case they are also entities) 450, 452 and 454. Cloud B contains devices 454, 456 and 458. The links 460 comprise the integrity link for cloud A. The links 462 comprise the integrity link for cloud B.

If a user on device 450 interacts with cloud B and data needs to be sent to a real object on device 456. Entity networking message is sent from device 450 to Device 456. This message is relayed to the cloud B contact point (device 454) for cloud A.

Figure 19:
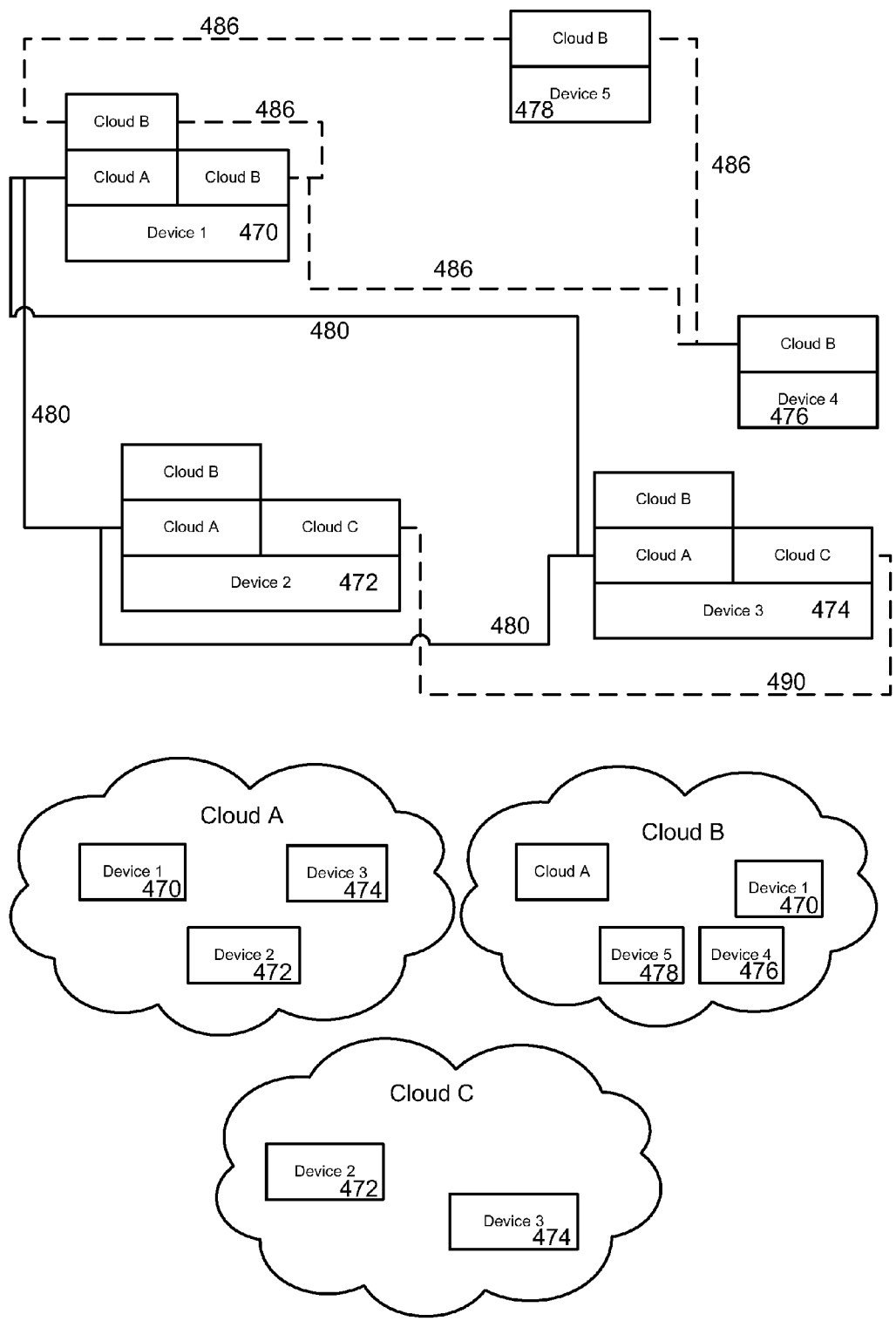

Software and links on three clouds A, B and C spread over five devices 470, 472, 474, 476 and 478 will now be described with reference to the schematic drawing of FIG. 19.

Cloud A is comprised of entities existing on devices 470, 472 and 474. Cloud B is comprised from entities existing on device 470, device 476, device 478, and Cloud A. Cloud C is made from entities existing on device 472 and device 474.

The integrity link for Cloud A is comprised of the links 480 that connect device 470 to device 474, device 470 to device 472, and finally device 472 to device 474. The integrity link for Cloud B is comprised of links 486 that connect cloud A to Device 478, cloud A to device 470, device 470 to device 476, and device 4 to device 478. Finally, the integrity link for cloud C is link 490 that links device 472 to device 474.

Figure 20:
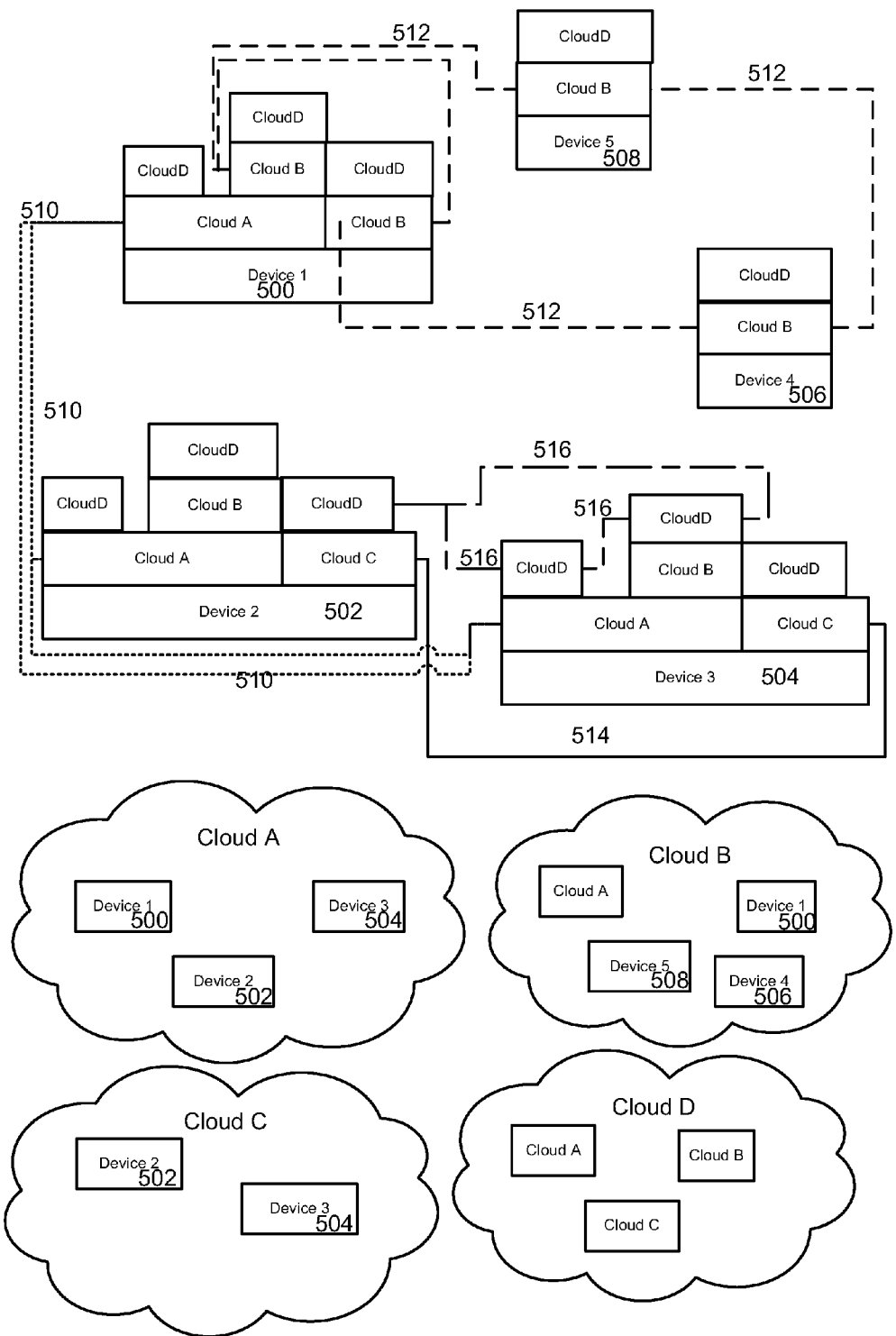
Figure 23:

Software and links on a further example will now be described with reference to FIG. 20. In this example there are four clouds A, B, C and D.

Cloud A contains devices 500, 502 and 504. Cloud B contains device 500, 506, 508 and Cloud A. Cloud C contains devices 502 and 504. Finally, cloud D contains cloud A, cloud B and cloud C. Links 510 comprise the integrity links for cloud A. Links 512 form the integrity link for cloud B. Links 514 form the integrity link for cloud C. Finally, the links 516 form the integrity link for cloud D.

An application of the clouds set out in FIG. 20 may be as follows: Cloud A=Boss's work cloud; Device 500=Boss's office PC; Device 502=Boss's Mobile phone; and Device 504=Boss's Laptop. Cloud B=Boss's Sharing cloud; Cloud A=Boss's work cloud (Allows access to shared content from this cloud); Device 500=Boss's office PC (Allows access to content on PC that may not have been shared as part of Cloud A); Device 506=Receptionists PC (Allows access to Boss's schedule etc.); and Device 508=Assistants PC; Cloud C=Boss's private cloud between his mobile 502 and laptop 504; and Cloud D=Administrators cloud (It is possible to have no private data accessible to this cloud from it's members, and this may allow only access to device maintenance and monitoring objects).

An example of using the software will now be described with reference to FIGS. 21 to 47.

Figures 21, 22:
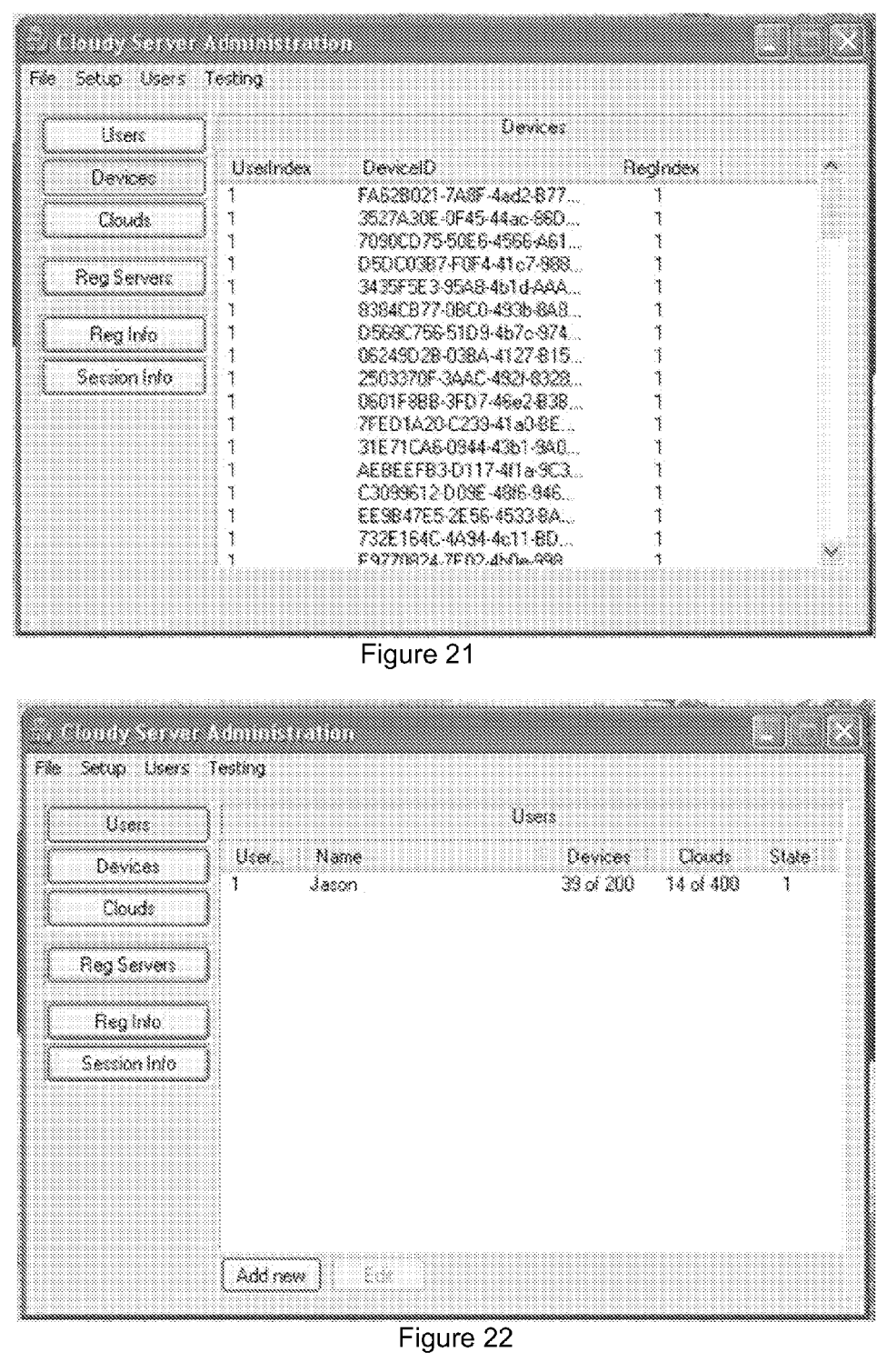

FIG. 21 shows the GUI for the lookup point GUI. For example, this could be the interface presented to the user of the server that operates the lookup point 104 of FIG. 2. In this GUI, the devices registered with the Cloudy administrator are registered with the system.

FIG. 22 shows the same GUI but in this case all the users registered with the administrator are displayed. Here, there is one user "Jason" that is registered and they are associated with 39 of the 200 devices and 14 of the 400 clouds. This means that the user "Jason" is able to register 200 separate devices with the lookup point, and create 400 clouds using those devices. Currently, 39 devices have been registered along with 14 clouds.

From the user's perspective the interface presented to them on their device, which could be any of the devices discussed above, is shown in FIG. 23. In this example the device is a personal computer and is referred to as "TELPAC-DEV". This is the introduction/welcome screen for the user.

Figure 24:

If the user is already registered with the lookup point the user can select "Old" to indicate that they are an existing user. As shown in FIG. 24 they are prompted to enter their username and password. Once the user clicks "OK" this information is then sent to the lookup point as previously discussed with reference to FIG. 12. The device then receives from the lookup point a key that unlocks the application on the device. Now the full functionality of the software application on the device is available to the user.

Figure 25:
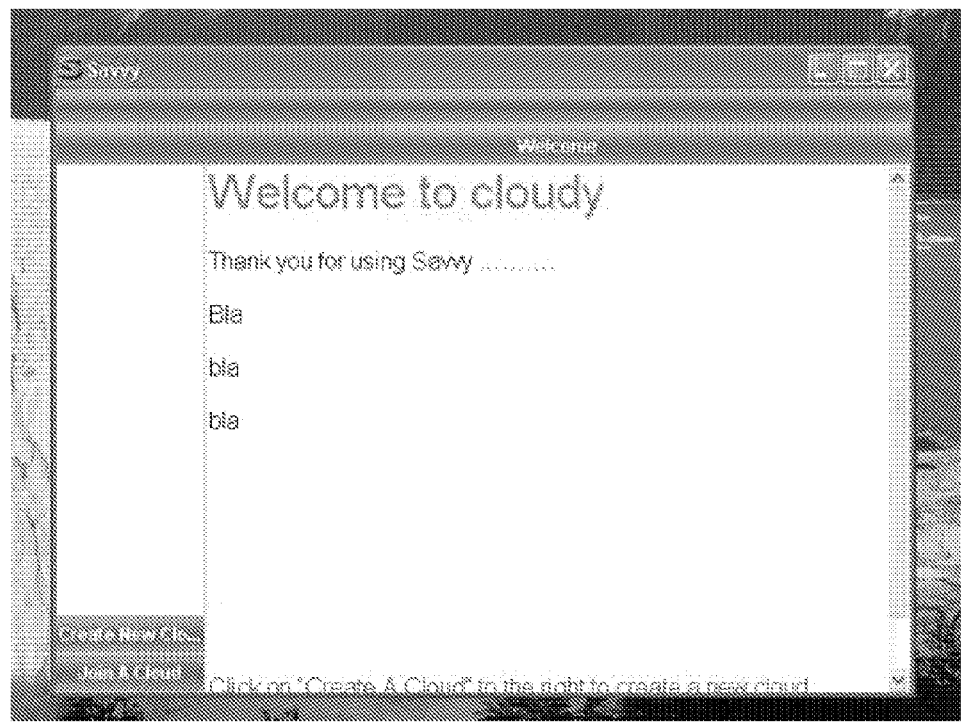
Figure 26:
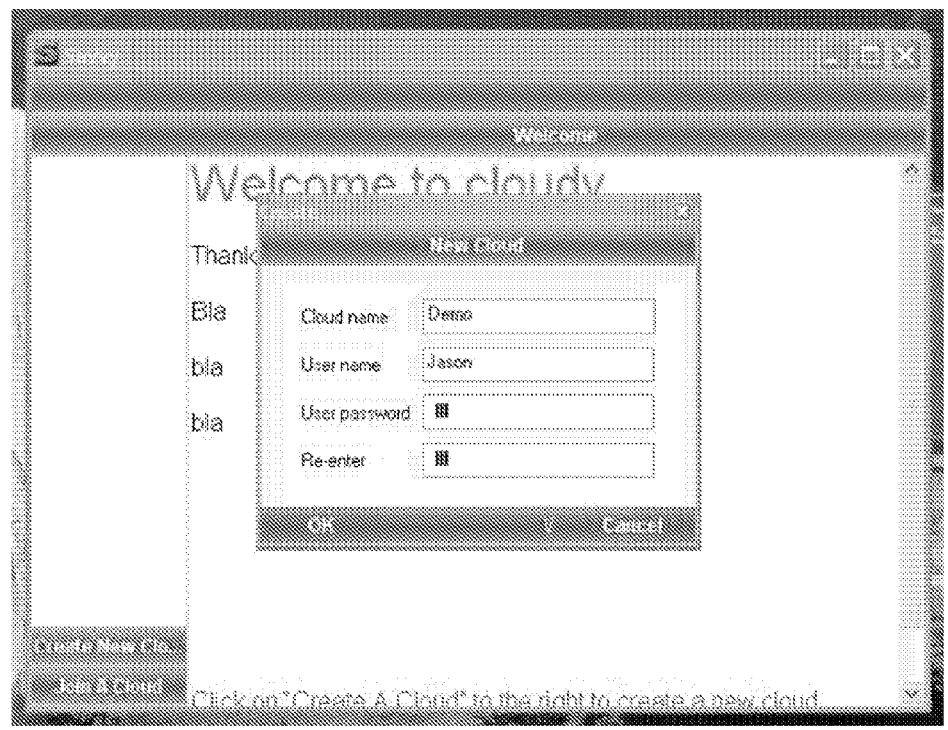

As shown in FIG. 25 the application is running but the device is not connected to any clouds. To create a cloud the user selects "Create New Cloud" and the dialog box appears as shown in FIG. 26. The user enters the name of the cloud, their user name and their password. This registers the new cloud Demo with the lookup point.

Figure 27:
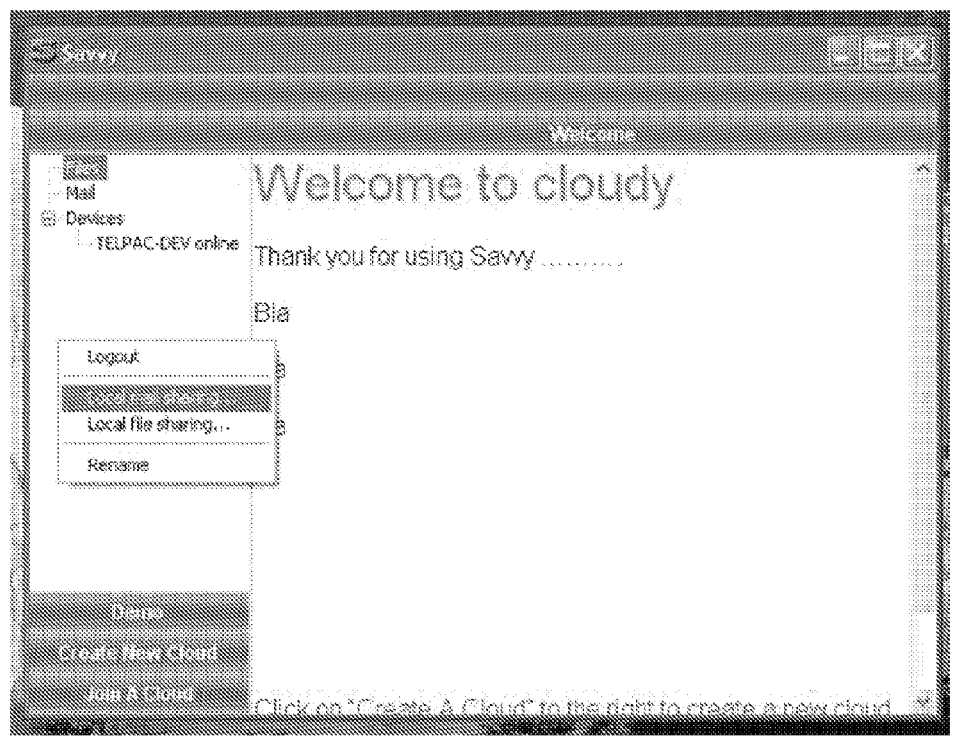
Figure 28:
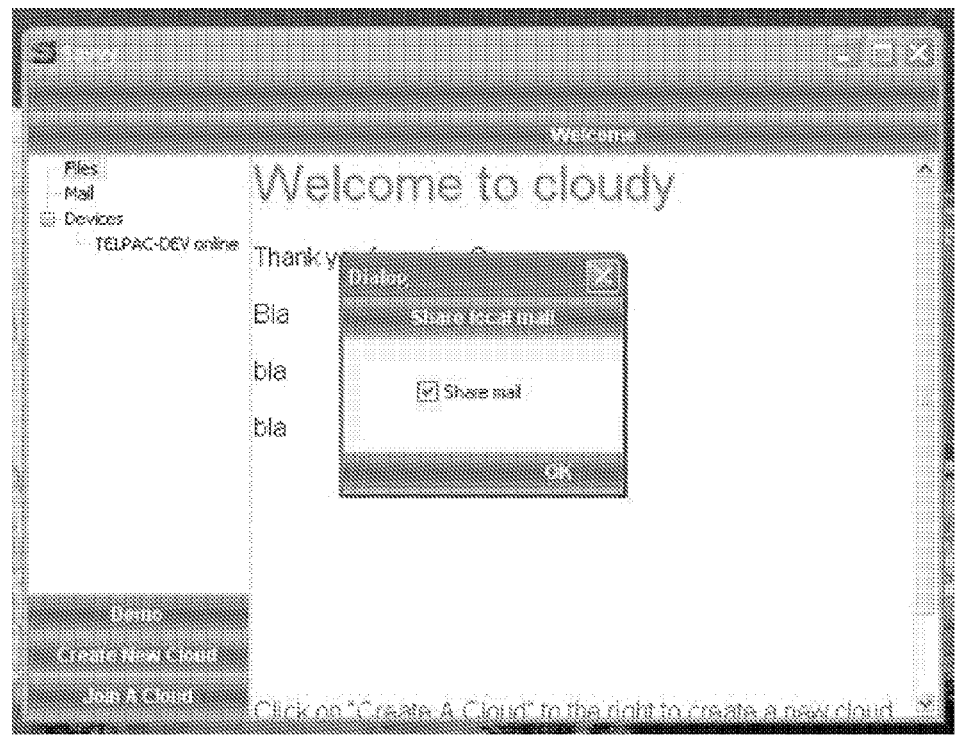

The display is synchronized with the lookup point to cause a summary of the cloud Demo to be displayed to the user as a expandable tree as shown in FIG. 27. Here the cloud is comprised of three objects: files, mail and devices. Currently no content is shared and TELPAC-DEV is the only device on the cloud.

Figure 29:
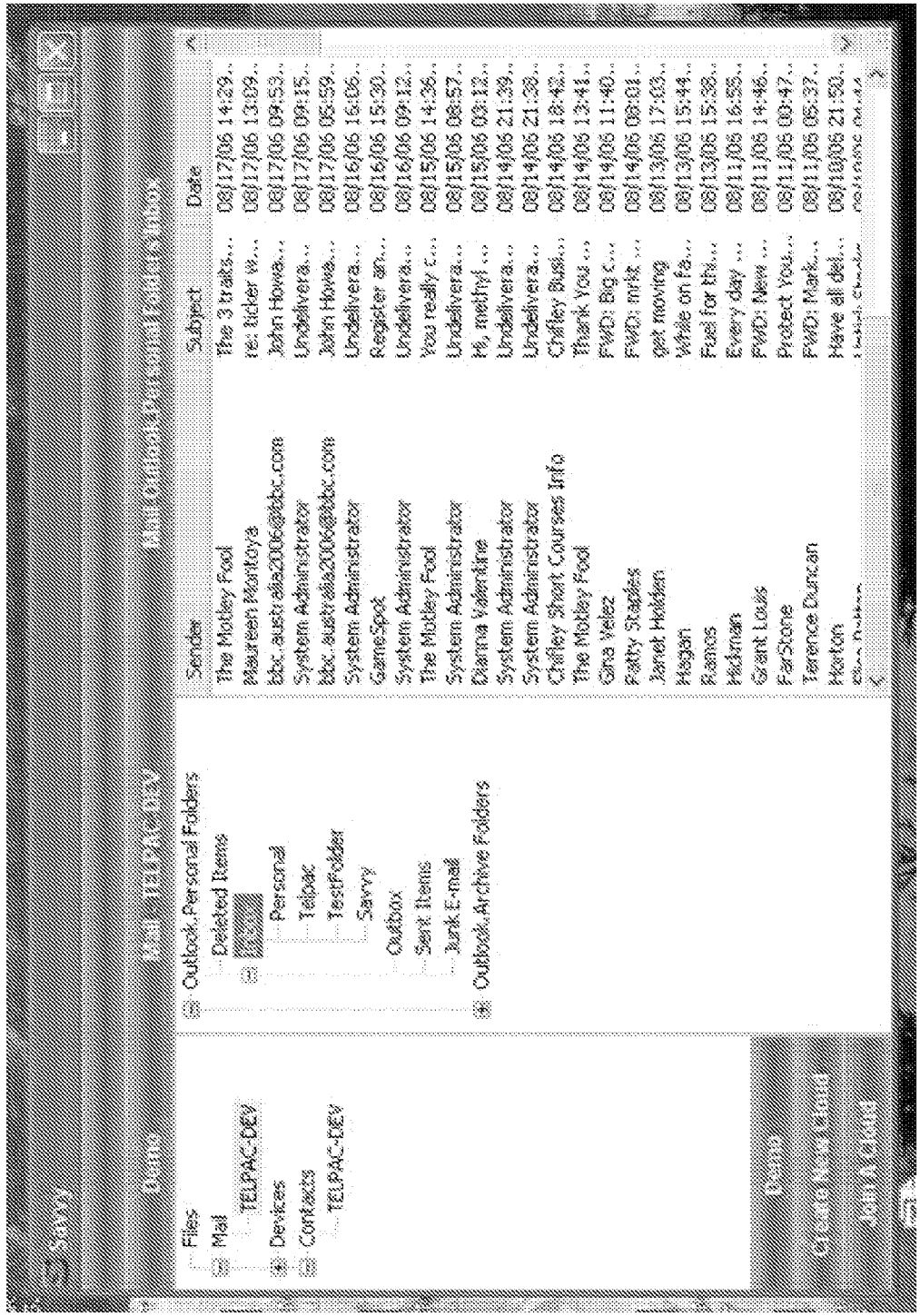

If the user wishes to share their mail on the Demo cloud they select "local mail sharing" a pop up box that appears by clicking on summary of the Demo cloud. This causes the dialog box of FIG. 28 to appear and the user selects the check box "Share mail". This causes the device name "TELPAC-DEV" to be listed under the "Mail" heading in the summary of the Demo cloud as shown in FIG. 29. By selecting TELPAC-DEV under the "Mail" heading a summary of the mail available on TELPAC-DEV is displayed on the right hand side of the interface. Using the summary the user can navigate around the mail folders stored on TELPAC-DEV.

Figure 30:
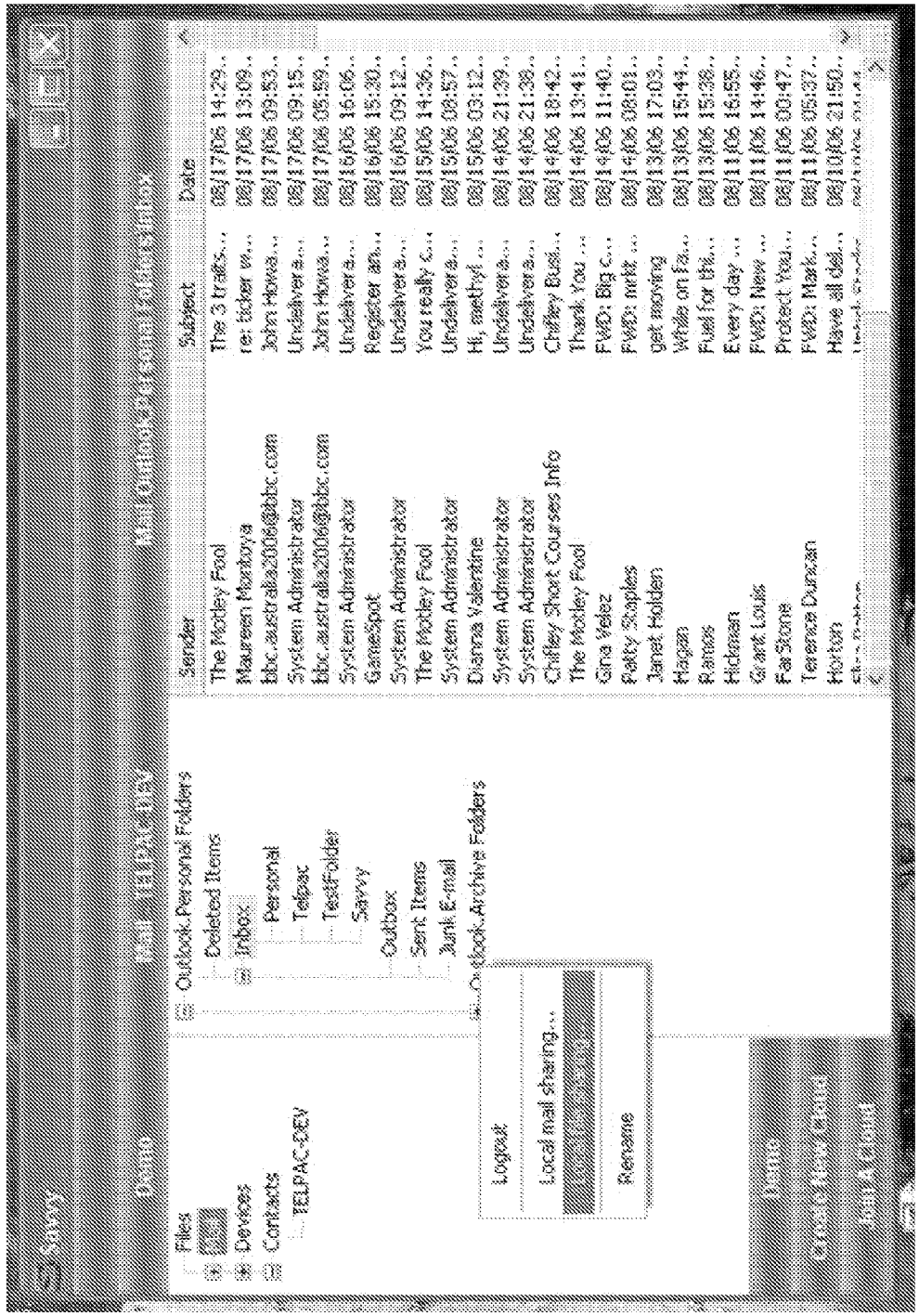
Figure 31:
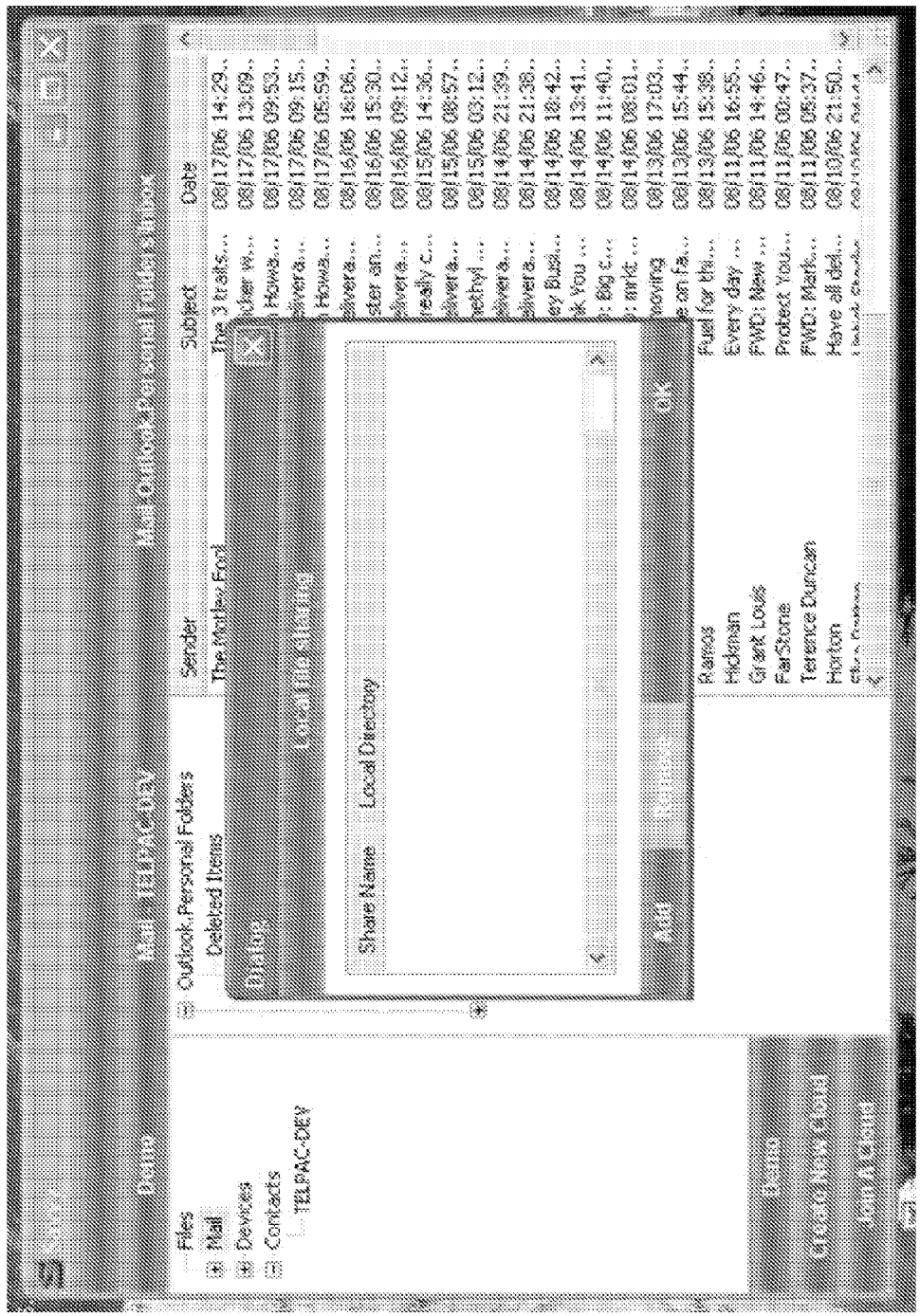
Figure 32:
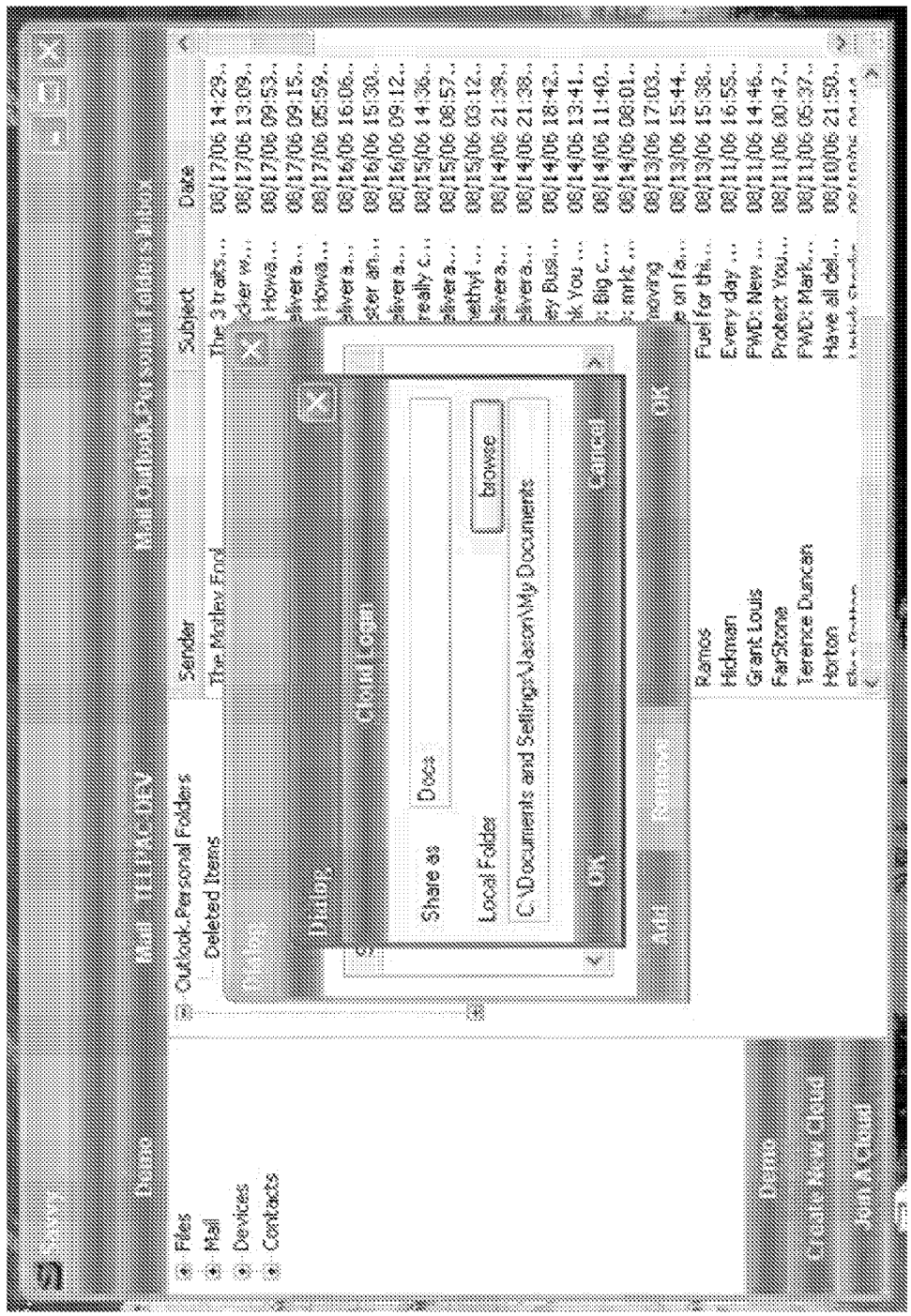
Figure 33:
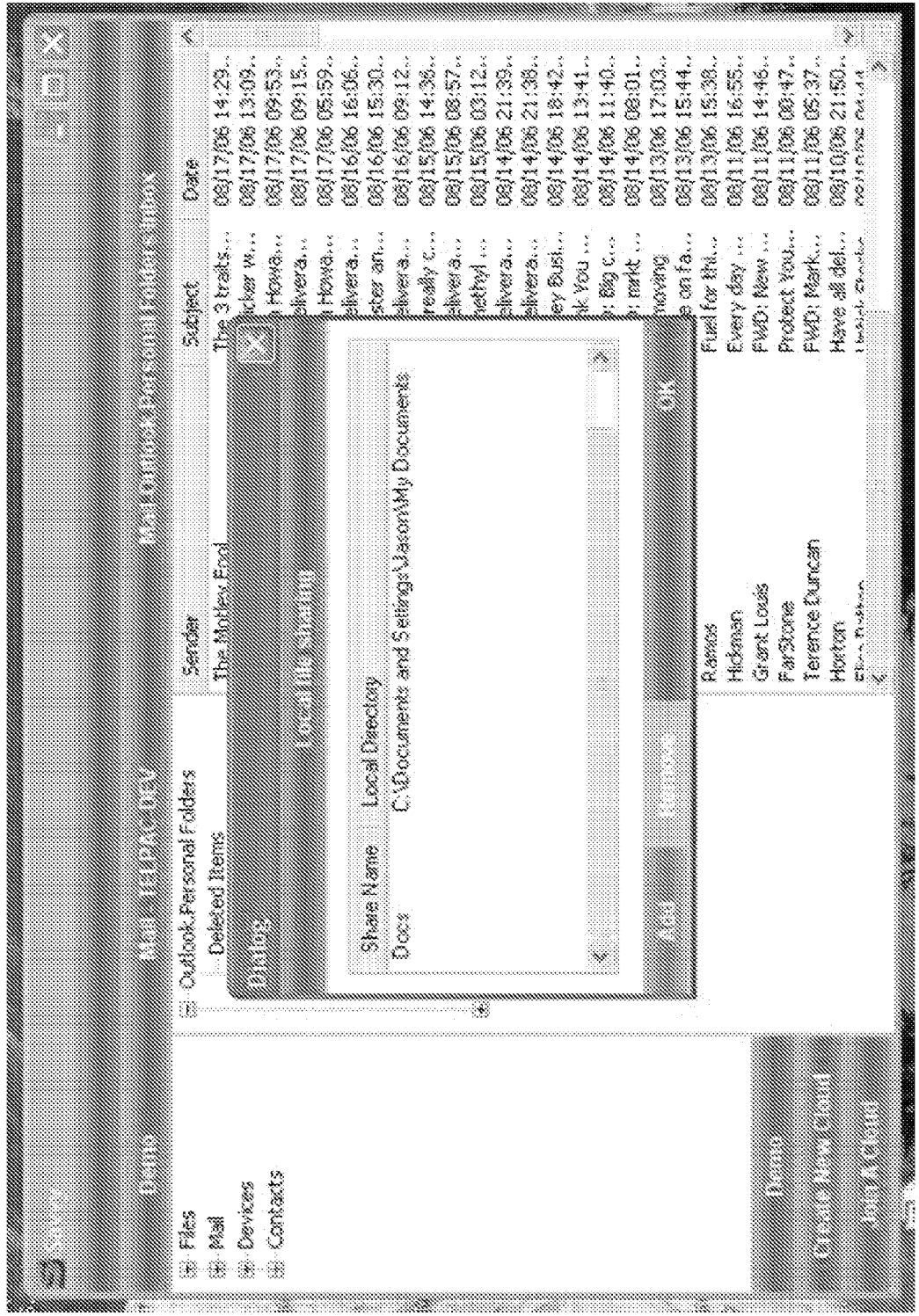
Figure 34:
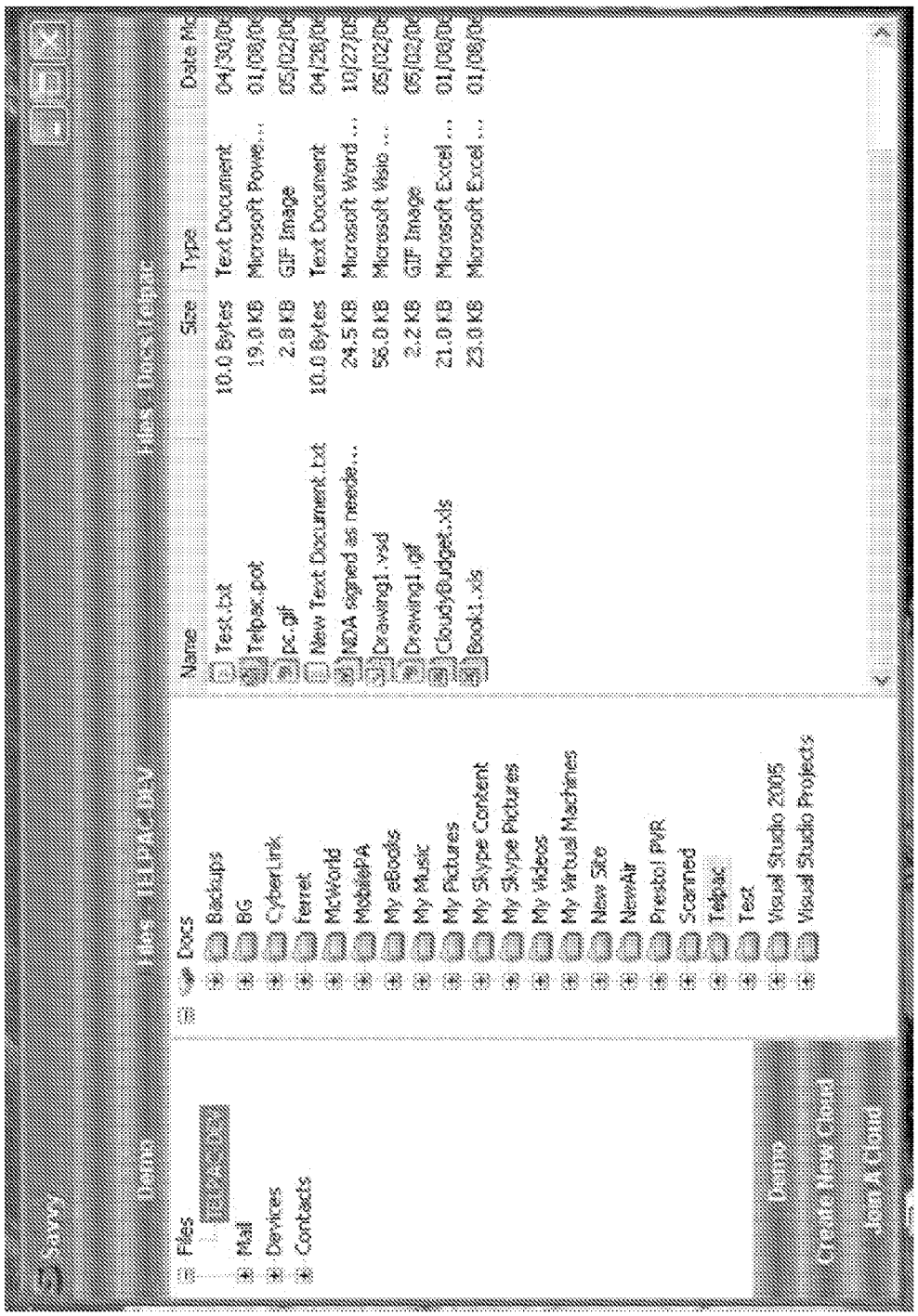

The user can also share files. As shown in FIG. 30 by clicking on the Demo cloud summary the user can select the option "local file sharing". This causes the dialog box of FIG. 31 to be displayed. The user can select "Add" from the dialog box causing the dialog box shown in FIG. 32 to be displayed. Here the user enters the title the files should be listed in the summary as, and in this example the name "Docs" is chosen. The user is also able to browse to select the folder to be shared. In this example the folder is identified by the path name "C:\Documents and Settings\Jason\My Documents". The user selects "OK" to return the user to the dialog box of FIG. 31, but, as shown in FIG. 33 the selected folder and share name is listed in the dialogue box. By selecting "OK" in the dialogue box, the folder is now made available on the cloud. This is shown in the updated summary of the Demo cloud shown in FIG. 34 where TELPAC-DEV device is listed under the heading "Files". A summary of the folders that are shared by TELPAC_DEV is/are displayed on the right hand side of the interface.

The user may also use the cloudy application from a different device. In the following example the user is now using a PDA called WM Jason. Interfaces that may be presented to the user on the PDA will now be described.

The user is presented with a welcome screen as shown in FIG. 35. Similarly to FIG. 24 the user must login to unlock the application as shown in FIG. 36.

Figure 39:
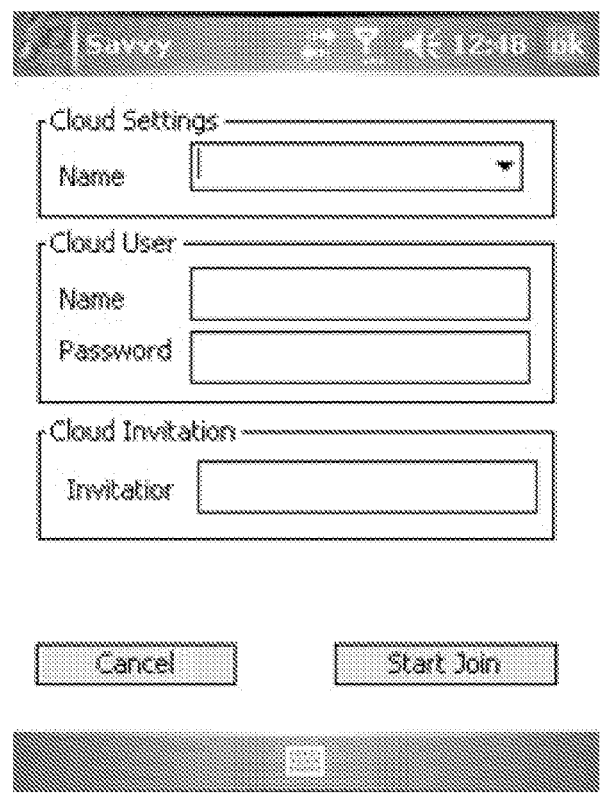
Figure 40:
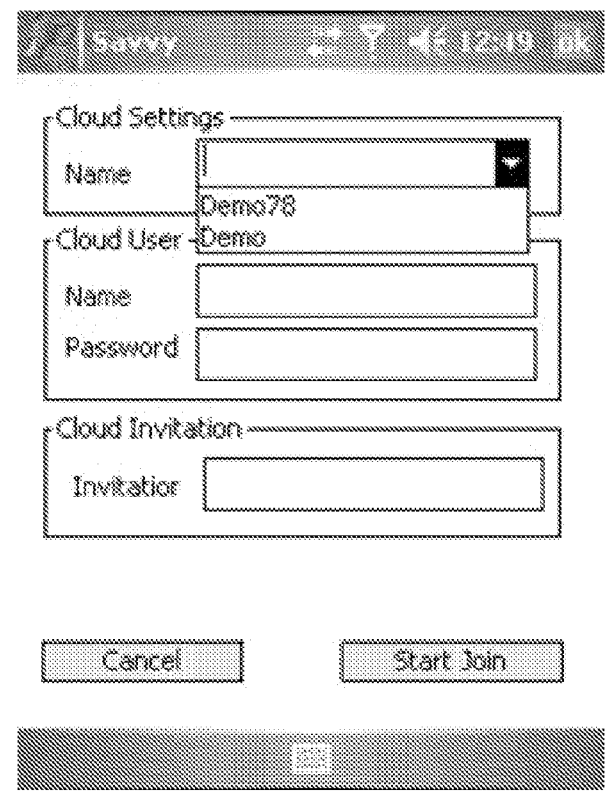

As shown in FIG. 37 once logged in no content is visible as the user has not yet registered with a cloud. The steps of registering with the cloud is shown in FIGS. 38, 39 and 40. As described with reference to FIG. 14, firstly the user selects to "join a cloud" and enters the cloud name (which can be from a pick list created from the inner join), their user name on the cloud, their password and cloud invite number. In this case the user has selected to join the cloud called "Demo".

The user's device automatically joins the cloud by creating an integrity link to one or more devices in the cloud and the status of the cloud are then synchronized over this link. This synchronization causes the data that is already available on the cloud to be accessible by the device.

Figure 41:
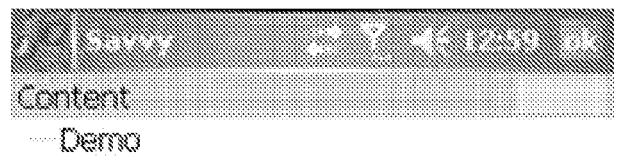
Figure 42:
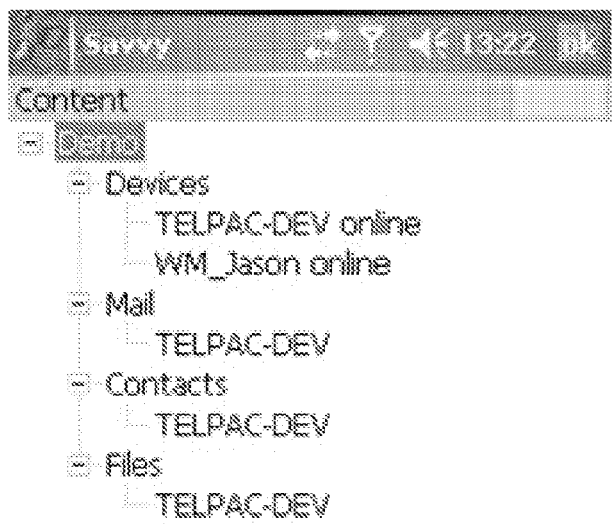

As shown in FIG. 41 the cloud Demo has content is available. By clicking on heading Demo the content tree list is expanded as shown in FIG. 42. This shows that on the cloud Demo has two Devices that are connected—that is devices "TELPAC_DEV" and "WM-Jason". From the device TELPAC-DEV that is connected to the cloud mail, contacts and files are available.

Figures 43, 44:

FIG. 43 shows how the content on the TELPAC-DEV can be navigated using the interface on the device. "TELPAC-DEV" under the "Files" heading can be selected to display a tree diagram of the folder shared under the name "Docs" and all the subfolders listed underneath. If the subfolder "Telpac" (not shown) is selected then a list of documents included in that folder is then displayed as shown in FIG. 44. By selecting any one of these documents, the document will be downloaded to the device from TELPAC-DEV device using, preferably, a direct data link between the two devices.

Figure 45:
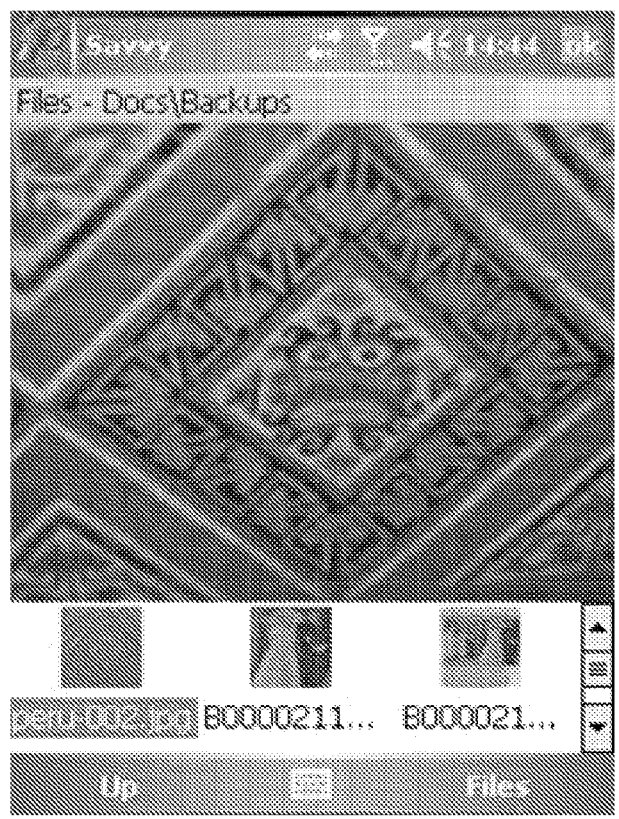

As a further example the user can select the folder "backups" from which contains graphic files that can be viewed on the device as shown in FIG. 45.

Figure 46:
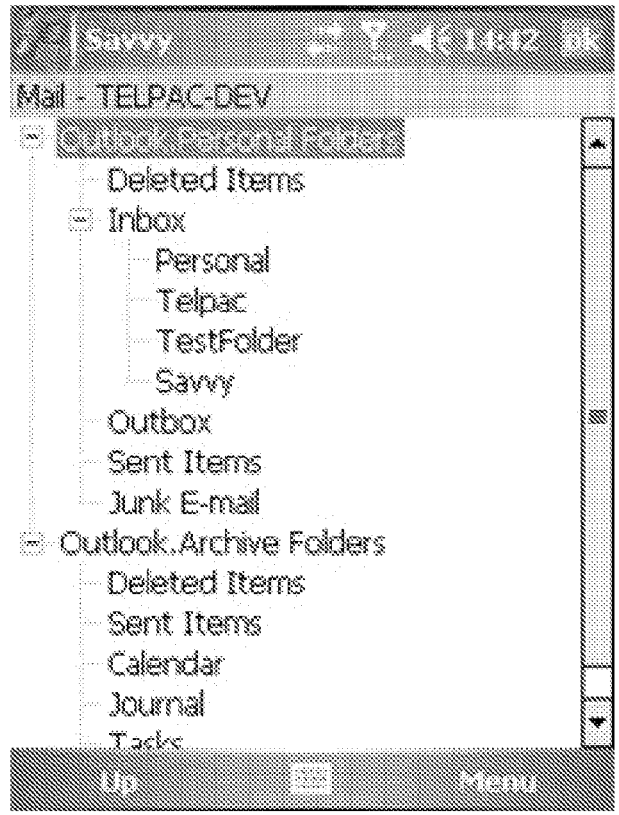
Figure 47:
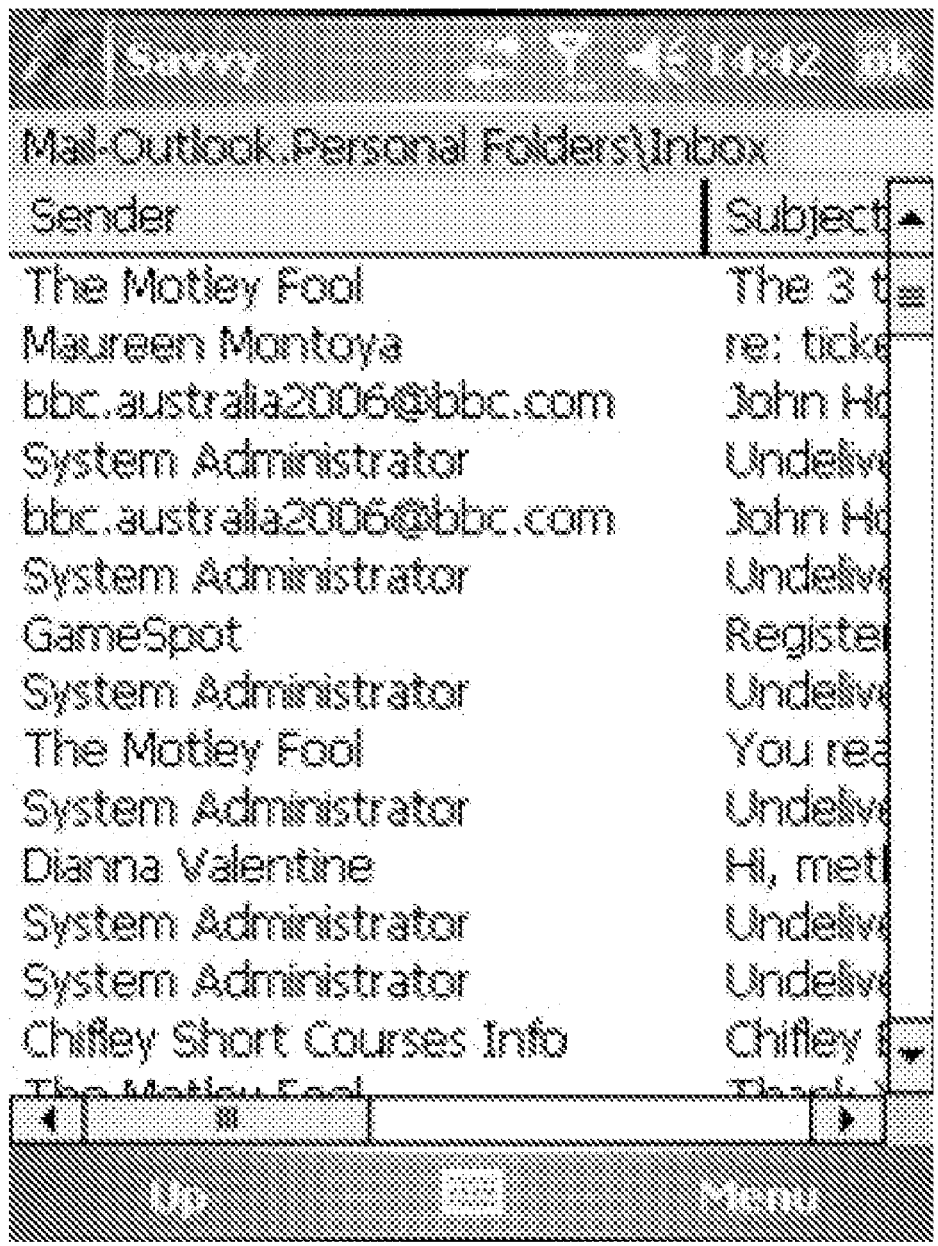

Referring back to FIG. 42, TELPAC-DEV under the mail heading can be selected and this presents the user with a summary of the mail folders on TELPAC-DEV that have been shared as shown in FIG. 46. Using the summary tree a folder can be selected to present the user with details of the summary of the e-mails that can be accessed using the cloud as shown in FIG. 47.

It will be appreciated by persons skilled in the art that numerous variations and/or modifications may be made to the invention as shown in the specific embodiments without departing from the spirit or scope of the invention as broadly described.

For example, the shared interface viewed by entities on a cloud could be presented artistically in way, say, a person navigates through a house to select devices such as bookshelves and TV's to access to shared content therein.

EXAMPLES

Some additional embodiments and examples are now provided.

Figure 48:
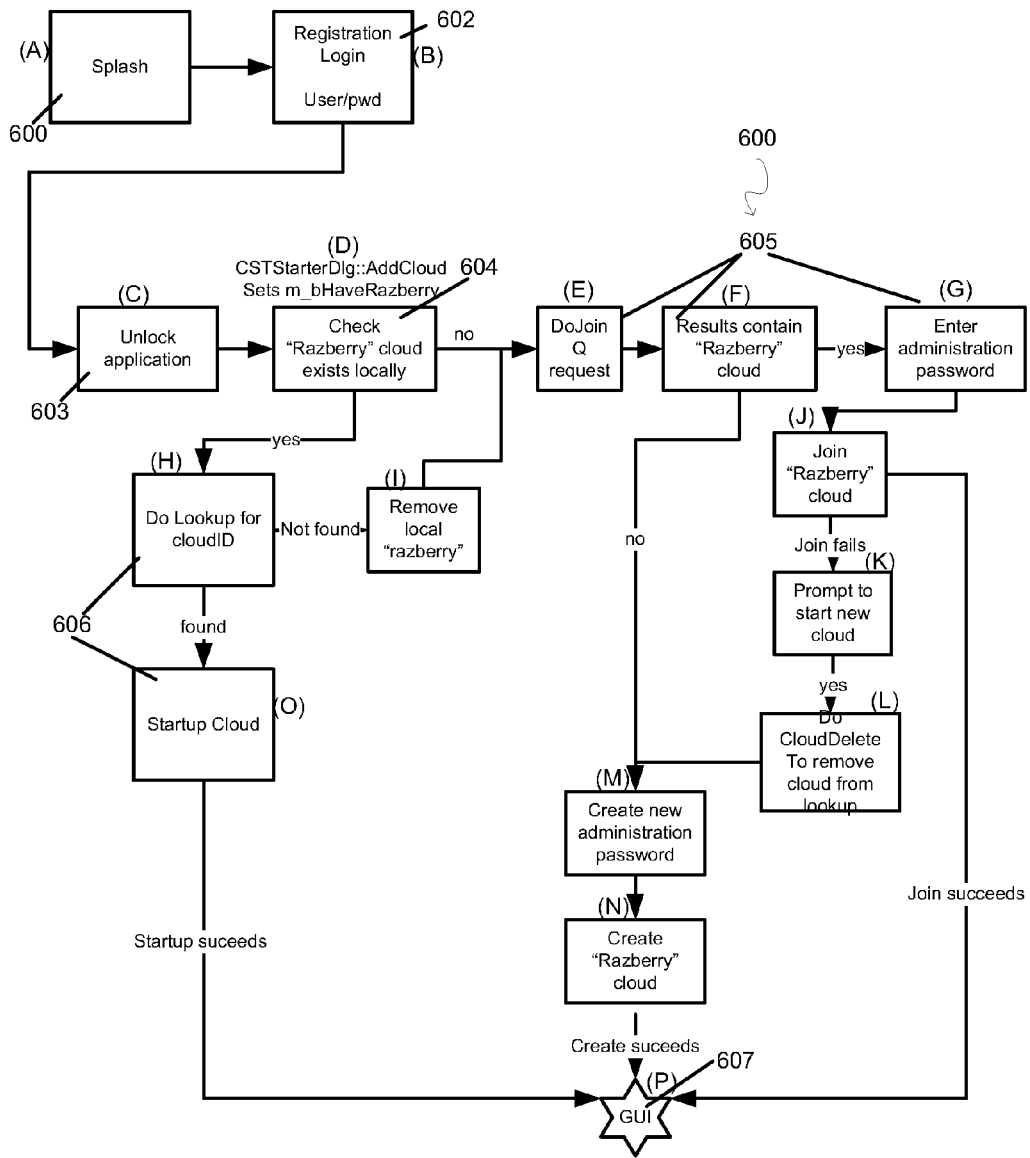
FIG. 48 shows a flowchart of a start-up procedure.
Figure 49:
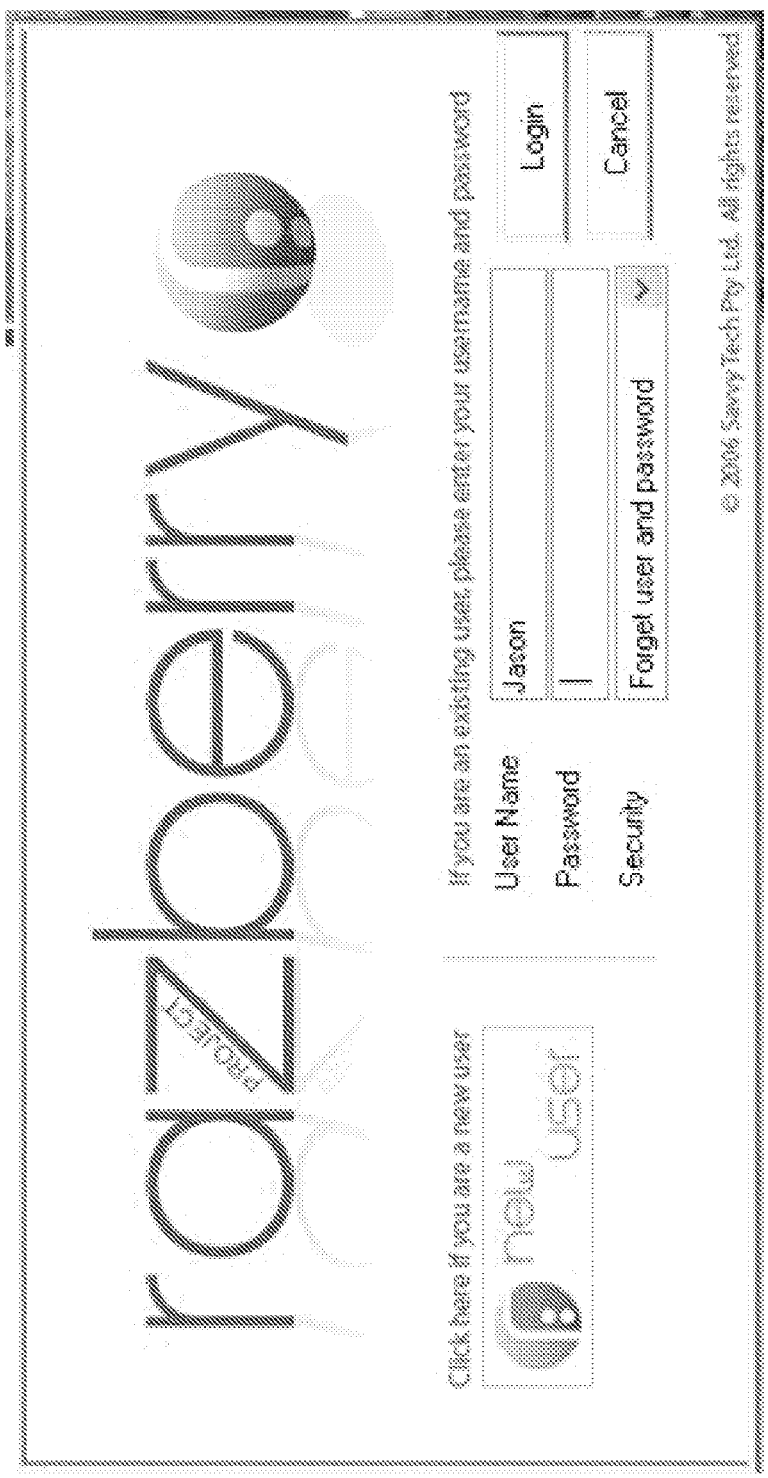
FIG. 49 gives an example of a logon screen.

In FIG. 48, a flowchart (600) is used to outline the start-up procedure of the application, which in this embodiment is called "Razberry". The start up is automated in this embodiment. When the application is initiated on a device, a splash screen (601—"A") is displayed, followed by a registration screen (602—"B"), where a user must enter a user name and a password in order to proceed; these details being confirmed by the program from a lookup of this stored information. An example of a login screen is shown in FIG. 49. The login screen may also have a facility to manage a user forgetting their user details, as shown in FIG. 49.

Once the user successfully unlocks the application (603—"C"), using security information returned from the lookup following a successful registration (refer to FIG. 50 for more detail), then the application checks to see if the initial "Razberry" cloud is available on the device (604—"D"). If not (605), the user is invited to create this cloud. If the initial cloud is already available on the device, this starts (606). Once this occurs a GUI is displayed (607), allowing the user to utilise the "Razberry" application.

A check of the unlocked data is made ("D"), to see if the "Razberry" cloud has already been set up on this device. The device has not yet joined the "Razberry" cloud ("E") so a request from the lookup is performed to find out which clouds the current registered user has. (Refer FIG. 51 for more detail). The results are checked ("F"), to see if a "Razberry" cloud has previously been created. If it has ("G"), then an administration password can entered by the user or a fixed one can be used by the application. This password is needed to add a new device to a cloud. The unique Cloud ID is checked ("H") with the look-up. Whenever Cloud ID check fails ("I"), the local Razberry Cloud data is removed. A join is performed by the application ("J") to try and join the Razberry Cloud. If the join fails ("K") the user is then prompted to start a new cloud. If the user chooses to start a new cloud ("L") then the look-up is told to delete the exiting cloud. A new administration password is set ("M") by the user or application. The Razberry cloud is created ("N") using the new administration password. The existing Cloud is started up ("O") using the locally stored data.

Figure 50:
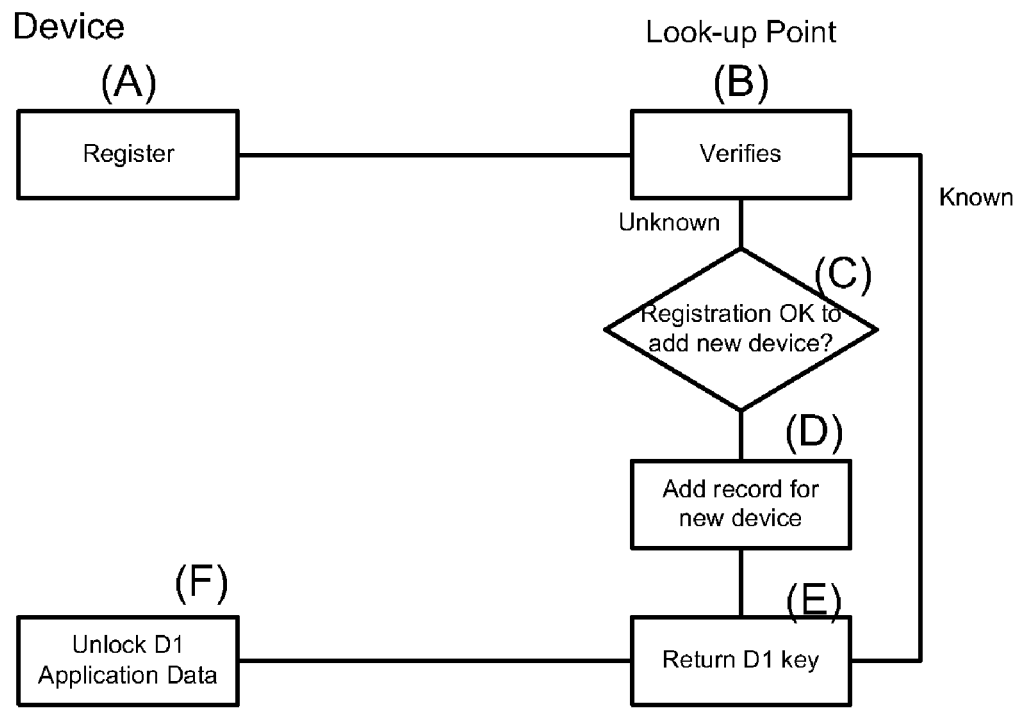
FIG. 50 shows a flowchart of a device start-up procedure.

As explained above, the cloud includes a number of devices, and details of the registration of each device, is illustrated in a flowchart, as shown in FIG. 50.

A device registers ("A") with the look-up by passing a unique randomly generated ID for the device along with the registration user name and password. The look-up checks the users registration ("B") to confirm that this device is registered under this user. Whenever this is an unknown device for the current user ("C"), then the look-up checks the registration details for this user to see if they are able to add a new device. If a new device can be added ("D"), a new registration record is created for this device, on the look-up. The new registration record contains a randomly created security key. The randomly created security key is returned to device ("E"). The device unlocks its local cloud application data ("F") using the randomly created security key.

Figure 51:
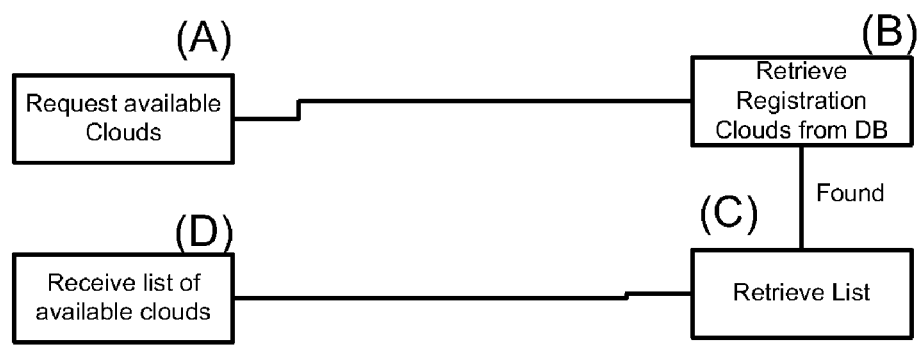
FIG. 51 shows a flowchart of a procedure for a join lookup request.

As well, a user may have access to a number of clouds, and the procedure for obtaining their list is shown as FIG. 51. The device requests a list ("A") of available clouds tied to a user's registration. The loop-up receives the request ("B") and retrieves the list of clouds registered for the requesting devices registration. The list is returned ("C") to the requesting device. The list of available clouds ("D") is received by the device.

Figure 52:
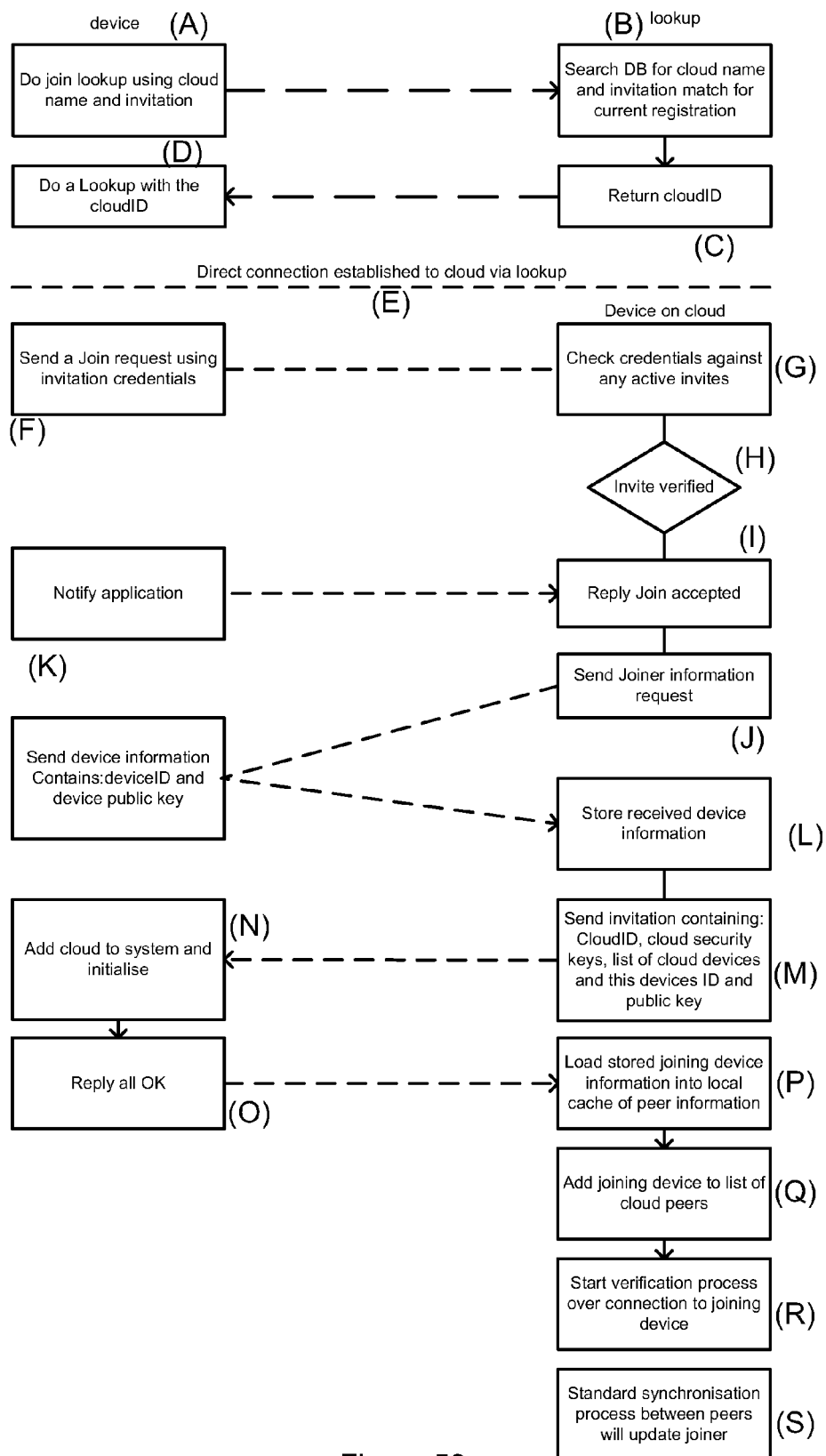
FIG. 52 illustrates a cloud join process using a flowchart.

A process for allowing a user to join the clouds that they have permission to access is shown in FIG. 52. The cloud name and invitation are sent ("A") to the look-up to do a join look-up. The look-up searches the registered clouds ("B") for a match against the cloud name and invitation for the current registration. The unique cloud identifier for the matched cloud ("C") is returned to the device. The device receives the cloud id ("D") and performs a look-up using that id. A direct connection is established ("E") to the cloud via the Look-up (refer FIG. 59).

A join request is sent to the contact device for the cloud ("F"). The contact device is the current device registered with the preferred initial point of contact with the cloud. This request contains the cloud name, invitation name and user-name/password for an invitation into the cloud. The received cloud joining credentials ("G") are checked against any active invitations for the cloud. The invitation ("H") is verified by matching the cloud name, invitation and user name/password. A reply ("I") that the joining is accepted is sent to the joiner. A request ("J") to the joiner for its device information is sent. The device information ("K") is sent back to the cloud contact device. This information contains the identifier for the device joining and the public key for the joining device. The received device information ("L") is stored in memory. An invitation ("M") is set back to the joiner containing the cloud identifier, cloud security keys, a list of the current device ids for the devices on this cloud and the public key of this device. The joiner adds the cloud ("N") to the application data and starts up and initializes the cloud. The joiner ("O") replies to the cloud contact device that all is ok.

The cloud contact device ("P") receives the ok and loads the joiner's information that is stored in memory into the application data. The joining device ("Q") is added the list of devices for this cloud. A verification process ("R") is commenced between the joiner and the cloud contact device The standard synchronization process ("S") between peers updates the joiner with the security keys of the other devices on the cloud along with the device and object records for the cloud.

Figure 53:
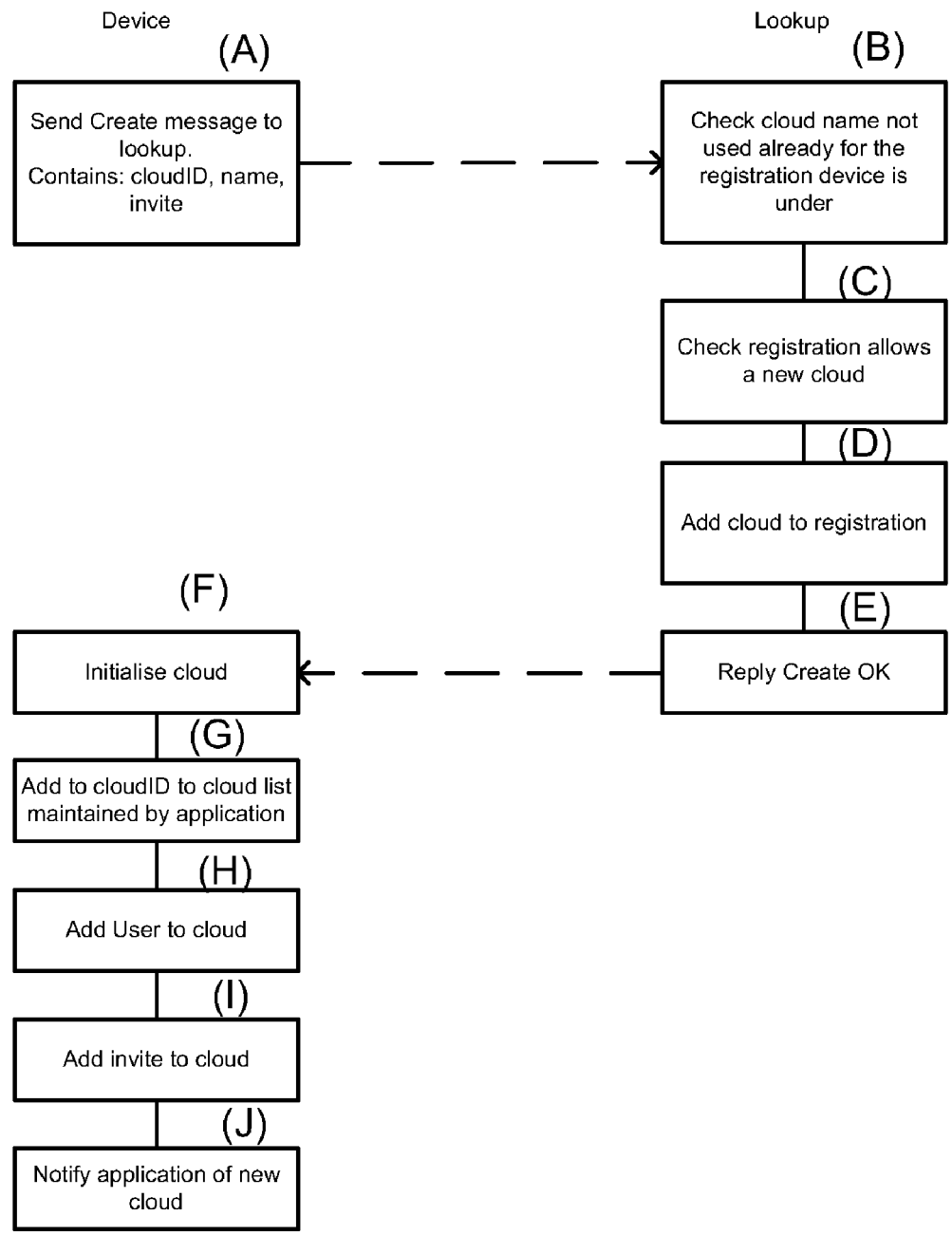
FIG. 53 shows a flowchart of a cloud join procedure.

A process for having a user to create a cloud is shown in FIG. 53. A create message ("A") is sent by the device to the look-up containing the unique identifier for the cloud, the name of the cloud and the invitation to be used to join this cloud. The look-up ("B") checks that the cloud name is not already used for the registration that the device is under. The same name can only be used for each registration. The look-up checks ("C") that the current registration allows the creation of a new cloud. A record ("D") of the cloud is added to the registration database. The device ("E") is told by the look-up that they are allowed to create the cloud. Device ("F") proceeds to start-up and initialize the cloud. Each device ("G") contains a list of the unique identifiers for the clouds that it is a member of. This list is updated with the new cloud identifier. A user is added to cloud ("H"). An invitation ("I") is added to the cloud which allows other devices to join this cloud. The creation of a new cloud ("J") is notified to the GUI for presentation to the user.

Figure 54:
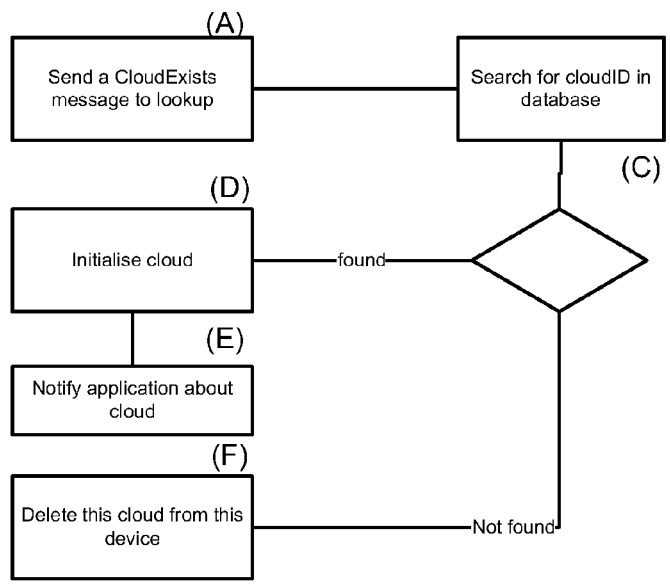
FIG. 54 shows a flowchart of a cloud start-up procedure.

Once the clouds that the user can access are determined, the contents for each cloud can be made available to the user. A flowchart for the start-up process for each cloud that is registered on a device is provided in FIG. 54. The device ("A") sends a message to the look-up asking it to confirm if a particular cloud unique identifier is registered with the look-up. A list of the unique cloud identifiers is stored by the application on each device for clouds that the device is a member of. The look-up ("B") searches for the cloud identifier in its database. The device ("C") is returned the result of the look-up. Whenever the unique cloud identifier ("D") is found on the look-up then the device proceeds to initialize the cloud. The GUI is notified ("E") about the cloud being available for presentation to the user. If the cloud unique identifier ("F") was not found on the look-up then the cloud is deleted from this device.

Figure 55:
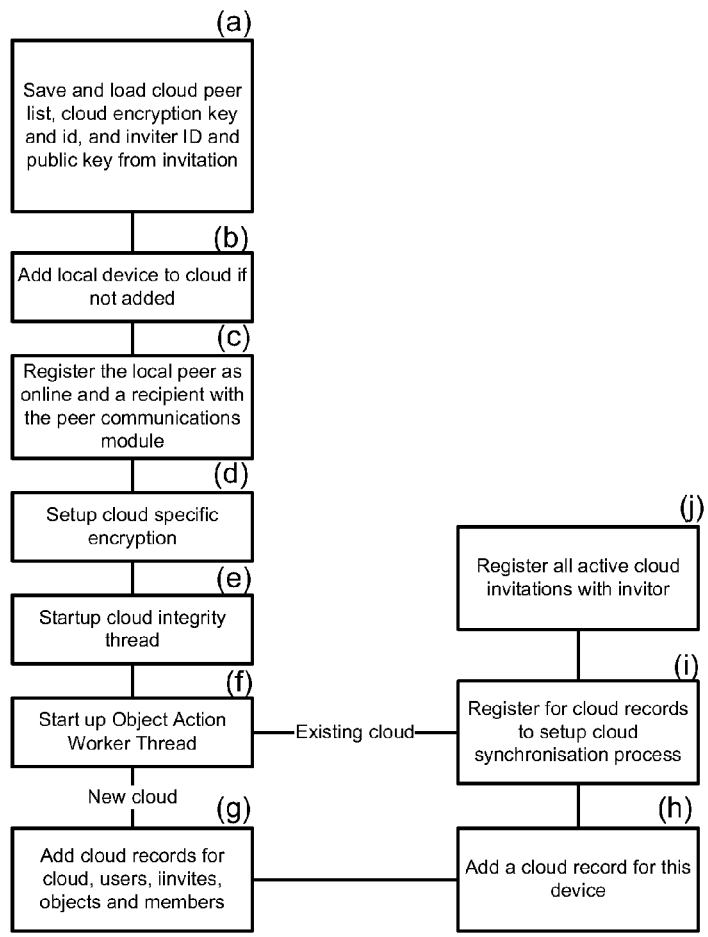
FIG. 55 shows a flowchart of a cloud initialisation procedure.

An initialisation procedure flowchart is provided in FIG. 55. For each cloud already registered on a device, then a message to this effect is sent ("A") to the look-up. The cloud id is found ("B") in the lookup database. If found ("C") a cloud is initialised ("D"). Each cloud ("D") has a unique symmetrical encryption key which is used for cloud specific communications. Each cloud ("E") has a integrity thread that is used to maintain the integrity of the cloud, which includes: synchronization of cloud data; maintenance of cloud state data; maintenance of cloud integrity circle; and maintenance of cloud security. Each cloud ("F") contains an object action worker thread that is used to process action requests for objects on this device. For a new cloud ("G"), cloud records are then added for the cloud, users, invites and members. A record is added ("H") for this device record. Cloud records are registered ("I") for synchronization. All active cloud invitations are registered ("J") with an inviter module to allow other devices to join this cloud.

Figure 56:
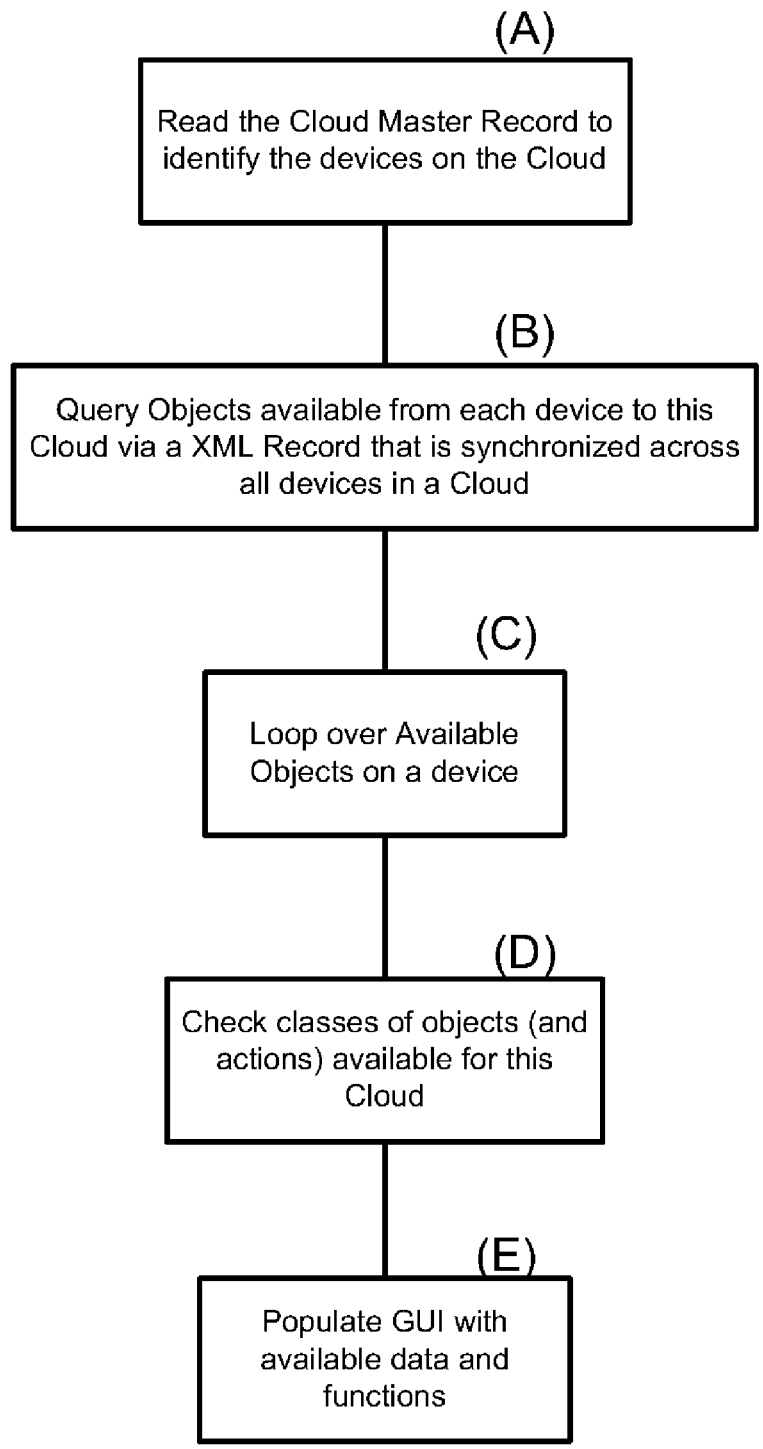
FIG. 56 shows a flowchart of creating a single view over all devices in a cloud.
Figure 56A:
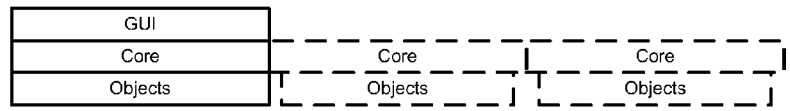
FIGS. 56A, 56B and 56C show a schematic of the relationship between devices, across a single view.

In FIG. 56, a flowchart is shown which indicates the steps in a process for populating a single view across all the devices in a cloud object, which allows all the objects within a cloud to be presented to a user, for their further interaction with these objects. As illustrated in FIG. 56A, the system has three main layers, a GUI, a communications core, and objects, which represent data and functionality on a device. The diagram of FIG. 56A shows the arrangement for three devices. The first device on the left operates as though its core extends across all three devices. This allows the GUI on the first device to access all of the functionality and data enabled by objects on all three devices. This situation is repeated for all of the three devices.

Figure 56B:
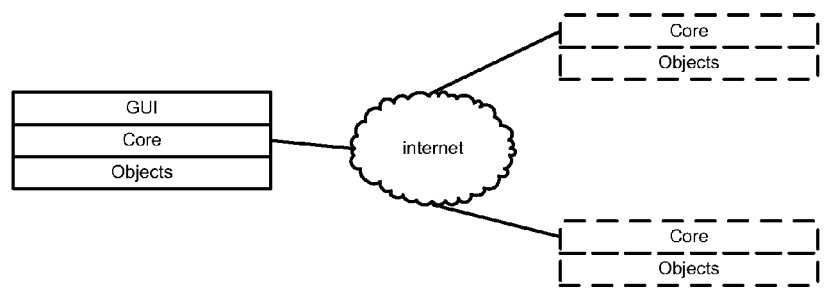

As indicated in FIG. 56B, the linking between cores is maintained across the internet, or other network that connects the devices.

Figure 56C:
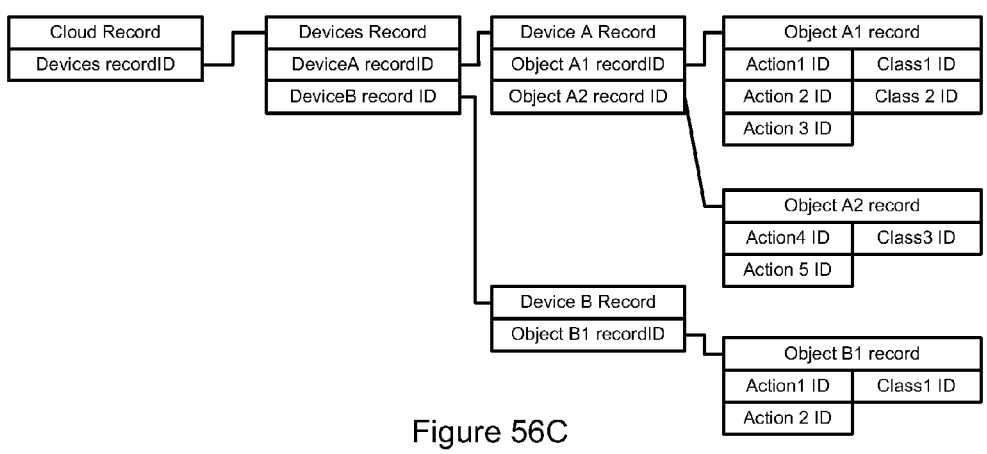

As indicated in FIG. 56C, for a particular grouping of devices (i.e., a cloud) the above data records are maintained on each device. These records are kept synchronized by a record manager in the cloud. Each record is identified by a unique identifier which is different for each cloud.

The "Cloud Record" is a master record for a cloud, which contains a reference to the devices record, users record and invites record. This record is kept synchronized across the cloud and does not change after a cloud's initial creation. The "Devices Record" contains a list of references to the "Device Record" for each device in a cloud. The devices record is updated when a new device joins the cloud. The "Device A Record" is the record maintained for Device A. Device A creates this record and is the only device that can update this record. The record contains a list of references to the Object Records that are maintained for each object on A. The "Object A1 Record" contains a list of the possible actions that are performable on the object A1. Actions could be: get the list of folders, get the list of files, send an email, add a contact, etc. The record also lists the classes contained in the object. A class is a predefined set of required actions. Examples of classes include: file browser, email browser, contacts, calendar etc. If an object has a particular class then it can be assumed that it contains a particular subset of actions. This allows for the standardization of objects.

Figure 57:
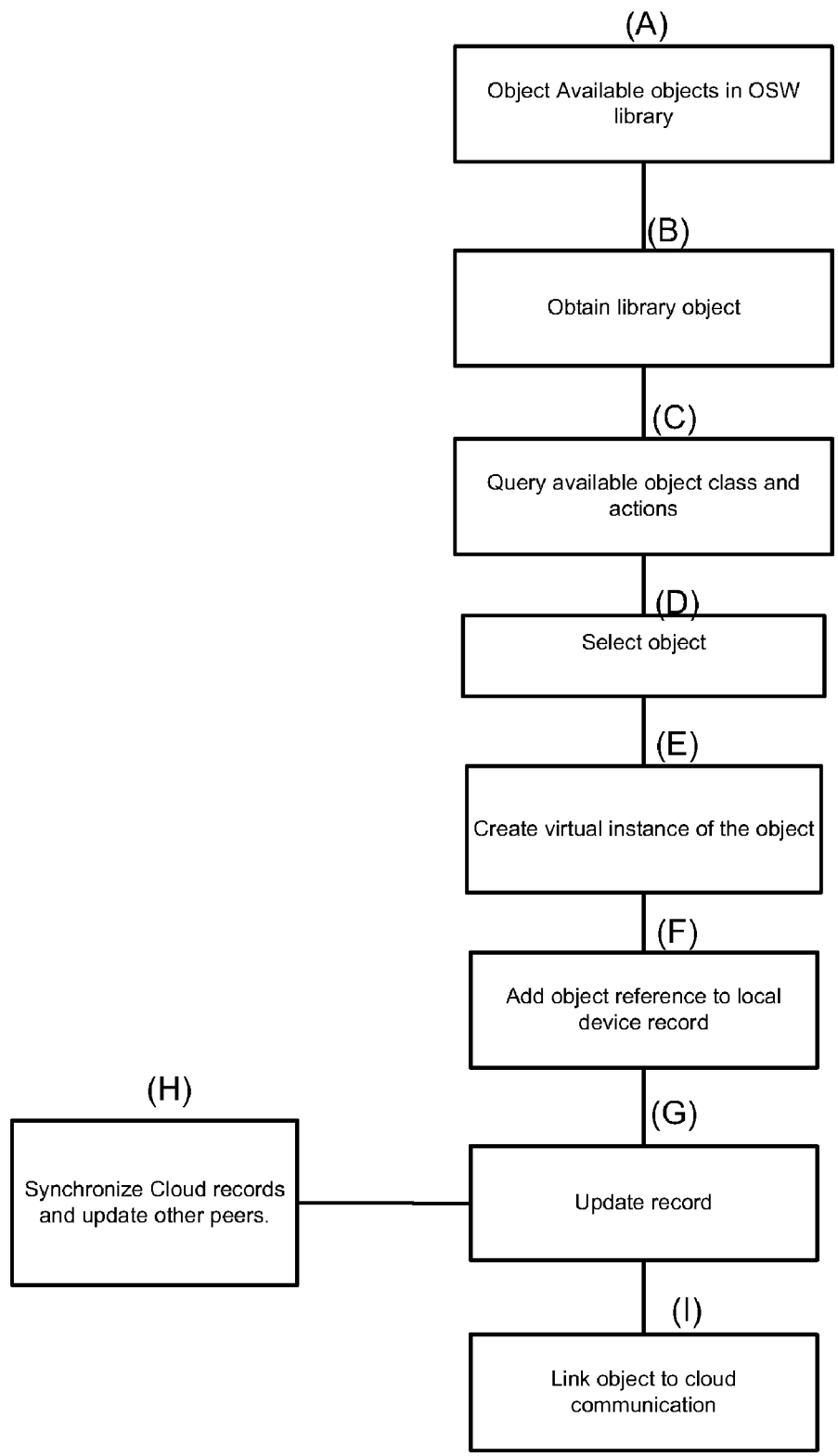
FIG. 57 shows a flowchart of a cloud start-up procedure.

A flowchart setting out the steps in object sharing is illustrated in FIG. 57. The steps referred to in the flowchart ("A") to ("H") are followed to carry out object sharing.

Figure 58:
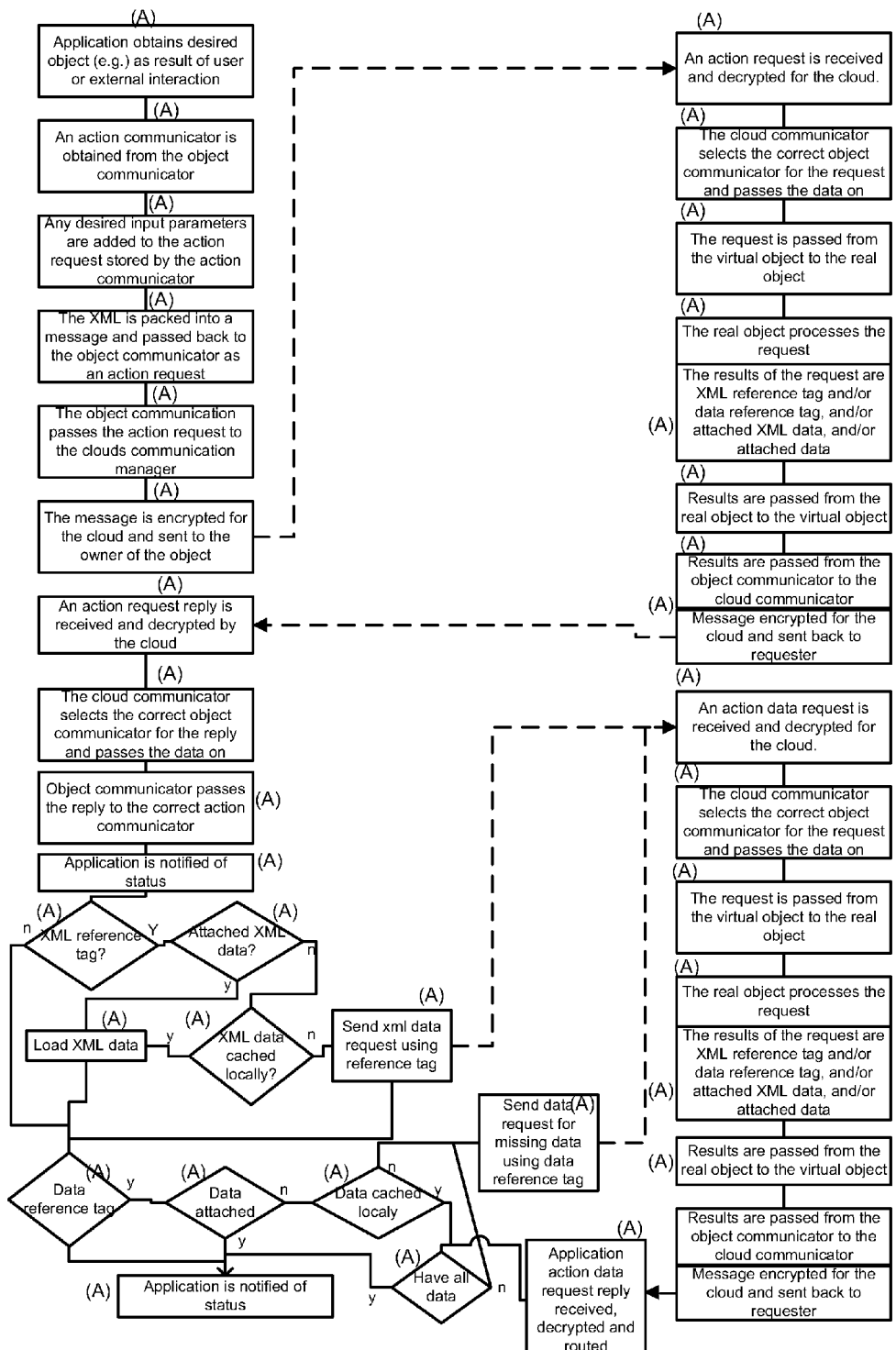
FIG. 58 shows a flowchart of object communication.

A flowchart of some possible object communication is provided in FIG. 58. This also provides an example of interactions occurring via XML. Data in diverse formats is managed by a common standard, which may be XML, as shown in this example, or may be some other standard. However, because XML tends to be verbose and contain much redundancies, a specific and more concise standard can be developed for use with the "Razberry" application, that only contains the information necessary for it to operate. In the example of FIG. 58, messages are passed back and forth using XML, to allow activities to occur. The steps ("A") are carried out as shown in the flowchart.

Figure 59:
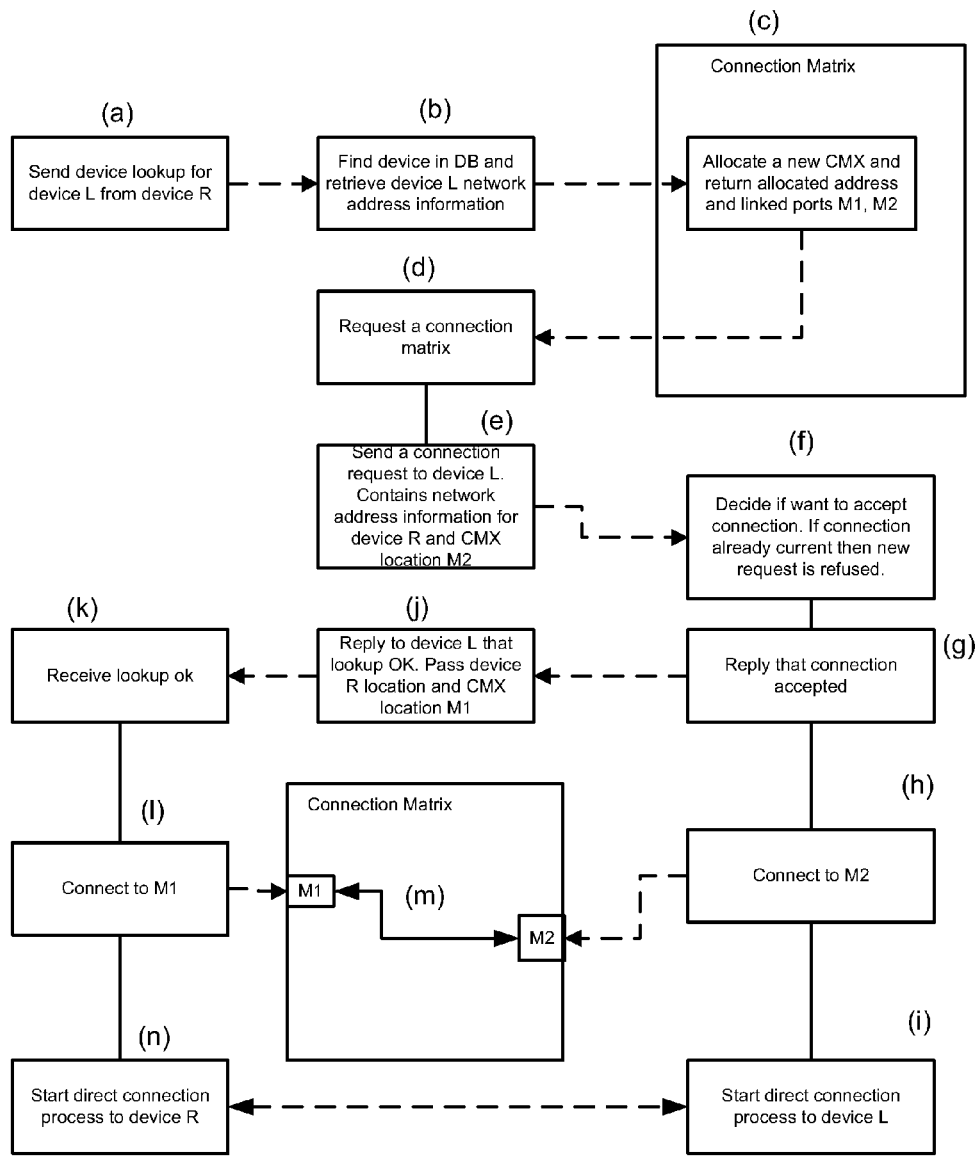
FIG. 59 shows a flowchart about device lookup and connection procedures.

A flowchart setting out a method for the device connection and lookup is illustrated in FIG. 59. This utilises a connection matrix.

In FIG. 59, device R wishes to connect to device L ("a") and sends a device connection/look-up request to the look-up. The look-up searches its device registration database ("b") to retrieve network address information abut device L. This information is the IP address on device L as well as the IP address seen by the look-up for device L. The look-up sends a request to the connection matrix for a new connection link. The connection matrix allocates two new network ports ("c") that are linked in order to transparently transfer data between the two. These two linked addresses M1 and M2 are returned to the look-up.

The look-up receives ("d") the connection matrix. A connection request is sent ("e") to device L. This connection requests network address information for device R and M2 (half of the connection link). Device L receives the request ("f") and decides if it wants to accept the connection. This decision can be based on allowed or banned IP address lists. Device L replies ("g") that the connection is accepted. It connects to M2 on the connection matrix ("h"). Device L attempts to establish ("i") a direct connection with device R. This direct connection attempt uses both the actual address of Device R and the address as seen by the look-up. Look-up receives ("j") the ok from Device L for the connection and passes the location of Device L along with the connection matrix M1 to device R. Device R receives ("k") the connection information for device L. Device R connects ("l") to M1 on the connection matrix using M1. In the connection matrix, the presence of a connection to both M1 and M2 opens ("m") the connection link. When this is opened device R and device L receive a handshake message that they can use to begin direct communications. Device R attempts to create ("n") direct connection with device L. If this connection is established, then the connection matrix link is released and all device communications seamlessly switch to the direct link.

Figure 60:
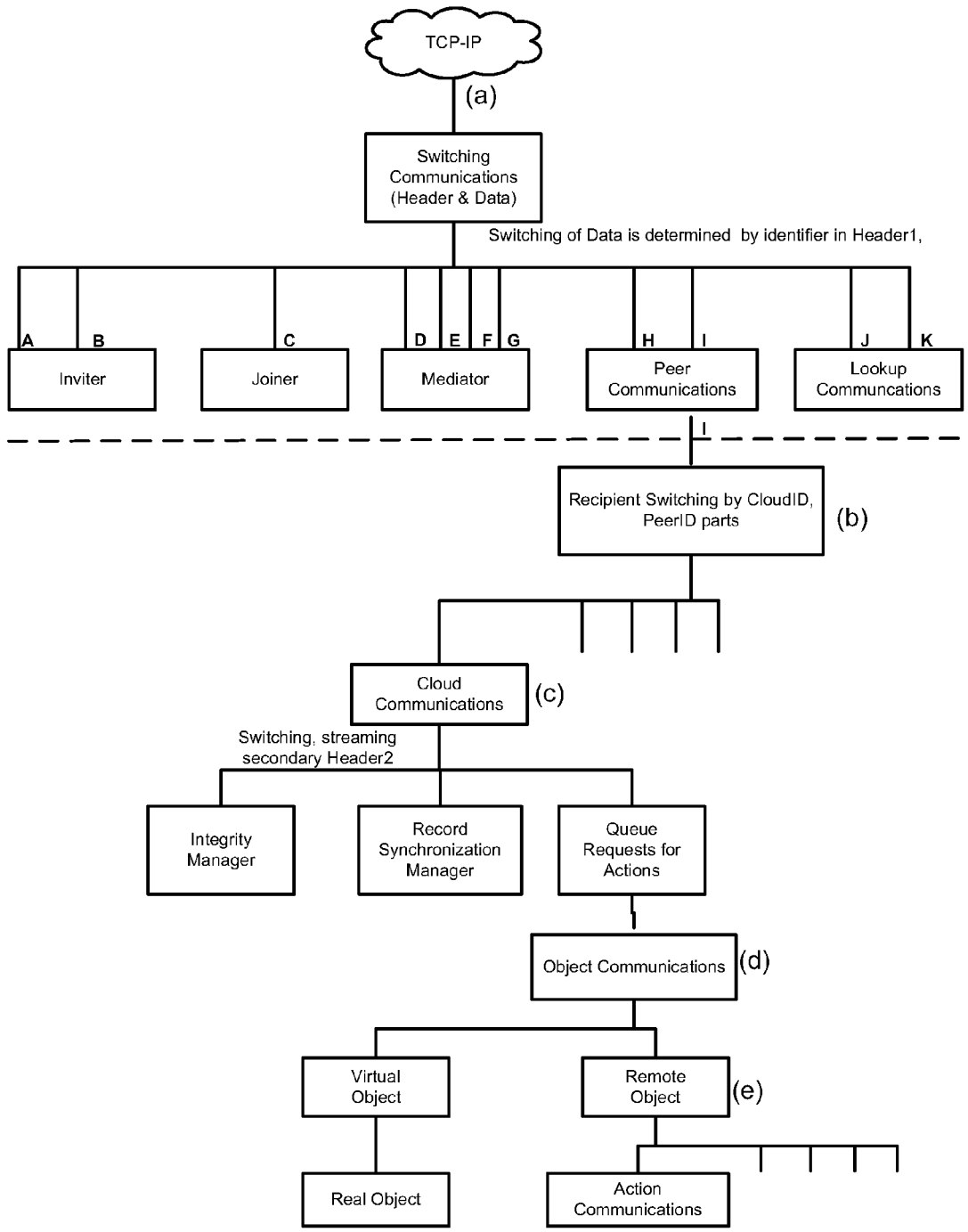
FIG. 60 shows a flowchart of a message switching procedure.

In FIG. 60, a flowchart illustrating a process for the message switching in the "Razberry" application. This is how the various subsystems in a cloud are addressed. Network data received by the Switching Communications box contains header information identifying the recipient of the data (see "(a)").

Recipients could be an: (i) Inviter, which manages and processes joining requests for clouds on this device and accepts or rejects the requests. (ii) Joiner, which manages cloud joining requests to a cloud through the cloud contact device. (iii) Mediator, which is a relay point between Joiners and Inviters. (iv) Peer Communications, which manages device challenge messages (H) and device/cloud messages (I). (v) Look-up communications, which manages communications with the look-up for all clouds and also manages connection request from the look-up.

The device cloud communication contains a second header identifying the cloud device pair on this device that the message is received by (see "(b)"). The message is switched to the correct cloud.

Cloud messages contain a third header identifying their type and recipient of the cloud message (see "(c)"). The recipient is one of: (i) The Integrity manager, where these messages are performing exchanges of cloud state and synchronization of cloud security keys. (ii) Record synchronization manager, where these messages synchronize the cloud specific records that are used to build up a single view. (iii) Queue for Action requests, where these requests are received to perform actions on objects on this device.

Further message switching is performed to target a message to a particular object such as a file object, mail object, chat object. etc (see "(d)"). If it is a remote object the message is switched to the particular action that was requested from the remote object (see "(e)").

Figure 61:
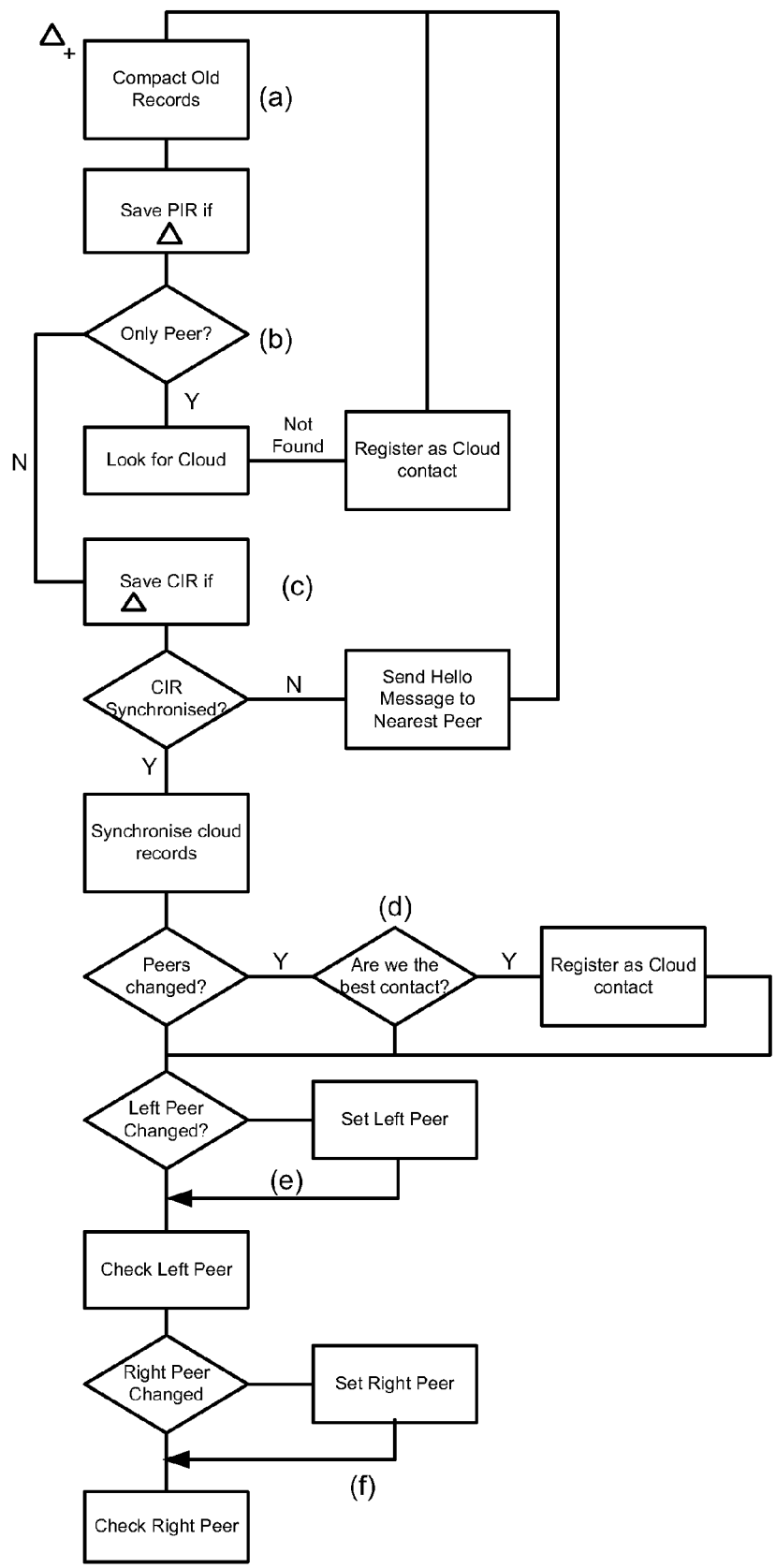
FIG. 61 shows a flowchart of a cloud integrity maintenance procedure.
Figure 63:
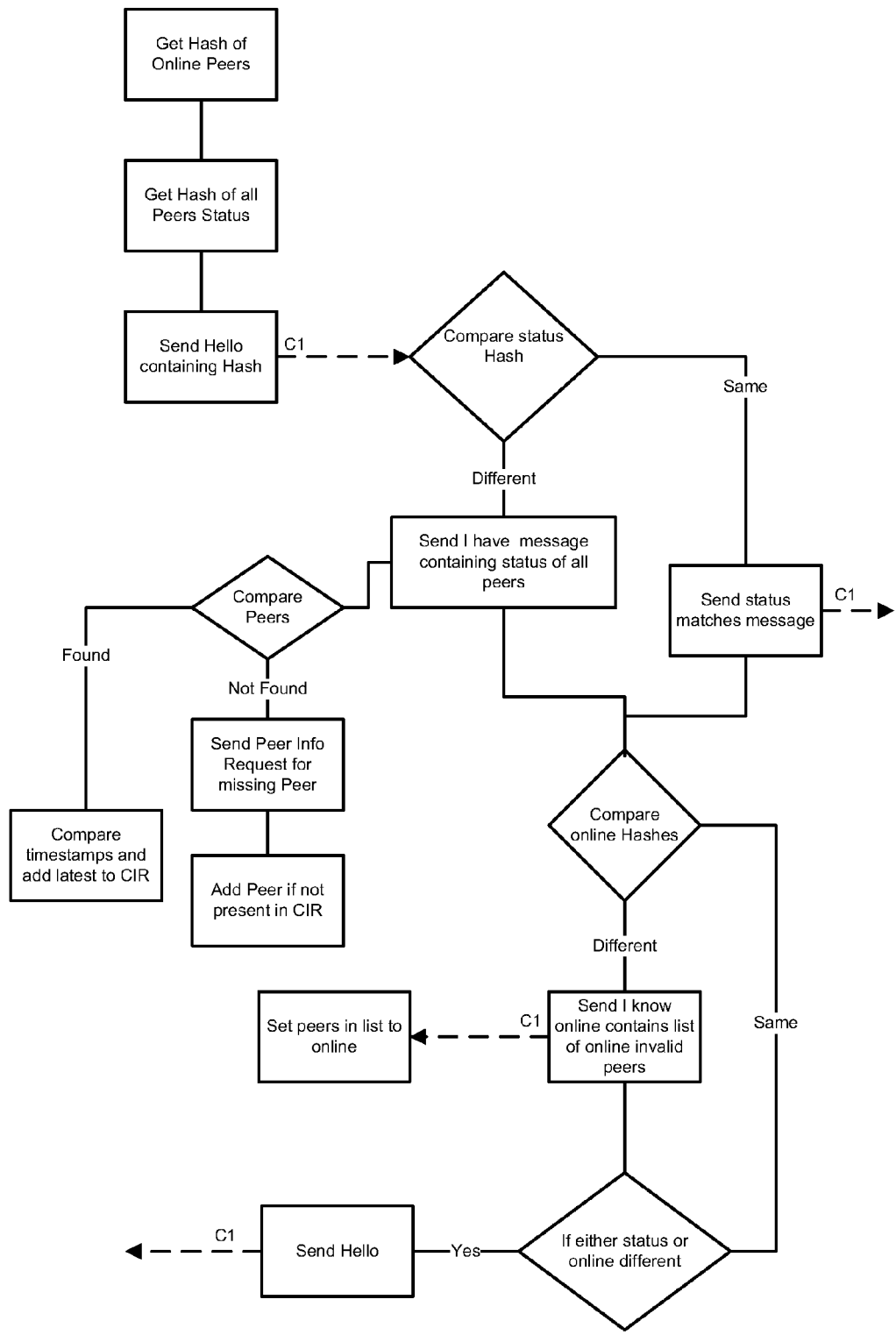
FIG. 63 shows a flowchart of a cloud information synchronisation procedure.

A flowchart showing an example of some steps for the maintenance of cloud integrity is provided in FIG. 61. Cloud records that are no longer accessed ("(a)") are removed from memory to reduce the memory footprint of the application. Whenever a device is not aware of any other devices for a cloud ("(b)"), then it attempts to look for the cloud. If the cloud is not found then the device registers with the look-up at the cloud contact point. The list of devices identifiers for a cloud is kept synchronized ("(c)"). This is described further in FIG. 63. Whenever devices come on- and off-line, a determination ("(d)") is made by each online device in a cloud to decide if they should become the new cloud contact point. The lefthand integrity link is checked ("(e)") at intervals and if the link has not been challenged after a set period of time a new challenge is performed. If the challenge has not been responded to, after another set period of time, then the peer is marked as offline and not valid. All other devices on the cloud are immediately updated with the offline status of this device. The righthand integrity link("(f)") functions the same as for ("(e)").

Figure 62:
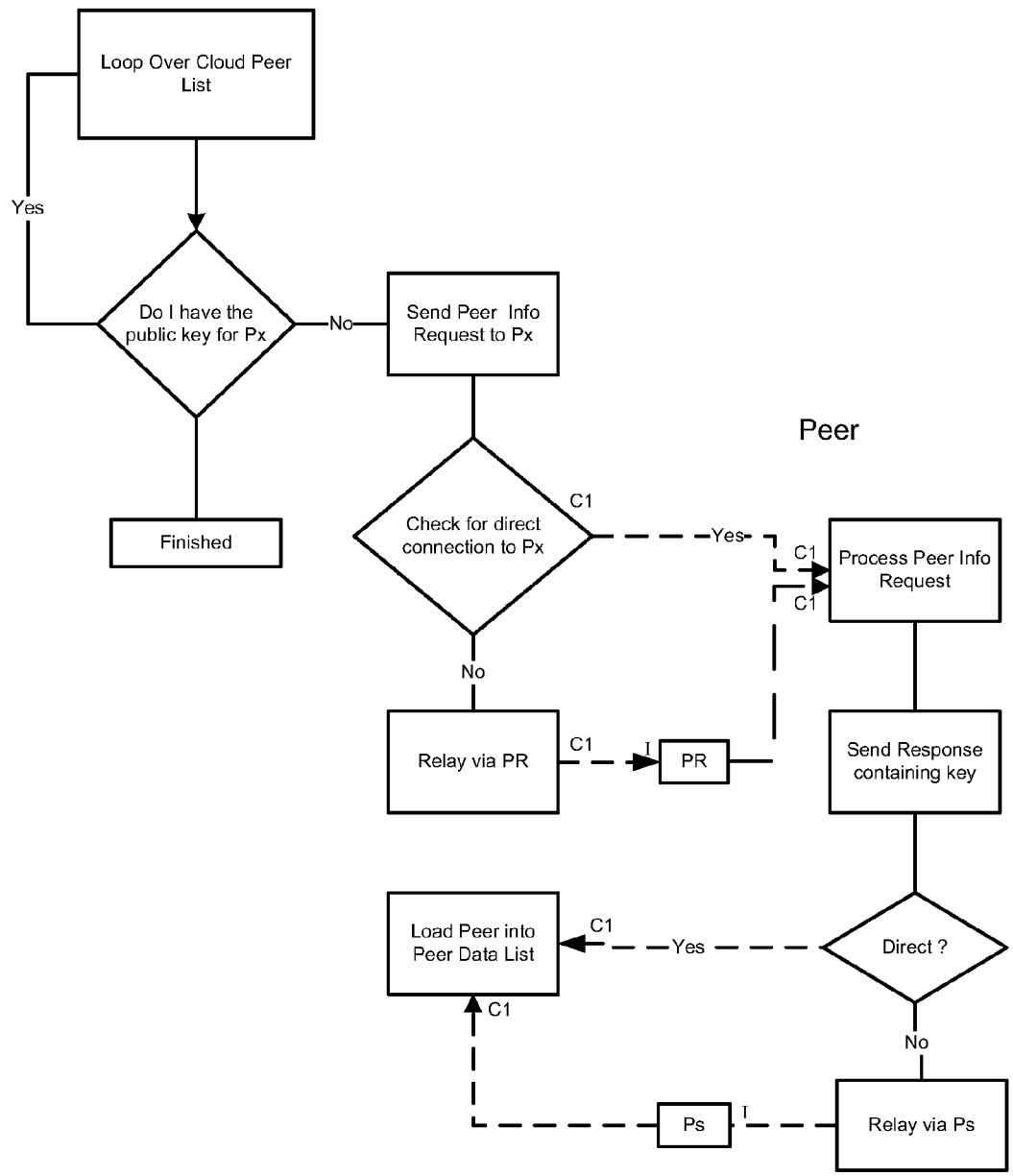
FIG. 62 shows a flowchart of peer information synchronisation procedure.

A flowchart illustrating the synchronisation of peer information is provided in FIG. 62. Similarly, a flowchart illustrating the synchronisation of cloud information is provided in FIG. 63.

Figure 64:
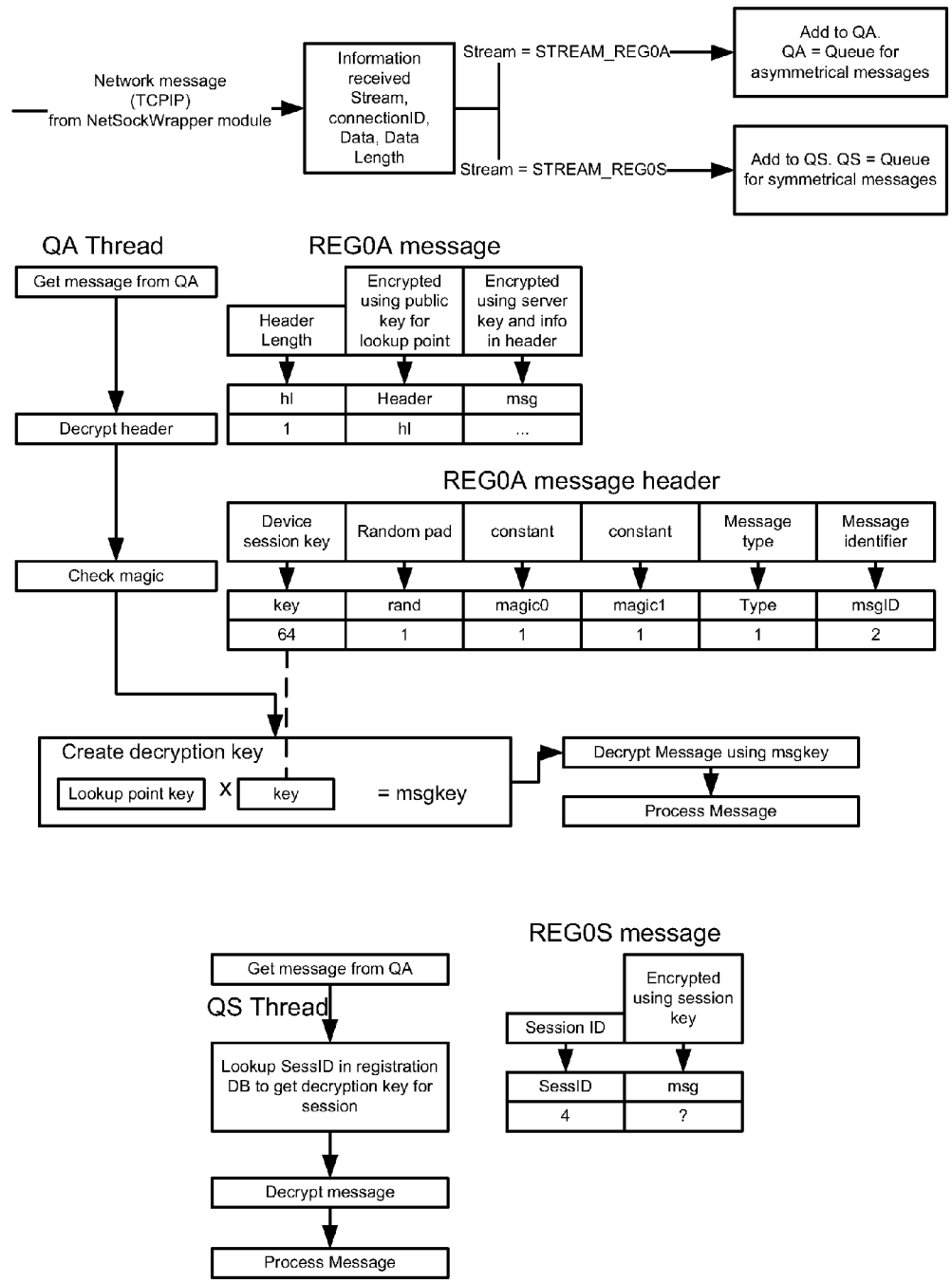
FIG. 64 shows some details about lookup point message handling procedure.

In FIG. 64, the message handling function of the lookup point is illustrated, as well as showing a possible structure of a message and message header that is involved in this.

Figure 65:
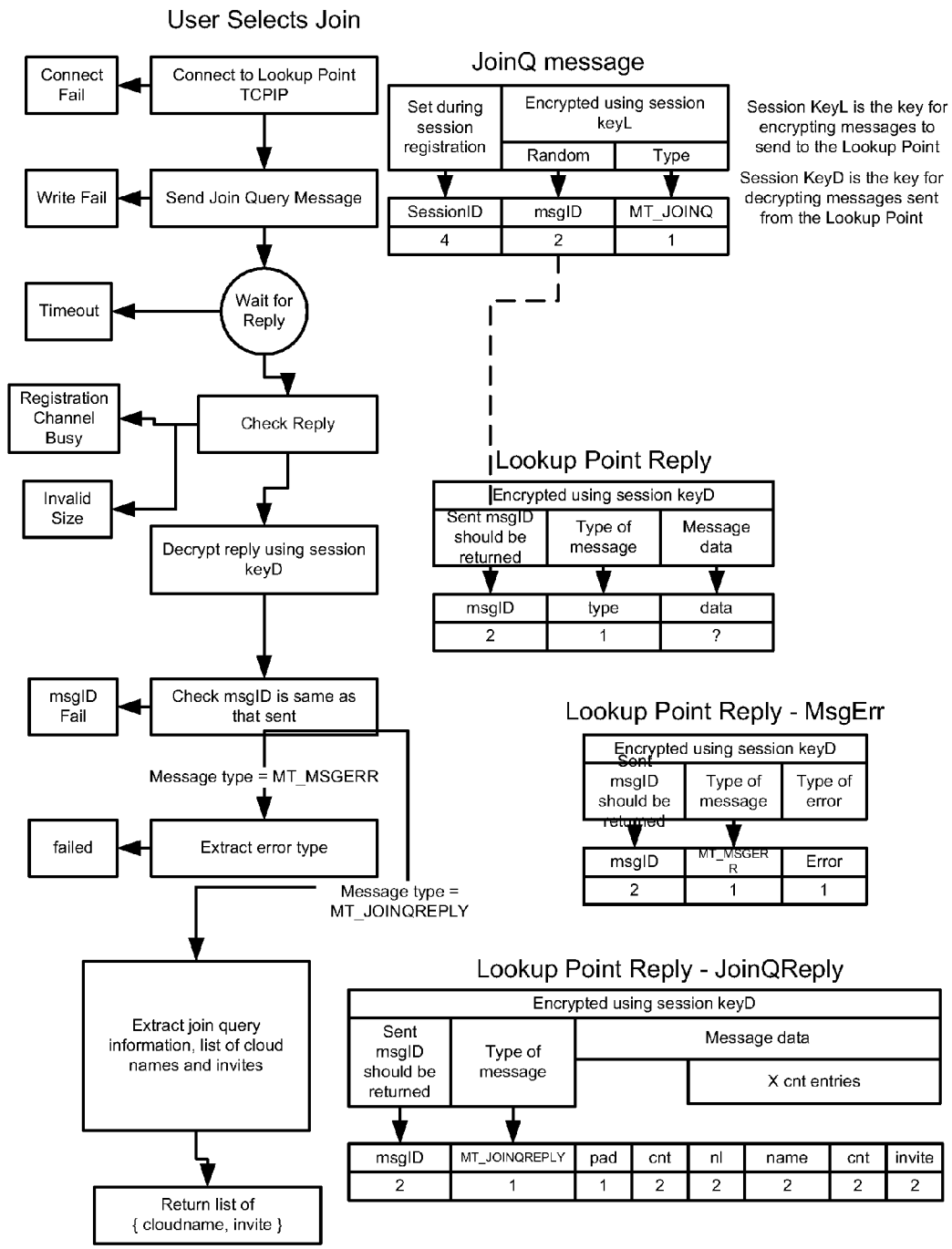
FIG. 65 shows some details about join query messaging procedure.

In FIG. 65, the message handling function of a join query is illustrated, as well as showing a possible structure of some messages that are involved in this.

Figure 66:
FIGS. 66 to 70 provide some additional examples of screens that allow users to operate a software application that embodies the invention.
Figure 67:
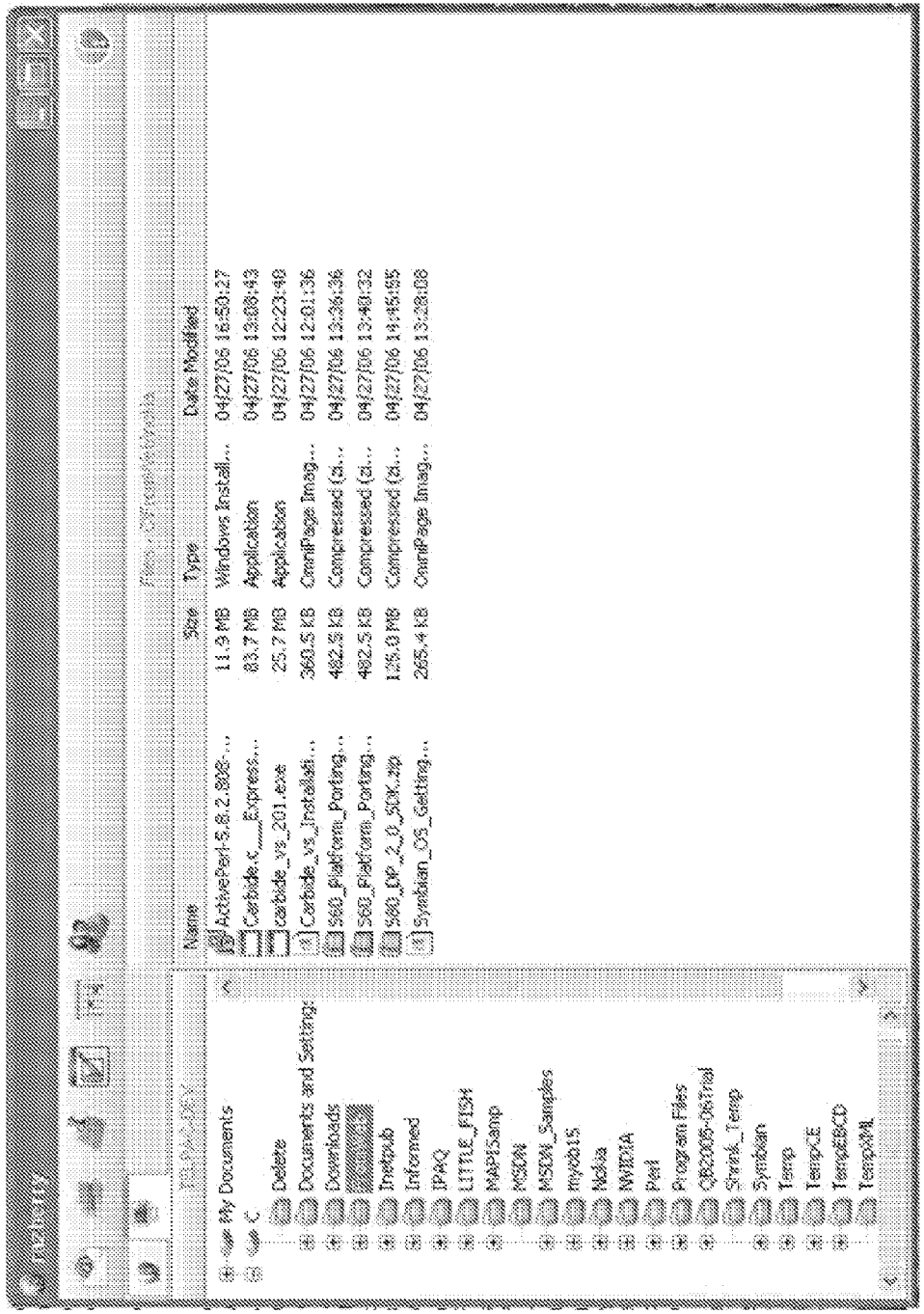
Figure 68:
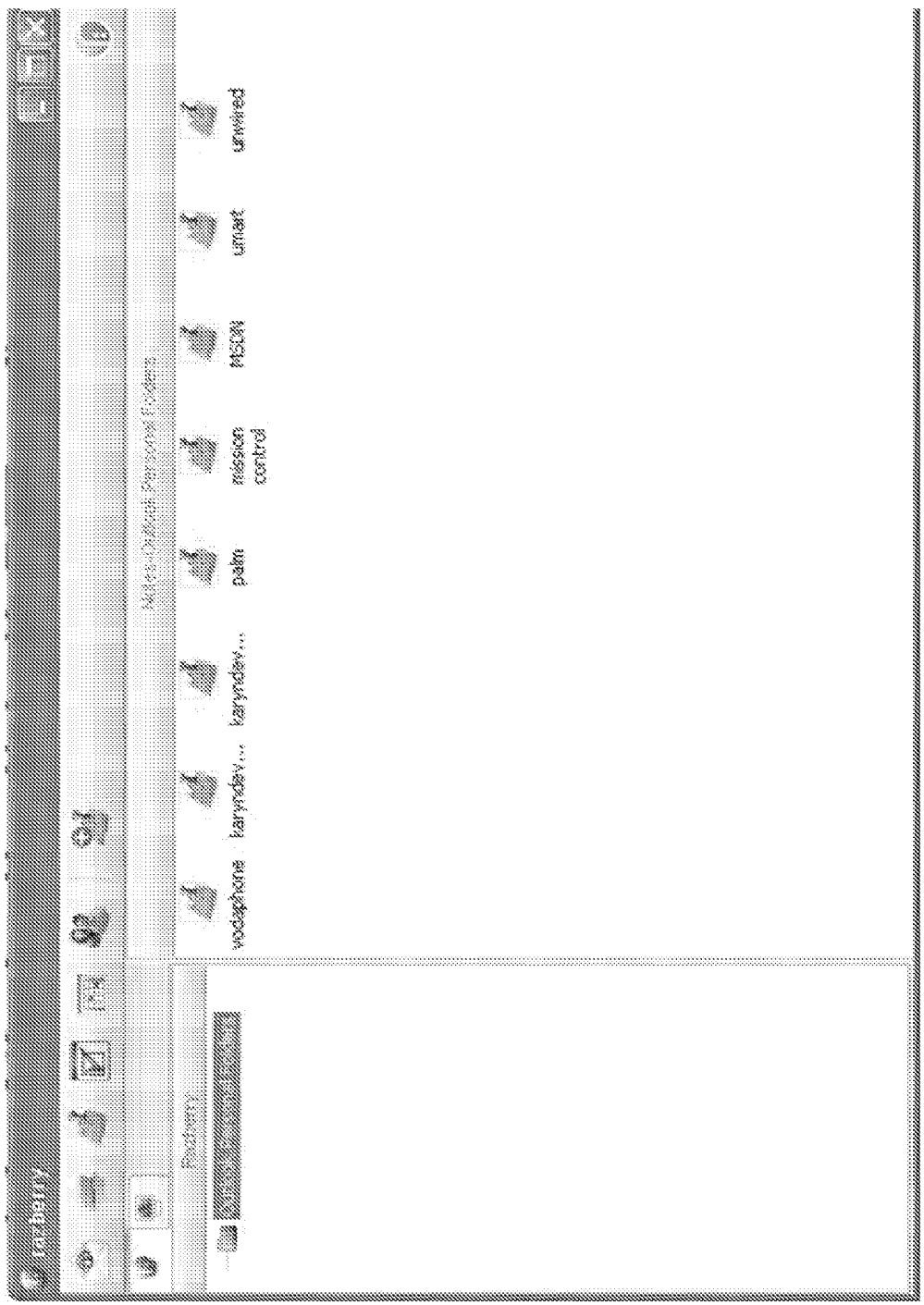
Figure 69:
Figure 70:
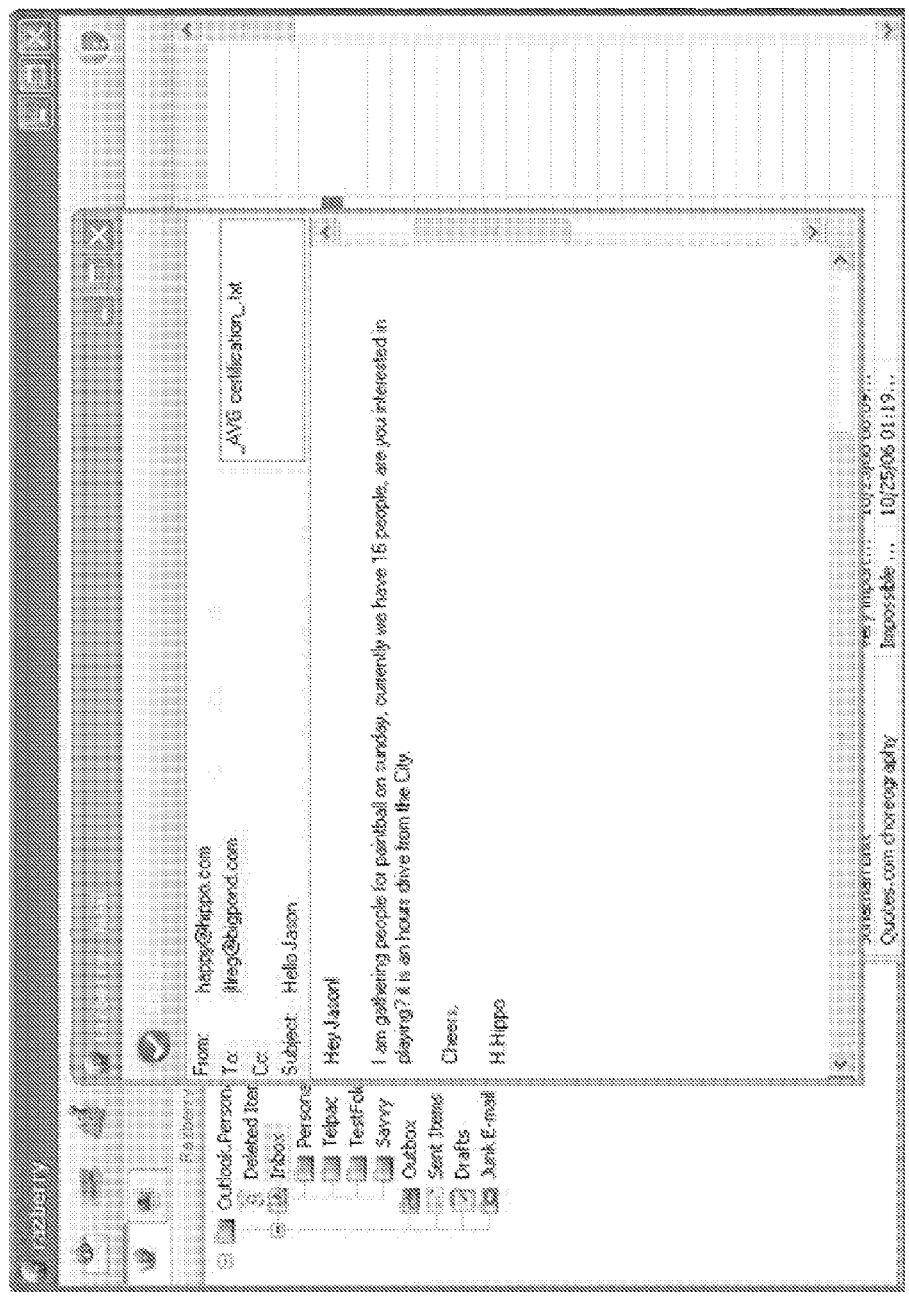

In FIGS. 66 to 70, various screen shots of the "Razberry" application are provided. FIG. 66 shows the email sub-system, which has been selected from a list of buttons on a toolbar at the top, and shows a number of devices containing Microsoft "Outlook" email folders gathered together in a cloud. The emails for one selected device are shown in FIG. 67. FIG. 68 shows one device being selected, with the file management sub-system having been selected for that device. In FIG. 69, the calendar function has been selected from the top toolbar, which displays the Microsoft "Outlook" calendar data via the "Razberry" application. FIG. 70 shows one email having been opened via the "Razberry" application.

Operation Example

As an example showing the operation of the "Razberry" application, let us assume that John is looking for a file.

He starts the Razberry on his PDA and enters his user name and password to register with the look-up. The PDA requests the location of John's Razberry cloud from the look-up and receives back the identifier for his home PC.

The PDA connects to the home PC directly, and a security verification and state and header record synchronization occurs between the PDA and the home PC. The PDA learns that the work PC is online and asks the look-up for the location of the work PC. The PDA and the work PC connect together and now an integrity link is established between the three devices.

John decides that he wants to view files on the work PC, and selects this function in the Razberry application GUI. The PDA retrieves the device record for the work PC and uses this to obtain the objects on the work PC. The PDA searches through the objects looking for an object with the object class "file". The PDA creates a new object/action addressed to the file object on the work PC and the sends the action request message. The work PC receives the action request message, processes the action request and sends the reply message back to the sender. The PDA receives the reply to the action request message and is able to display the list of folders on the work PC using the PDA GUI.

Examples of Razberry Functions:
  File Browser—allows access to files and folders (see FIG. 67)
  Mail Browser—allows access to email content and functionality (see FIGS. 66 & 68)
  Calendar Browser—allows access to calendar (see FIG. 69)
  Music Streamer—allows access to music content
  Voice module—allows access to device microphone and speakers for VoIP
  Video Streamer—allows access to video content
  Chat module—allows text messaging
  MediaPlayer Remote—allows remote control of a devices media player
  Remote Application Module—allows remote application viewing and interaction
  Advertisement Module—has cloud user specific information and can reach out to the web and pull in advertisements
  Banking Module—stores bank credentials on a safe device and performs transactions remotely
  Printer Module—allows access to a printer from the cloud
  Panic Module—displays panic alerts from another device.
  Web RSS feed module
  FTP Server module—allows access to existing FTP servers from the cloud
  BLOG update module—allow updating of a BLOG from the cloud
  Legacy module—allow access to a legacy application over the cloud
  Database module—allow database access over the cloud
  Web camera module—access streaming video in the cloud To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention claimed is:

1. A method for forming a secure virtual private network (VPN) consisting of two or more linked entities having internet connectability where each entity has links with at least one other device on the VPN, said method comprising the steps of:
 (a) providing a lookup device having a known address with an updatable index of entities known to be connectable to the VPN, which look up device accepts requests from known entities ("joining entity") wishing to link to the VPN,
 (b) causing at least one pre-designated contact entity on the VPN to periodically poll the lookup device for received joining requests,
 (c) said lookup device receiving a request from a joining entity to connect to the VPN,
 (d) in response to a poll for joining requests said lookup device notifying the polling contact entity of at least the address of each joining entity,
 (e) if the contact entity permits a connection to the VPN, the contact entity supplies at least its address to the lookup device which passes this to the joining entity,
 (f) the joining entity and contact entity establish a first link between them,
 (g) the joining entity and the contact entity conduct an authentication process over said first link,
 (h) and if the authentication process is successful the contact entity notifies the joining entity of at least the status of other entities belonging to the VPN and notifies all entities on the VPN that the joining entity is joining the VPN,
 (i) said joining entity using the status of other entities belonging to the VPN to calculate its node position in the VPN including its node position with respect to one or two neighbor entities it will connect to,
 (j) said one or two neighbor entities polling said lookup device for a received joining request,
 (k) said lookup device receiving a request from said joining entity to connect to a neighbor entity,
 (l) in response to a poll from a neighbor entity for a received joining request said lookup device notifying the neighbor entity of at least the address of said joining entity, (m) if the neighbor entity permits a connection to the joining entity, the neighbor entity supplying at least its address to the lookup device which passes this to the joining entity, (n) the joining entity and the neighbor entity establishing a second link between them, (o) said joining entity and at least one neighbor entity conducting a mutual authentication process which if successful sustains said one or more second links, (p) providing an initial registration step whereby entities register with the lookup device for access to one or more desired VPNs and only entities which are so registered are subsequently recognized or known to the lookup device, said registration step comprising: the entity sending to the lookup device registration information including at least a username, a password, and the lookup device storing said registration information for identification purposes when a registered entity sends a VPN joining request to the lookup device, (q) wherein said registration step includes the lookup device sending to registering entities a security key to allow such entities to access security keys unique to VPN for which registration has been made and the other entities registered for that VPN.

2. A method according to claim 1 wherein in step (h) the contact entity further notifies the joining entity of the entity identifiers of other entities belonging to the VPN.

3. A method according to claim 2 wherein in step (i) said joining entity additionally uses the entity identifiers of other entities belonging to the VPN to calculate its node position.

4. A method according to claim 3 wherein said entity identifier is an address.

5. A method according to claim 4 wherein said authentication process consists of each of the two entities challenging the other using a key unique to the purported identity of the other entity, each challenge comprising a transmission to the other entity, a response from the other entity and verification by the challenging entity that the response is correct.

6. A method according to claim 5 wherein each challenge between a first entity and a second entity comprises the steps of:

(a) the first entity generates a random sequence of data, stores it and encrypts it with the public key of the second entity and sends the resultant cyphertext to the second entity, (b) the second entity receives the cyphertext from the first entity, decrypts it using the private key of the second entity, encrypts the resultant plaintext with the public key of the first entity and sends it to the first entity, and (c) the first entity receives the cyphertext from the second entity, decrypts it using the private key of the first entity, compares the resultant plaintext with said stored random sequence of data and, if there is a match, accepts that the second entity is authenticated.

7. A method according to claim 6 wherein data traffic between entities connected to a VPN is encrypted using a symmetric key and said symmetric key is said random sequence of data.

8. A method according to claim 7 wherein said authentication process is periodically repeated and the periodically generated random data sequences are used as a dynamic symmetric session key.

9. A method according to claim 8 wherein said entities are devices having a processor that can be connected to the internet.

10. A method according to claim 9 wherein said devices include computers, PDAs, PPC, mobile telephones or smartphones, and embedded devices.

11. A method according to claim 1 wherein said authentication process consists of each of the two entities challenging the other using a key unique to the purported identity of the other entity, each challenge comprising a transmission to the other entity, a response from the other entity and verification by the challenging entity that the response is correct.

12. A method according to claim 11 wherein each challenge between a first entity and a second entity comprises the steps of:

(a) the first entity generates a random sequence of data, stores it and encrypts it with the public key of the second entity and sends the resultant cyphertext to the second entity, (b) the second entity receives the cyphertext from the first entity, decrypts it using the private key of the second entity, encrypts the resultant plaintext with the public key of the first entity and sends it to the first entity, and (c) the first entity receives the cyphertext from the second entity, decrypts it using the private key of the first entity, compares the resultant plaintext with said stored random sequence of data and, if there is a match, accepts that the second entity is authenticated.

13. A method according to claim 12 wherein data traffic between entities connected to a VPN is encrypted using a symmetric key and said symmetric key is said random sequence of data.

14. A method according to claim 13 wherein said authentication process is periodically repeated and the periodically generated random data sequences are used as a dynamic symmetric session key.

15. Computer software for forming a secure virtual private network (VPN) consisting of two or more linked entities having internet connectability where each entity has links with at least one other entity on the VPN and a lookup device connected to the internet having a known address with an updatable index of entities known to be connectable to the VPN, said software residing on each said entity in a non-transitory medium and comprising:

(a) a routine for connecting to said lookup device and making a request to said lookup device to join to the VPN, (b) a routine for polling the lookup device for received joining requests, (c) a routine for receiving from the lookup device at least the address of each joining entity, (d) a routine for matching the address of each joining entity with stored criteria, (e) a routine which allows matched entities to establish a first link between them, (f) an authentication routine which enables entities which have established a first link to mutually authenticate the identity of the other, (g) a routine which, if the authentication process is successful, notifies the joining entity of at least the status of other entities belonging to the VPN and notifies all entities on the VPN that the joining entity is joining the VPN, (h) a routine which uses the status of other entities belonging to the VPN to calculate the node position in the VPN and the one or two neighbor entities that the entity on which the routine resides will connect to, (i) a routine which, through said lookup device, establishes one or more second links with said one or more neighboring entities in said VPN and ends said first link, (j) a routine which invokes said authentication routine to conduct mutual authentication between said linked neighboring entities and which, if successful, sustains said one or more second links, (k) an initialization routine whereby entities register with the lookup device for access to one or more desired VPNs and only entities which are so registered are subsequently recognized or known to the lookup device, the registration routine including a registration step comprising: the entity sending to the lookup device registration information including at least a username, a password, and the lookup device storing said registration information for identification purposes when a registered entity sends a VPN joining request to the lookup device, (l) wherein the registration step includes the lookup device sending to registering entities a security key to allow such entities to access security keys unique to VPN for which registration has been made and the other entities registered for that VPN.

16. Computer software for forming a secure virtual private network (VPN) consisting of two or more linked entities having internet connectability where each entity has links with at least one other entity on the VPN and a lookup device connected to the internet having a known address with an updatable index of entities known to be connectable to the VPN, said software residing on each of said entities in a non-transitory medium and comprising:

(a) a routine for connecting to said lookup device and making a request to said lookup device to join to the VPN, (b) a routine for polling the lookup device for received joining requests, (c) a routine for receiving from the lookup device at least the address of each joining entity, (d) a routine for matching the address of each joining entity with stored criteria and supplying the address of the entity to the lookup device for passing to the joining entity, (e) a routine which allows matched entities to establish a first link between them, (f) an authentication routine which enables entities which have established a first link to mutually authenticate the identity of the other, (g) a routine which, if the authentication process is successful, notifies the joining entity of at least the status of other entities belonging to the VPN and notifies all entities on the VPN that the joining entity is joining the VPN, (h) a routine which uses the status of other entities belonging to the VPN to calculate the node position in the VPN and the one or two neighbor entities that the entity on which the routine resides will connect to, a routine which, through said lookup device, establishes one or more second links with said one or more neighboring entities in said VPN and ends said first link, (j) a routine which invokes said authentication routine to conduct mutual authentication between said linked neighboring entities and which, if successful, sustains said one or more second links (k) an initialization routine whereby entities register with the lookup device for access to one or more desired VPNs and only entities which are so registered are subsequently recognized or known to the lookup device, the registration routine including a registration step comprising: the entity sending to the lookup device registration information including at least a username, a password, and the lookup device storing said registration information for identification purposes when a registered entity sends a VPN joining request to the lookup device, (l) wherein the registration step includes the lookup device sending to registering entities a security key to allow such entities to access security keys unique to VPN for which registration has been made and the other entities registered for that VPN.

* * * * *